US011258482B2

(12) United States Patent
Wang et al.

(10) Patent No.: US 11,258,482 B2
(45) Date of Patent: *Feb. 22, 2022

(54) METHOD AND APPARATUS FOR MEDIUM ACCESS CONTROL FOR UNIFORM MULTIPLE ACCESS POINTS COVERAGE IN WIRELESS LOCAL AREA NETWORKS

(71) Applicant: InterDigital Patent Holdings, Inc., Wilmington, DE (US)

(72) Inventors: Xiaofei Wang, Cedar Grove, NJ (US); Guodong Zhang, Woodbury, NY (US); Oghenekome Oteri, San Diego, CA (US); Pengfei Xia, San Diego, CA (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 58 days.

This patent is subject to a terminal disclaimer.

(21) Appl. No.: 16/862,670

(22) Filed: Apr. 30, 2020

(65) Prior Publication Data

US 2020/0259529 A1 Aug. 13, 2020

Related U.S. Application Data

(63) Continuation of application No. 16/419,900, filed on May 22, 2019, now Pat. No. 10,644,760, which is a (Continued)

(51) Int. Cl.
*H04B 7/024* (2017.01)
*H04W 72/12* (2009.01)
(Continued)

(52) U.S. Cl.
CPC ........... *H04B 7/024* (2013.01); *H04B 7/0617* (2013.01); *H04W 72/085* (2013.01);
(Continued)

(58) Field of Classification Search
CPC ...... H04B 7/024; H04B 7/026; H04B 7/0617; H04W 72/085; H04W 72/1273; H04W 72/1284; H04W 84/12
See application file for complete search history.

(56) References Cited

U.S. PATENT DOCUMENTS 7,889,701 B2 2/2011 Malik et al.
8,259,745 B2 9/2012 Gong et al.
(Continued)

FOREIGN PATENT DOCUMENTS

AU 2011202551 6/2011
EP 1602196 11/2009
(Continued)

OTHER PUBLICATIONS

Cariou et al., "Carrier-oriented WIFI for cellular offload," IEEE 802.11-12/1123r0 (Sep. 14, 2012).
(Continued)

*Primary Examiner* — Rina C Pancholi
(74) *Attorney, Agent, or Firm* — Volpe Koenig

(57) ABSTRACT

A method and apparatus may be used in multi-AP and multi-wireless transmit/receive unit joint transmissions. The apparatus may be configured to transmit a joint transmission request on a first medium, and receive a joint transmission response on the first medium. In response, the apparatus my perform a joint transmission negotiation on a second medium and transmit data on the second medium based on the joint transmission negotiation. The apparatus may be configured to perform coordinated sectorized or beamformed transmissions through access point (AP)/PCP negotiations. The apparatus may provide an indication of support for joint transmission and coordinated sectorized or beamformed transmissions. The method and apparatus may also implement multi-AP/WTRU request-to-send (RTS)/clear-to-send (CTS) procedures. The apparatus may be configured
(Continued)

to perform coordinated sectorized or beamforming grouping.

12 Claims, 45 Drawing Sheets

Related U.S. Application Data continuation of application No. 14/441,487, filed as application No. PCT/US2013/069299 on Nov. 8, 2013, now Pat. No. 10,305,550.

(60) Provisional application No. 61/724,032, filed on Nov. 8, 2012.

(51) Int. Cl.
  *H04B 7/06* (2006.01)
  *H04W 72/08* (2009.01)
  *H04W 84/12* (2009.01)
  *H04B 7/026* (2017.01)

(52) U.S. Cl.
  CPC ... *H04W 72/1273* (2013.01); *H04W 72/1284* (2013.01); *H04B 7/026* (2013.01); *H04W 84/12* (2013.01)

(56) References Cited

U.S. PATENT DOCUMENTS

| | | | |
|---|---|---|---|
| 8,638,679 | B2 | 1/2014 | Catovic et al. |
| 8,649,326 | B2 | 2/2014 | Wu |
| 2005/0170776 | A1 | 8/2005 | Siorpaes |
| 2006/0194616 | A1* | 8/2006 | Willins ............ H04W 88/08 455/562.1 |
| 2007/0224990 | A1 | 9/2007 | Edge et al. |
| 2009/0232240 | A1* | 9/2009 | Lakkis ............ H04B 7/0491 375/260 |
| 2010/0033374 | A1* | 2/2010 | van Rensburg ........ H01Q 1/246 342/368 |
| 2010/0106828 | A1 | 4/2010 | Palanki et al. |
| 2010/0130230 | A1 | 5/2010 | Aggarwal et al. |
| 2010/0177746 | A1 | 7/2010 | Gorokhov et al. |
| 2010/0273492 | A1 | 10/2010 | Liu et al. |
| 2010/0279619 | A1 | 11/2010 | Yeh et al. |
| 2010/0322171 | A1 | 12/2010 | Dekorsy et al. |
| 2011/0085460 | A1 | 4/2011 | Zhang et al. |
| 2011/0149842 | A1* | 6/2011 | Cordeiro ............ H04B 7/0491 370/328 |
| 2012/0020312 | A1 | 1/2012 | Lv et al. |
| 2012/0202431 | A1 | 8/2012 | Hawryluck et al. |
| 2013/0003588 | A1 | 1/2013 | Gage et al. |
| 2014/0126408 | A1 | 5/2014 | Ding et al. |
| 2015/0295629 | A1 | 4/2015 | Xia et al. |

FOREIGN PATENT DOCUMENTS

| | | |
|---|---|---|
| EP | 2405679 | 1/2012 |
| WO | 2003/026221 | 3/2003 |
| WO | 2012/126514 | 9/2012 |

OTHER PUBLICATIONS

Draft Standard for Information Technology—Telecommunications and information exchange between systems—Local and metropolitan area networks—Specific requirements; Part 11: Wireless LAN Medium Access Control (MAC) and Physical Layer (PHY) specifications; Amendment 5: Enhancements for Very High Throughput for Operation in Bands below 6GHz, IEEE P802.11ac/D1.4 (Nov. 2011).

Gong et al., "11ah Channelization of China," IEEE 802.11-11/1320r0 (Sep. 2011).

IEEE P802.11ad/D9.0, Draft Standard for Information Technology—Telecommunications and Information Exchange Between Systems—Local and Metropolitan Area Networks—Specific Requirements—Part 11 Wireless LAN Medium Access Control (MAC) and Physical Layer (PHY) Specifications—Amendment 3: Enhancements for Very High Throughput in the 60 GHz Band, IEEE P802.11ad/D9.0 (Jul. 2012).

IEEE P802.11ad-2012, IEEE Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications—Amendment 3: Enhancements for Very High Throughput in the 60 GHz Band, IEEE P802.11ad-2012 (Oct. 2012).

IEEE P802.11ah/D1.0, Draft Standard for Information technology—Telecommunications and information exchange between systems Local and metropolitan area networks—Specific requirements; Part 11: Wireless LAN Medium Access Control (MAC) and Physical Layer (PHY) Specifications; Amendment 6: Sub 1 GHz License Exempt Operation, IEEE P802.11ah/D1.0 (Oct. 2013).

IEEE Standard for Information technology—Telecommunications and information exchange between systems—Local and metropolitan area networks—Specific requirements; Part 11: Wireless LAN Medium Access Control (MAC) and Physical Layer (PHY) Specifications, IEEE Std. 802.11-2012 (Mar. 29, 2012).

IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 5: Enhancements for Higher Throughput, IEEE Std 802.11n-2009 (Sep. 2009).

Perahia et al., "Sectorized Beam Operation—Follow Up," IEEE 802.11-12/1355r1 (Nov. 2012).

Wang et al., "Sectorized beam Operation," IEEE 802.11-12/1103r0 (Sep. 2012).

Wong et al., "Proposed TGah Draft Amendment," IEEE P802.11 Wireless LANs, IEEE 802.11-13/0500r0 (May 2013).

* cited by examiner

| Element ID | Length | ID | Options | Schedule | Tx Spec | Request Type |
|---|---|---|---|---|---|---|
| 1720 | 1721 | 1722 | 1723 | 1724 | 1725 | 1726 |

FIG. 17B

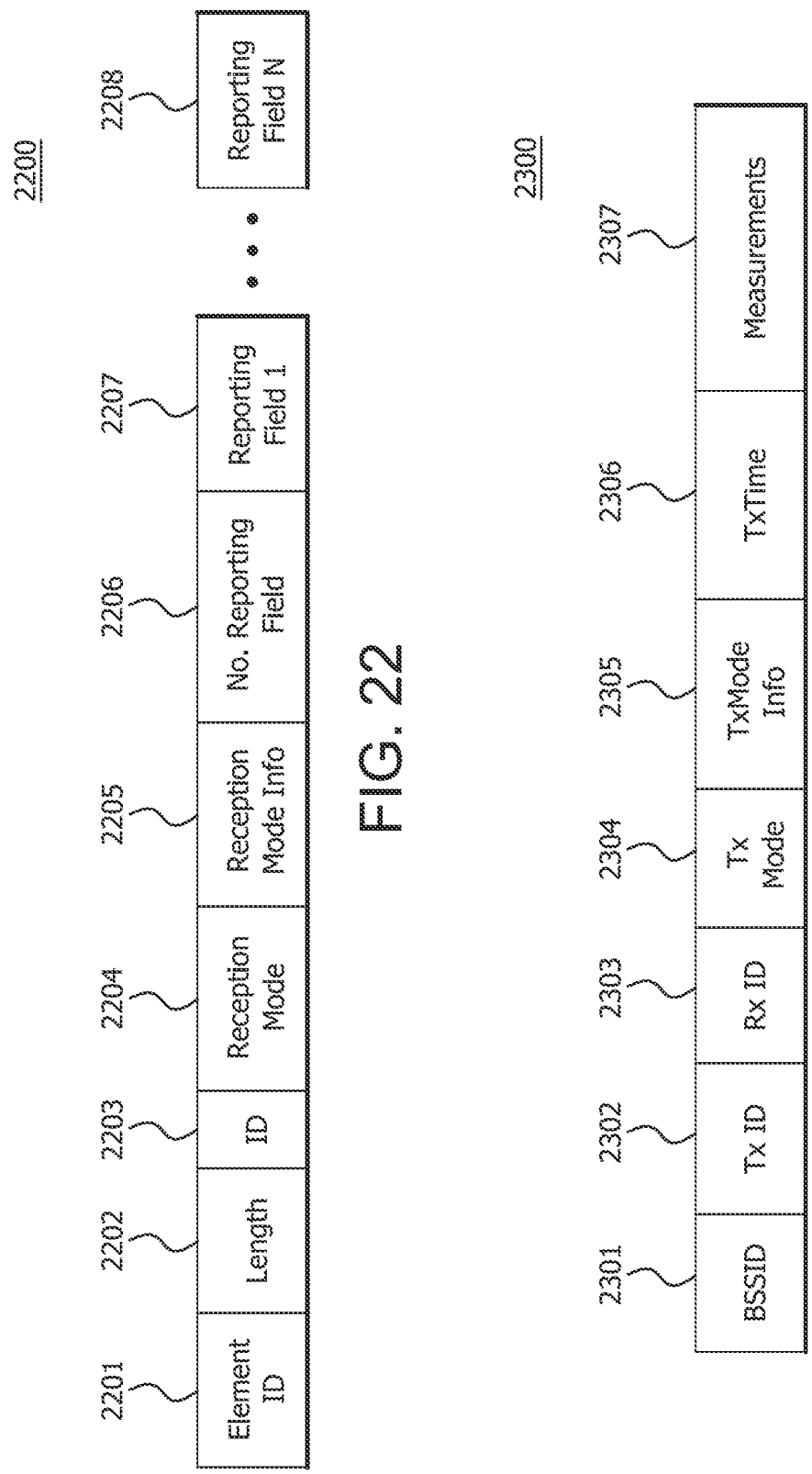

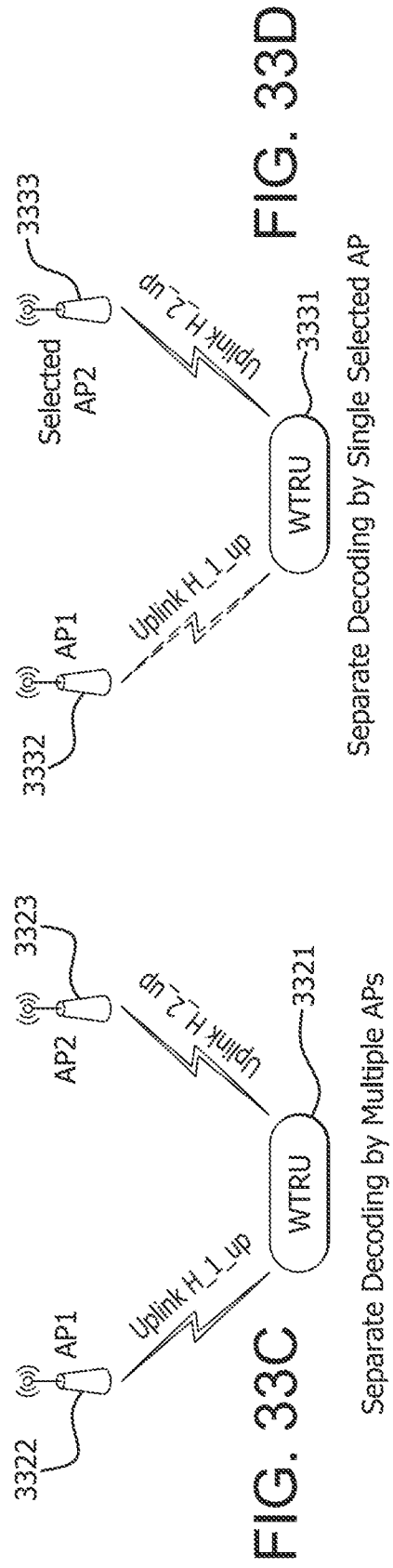
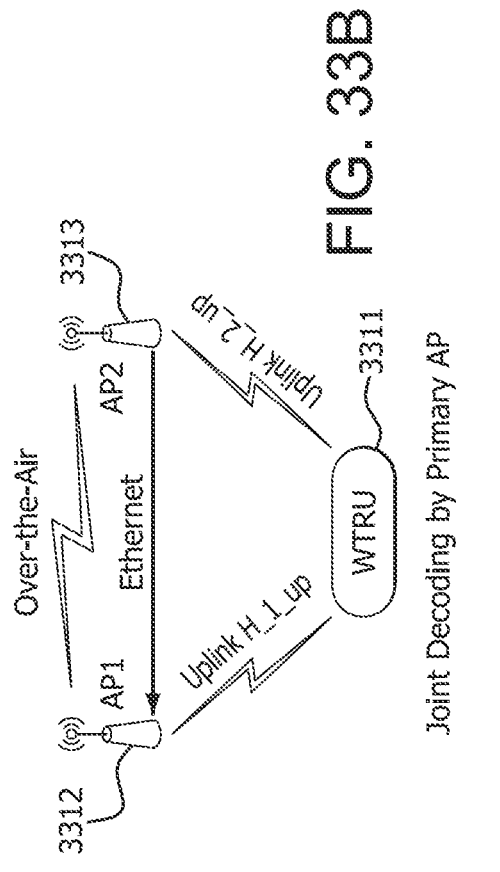
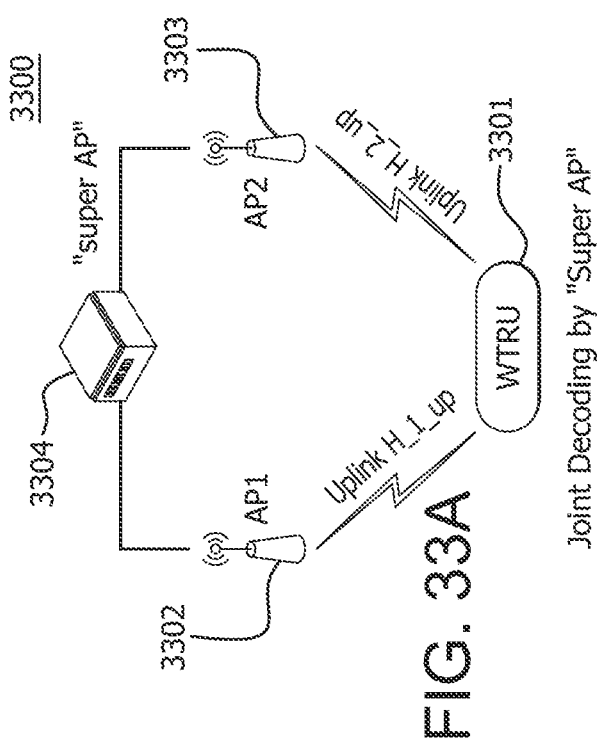
FIG. 33A Joint Decoding by "Super AP"
FIG. 33B Joint Decoding by Primary AP
FIG. 33C Separate Decoding by Multiple APs
FIG. 33D Separate Decoding by Single Selected AP

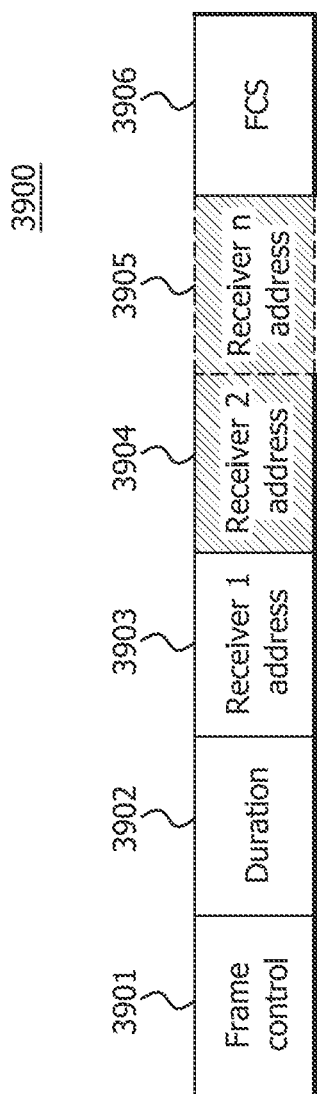
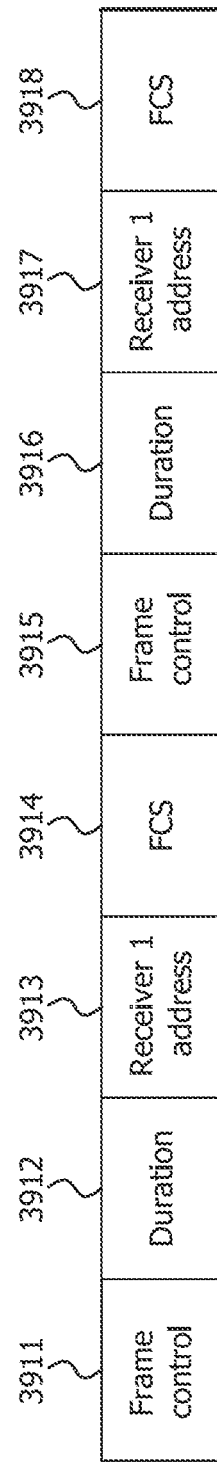
FIG. 39A
FIG. 39B

METHOD AND APPARATUS FOR MEDIUM ACCESS CONTROL FOR UNIFORM MULTIPLE ACCESS POINTS COVERAGE IN WIRELESS LOCAL AREA NETWORKS

CROSS REFERENCE TO RELATED APPLICATIONS

This application is a continuation of U.S. patent application Ser. No. 16/419,900, filed May 22, 2019, which issued as U.S. Pat. No. 10,644,760, which is a continuation of U.S. application Ser. No. 14/441,487, filed May 7, 2015, which issued as U.S. Pat. No. 10,305,550 on May 28, 2019, which claims the benefit of PCT Application No. PCT/US2013/069299, filed Nov. 8, 2013, and U.S. Provisional Application Ser. No. 61/724,032 filed Nov. 8, 2012, the contents of which are hereby incorporated by reference herein.

BACKGROUND

A WLAN in Infrastructure basic service set (BSS) mode has an Access Point (AP) for the BSS and one or more stations (STAs) also referred to herein as wireless transmit/receive units WTRUs associated with the AP. The AP typically has access or interface to a distribution system (DS) or another type of wired/wireless network that carries traffic in and out of the BSS. Traffic to STAs that originates from outside the BSS arrives through the AP and may be delivered to the STAs. Traffic originating from STAs to destinations outside the BSS may be sent to the AP to be delivered to the respective destinations. Traffic between STAs within the BSS may also be sent to through the AP where the source STA sends traffic to the AP and the AP delivers the traffic to the destination STA. Such traffic between STAs within a BSS may be peer-to-peer traffic. Such peer-to-peer traffic may also be sent directly between the source and destination STAs with a direct link setup (DLS) using an 802.11e DLS or an 802.11z tunneled DLS (TDLS). A WLAN in Independent BSS mode may have no AP and STAs that communicate directly with each other. There is a need for improved throughput performance and reduced interference for these systems.

SUMMARY

A method and apparatus may be used in multi-AP and multi-wireless transmit/receive unit joint transmissions. The apparatus may be configured to transmit a joint transmission request on a first medium, and receive a joint transmission response on the first medium. In response, the apparatus my perform a joint transmission negotiation on a second medium and transmit data on the second medium based on the joint transmission negotiation. The apparatus may be configured to perform coordinated sectorized or beamformed transmissions through access point (AP)/PCP negotiations. The apparatus may provide an indication of support for joint transmission and coordinated sectorized or beamformed transmissions. The method and apparatus may also implement multi-AP/WTRU request-to-send (RTS)/clear-to-send (CTS) procedures. The apparatus may be configured to perform coordinated sectorized or beamforming grouping.

BRIEF DESCRIPTION OF THE DRAWINGS

A more detailed understanding may be had from the following description, given by way of example in conjunction with the accompanying drawings wherein:

FIG. 17B is a diagram of an example joint transmission request IE used for multi-WTRU coordinated joint transmission;

FIG. 22 shows an example design of a sectorized reception report IE;

FIG. 23 shows an example of a reporting field;

FIG. 33A shows an example of joint decoding by a super AP;

FIG. 33B shows an example of joint decoding by a primary AP;

FIG. 33C shows an example of separate decoding by multiple APs;

FIG. 33D shows an example of separate decoding by a single AP;

FIG. 39A shows an example of a joint ACK that may include multiple receive addresses;

FIG. 39B shows an example of an aggregated ACK;

DETAILED DESCRIPTION

Figure 1A:
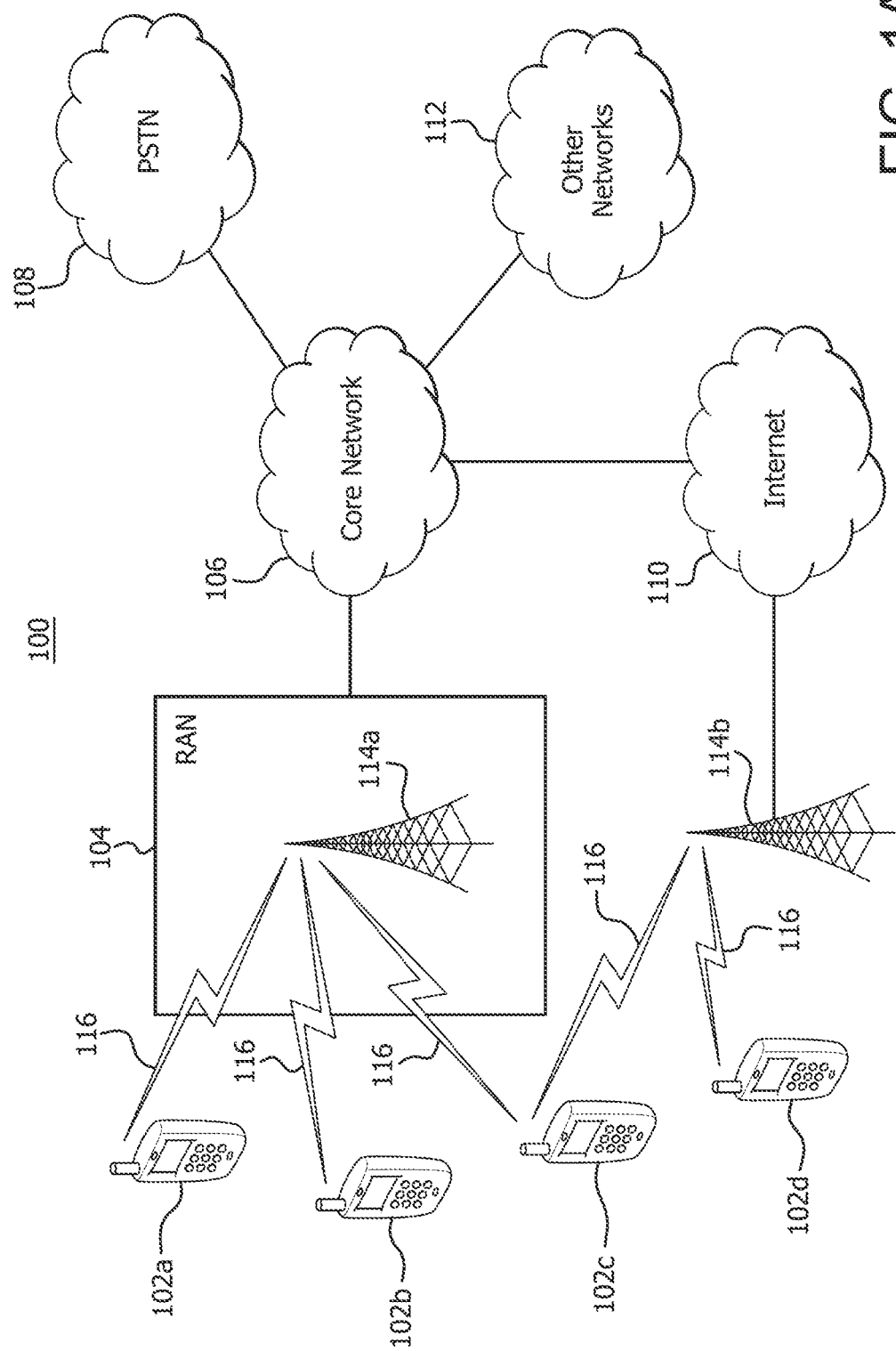
FIG. 1A is a system diagram of an example communications system in which one or more disclosed embodiments may be implemented.

FIG. 1A is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include wireless transmit/receive units (WTRUs) 102a, 102b, 102c, 102d, a radio access network (RAN) 104, a core network 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106, the Internet 110, and/or the networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In another embodiment, the base station 114a may employ multiple-input multiple output (MIMO) technology and, therefore, may utilize multiple transceivers for each sector of the cell.

The base stations 114a, 114b may communicate with one or more of the WTRUs 102a, 102b, 102c, 102d over an air interface 116, which may be any suitable wireless communication link (e.g., radio frequency (RF), microwave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114*a* in the RAN 104 and the WTRUs 102*a*, 102*b*, 102*c* may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114*a* and the WTRUs 102*a*, 102*b*, 102*c* may implement a radio technology such as Evolved UMTS Terrestrial Radio Access (E-UTRA), which may establish the air interface 116 using Long Term Evolution (LTE) and/or LTE-Advanced (LTE-A).

In other embodiments, the base station 114*a* and the WTRUs 102*a*, 102*b*, 102*c* may implement radio technologies such as IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114*b* in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114*b* and the WTRUs 102*c*, 102*d* may implement a radio technology such as IEEE 802.11 to establish a wireless local area network (WLAN). In another embodiment, the base station 114*b* and the WTRUs 102*c*, 102*d* may implement a radio technology such as IEEE 802.15 to establish a wireless personal area network (WPAN). In yet another embodiment, the base station 114*b* and the WTRUs 102*c*, 102*d* may utilize a cellular-based RAT (e.g., WCDMA, CDMA2000, GSM, LTE, LTE-A, etc.) to establish a picocell or femtocell. As shown in FIG. 1A, the base station 114*b* may have a direct connection to the Internet 110. Thus, the base station 114*b* may not be required to access the Internet 110 via the core network 106.

The RAN 104 may be in communication with the core network 106, which may be any type of network configured to provide voice, data, applications, and/or voice over internet protocol (VoIP) services to one or more of the WTRUs 102*a*, 102*b*, 102*c*, 102*d*. For example, the core network 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the core network 106 may be in direct or indirect communication with other RANs that employ the same RAT as the RAN 104 or a different RAT. For example, in addition to being connected to the RAN 104, which may be utilizing an E-UTRA radio technology, the core network 106 may also be in communication with another RAN (not shown) employing a GSM radio technology.

The core network 106 may also serve as a gateway for the WTRUs 102*a*, 102*b*, 102*c*, 102*d* to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 104 or a different RAT.

Some or all of the WTRUs 102*a*, 102*b*, 102*c*, 102*d* in the communications system 100 may include multi-mode capabilities, i.e., the WTRUs 102*a*, 102*b*, 102*c*, 102*d* may include multiple transceivers for communicating with different wireless networks over different wireless links. For example, the WTRU 102*c* shown in FIG. 1A may be configured to communicate with the base station 114*a*, which may employ a cellular-based radio technology, and with the base station 114*b*, which may employ an IEEE 802 radio technology.

Figure 1B:
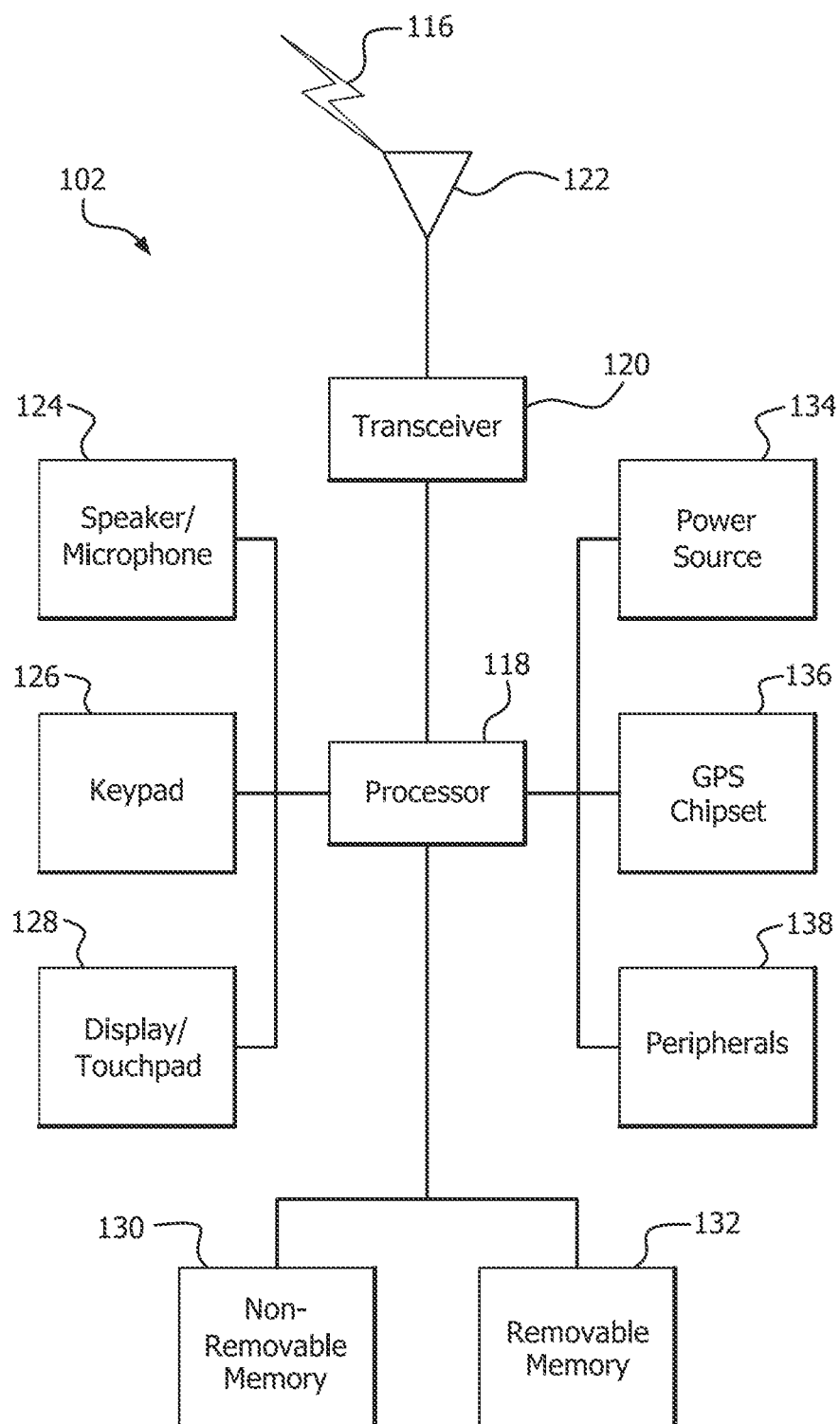
FIG. 1B is a system diagram of an example wireless transmit/receive unit (WTRU) that may be used within the communications system illustrated in FIG. 1A.

FIG. 1B is a system diagram of an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 106, removable memory 132, a power source 134, a global positioning system (GPS) chipset 136, and other peripherals 138. It will be appreciated that the WTRU 102 may include any subcombination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114*a*) over the air interface 116. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 106 and/or the removable memory 132. The non-removable memory 106 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
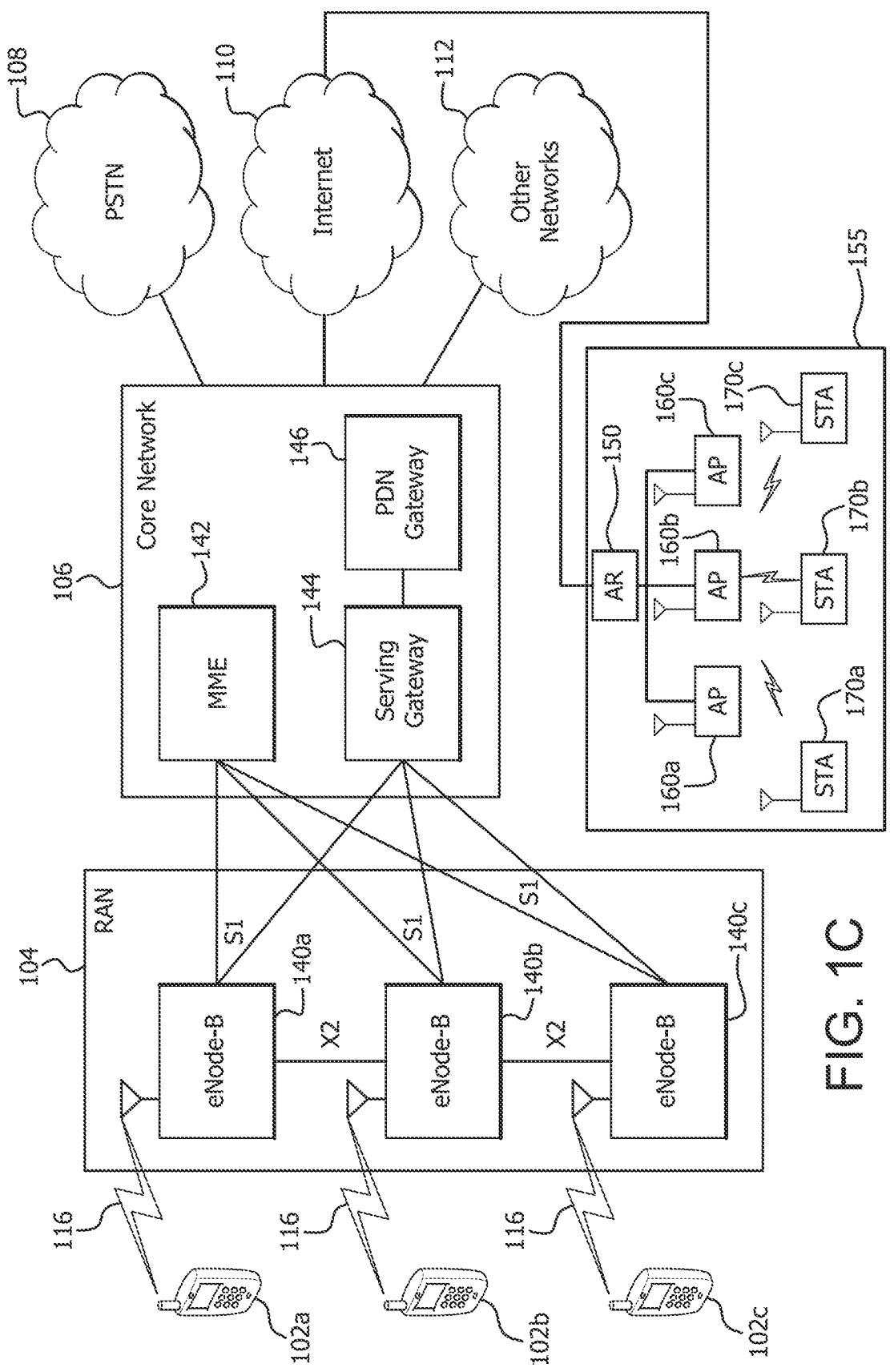
FIG. 1C is a system diagram of an example radio access network and an example core network that may be used within the communications system illustrated in FIG. 1A.

FIG. 1C is a system diagram of the RAN 104 and the core network 106 according to an embodiment. As noted above, the RAN 104 may employ an E-UTRA radio technology to communicate with the WTRUs 102a, 102b, 102c over the air interface 116. The RAN 104 may also be in communication with the core network 106.

The RAN 104 may include eNode-Bs 140a, 140b, 140c, though it will be appreciated that the RAN 104 may include any number of eNode-Bs while remaining consistent with an embodiment. The eNode-Bs 140a, 140b, 140c may each include one or more transceivers for communicating with the WTRUs 102a, 102b, 102c over the air interface 116. In one embodiment, the eNode-Bs 140a, 140b, 140c may implement MIMO technology. Thus, the eNode-B 140a, for example, may use multiple antennas to transmit wireless signals to, and receive wireless signals from, the WTRU 102a.

Each of the eNode-Bs 140a, 140b, 140c may be associated with a particular cell (not shown) and may be configured to handle radio resource management decisions, handover decisions, scheduling of users in the uplink and/or downlink, and the like. As shown in FIG. 1C, the eNode-Bs 140a, 140b, 140c may communicate with one another over an X2 interface.

The core network 106 shown in FIG. 1C may include a mobility management gateway (MME) 142, a serving gateway 144, and a packet data network (PDN) gateway 146. While each of the foregoing elements are depicted as part of the core network 106, it will be appreciated that any one of these elements may be owned and/or operated by an entity other than the core network operator.

The MME 142 may be connected to each of the eNode-Bs 142a, 142b, 142c in the RAN 104 via an S1 interface and may serve as a control node. For example, the MME 142 may be responsible for authenticating users of the WTRUs 102a, 102b, 102c, bearer activation/deactivation, selecting a particular serving gateway during an initial attach of the WTRUs 102a, 102b, 102c, and the like. The MME 142 may also provide a control plane function for switching between the RAN 104 and other RANs (not shown) that employ other radio technologies, such as GSM or WCDMA.

The serving gateway 144 may be connected to each of the eNode Bs 140a, 140b, 140c in the RAN 104 via the S1 interface. The serving gateway 144 may generally route and forward user data packets to/from the WTRUs 102a, 102b, 102c. The serving gateway 144 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 144 may also be connected to the PDN gateway 146, which may provide the WTRUs 102a, 102b, 102c with access to packet-switched networks, such as the Internet 110, to facilitate communications between the WTRUs 102a, 102b, 102c and IP-enabled devices. An access router (AR) 150 of a wireless local area network (WLAN) 155 may be in communication with the Internet 110. The AR 150 may facilitate communications between APs 160a, 160b, and 160c. The APs 160a, 160b, and 160c may be in communication with STAs 170a, 170b, and 170c.

The core network 106 may facilitate communications with other networks. For example, the core network 106 may provide the WTRUs 102a, 102b, 102c with access to circuit-switched networks, such as the PSTN 108, to facilitate communications between the WTRUs 102a, 102b, 102c and traditional land-line communications devices. For example, the core network 106 may include, or may communicate with, an IP gateway (e.g., an IP multimedia subsystem (IMS) server) that serves as an interface between the core network 106 and the PSTN 108. In addition, the core network 106 may provide the WTRUs 102a, 102b, 102c with access to the networks 112, which may include other wired or wireless networks that are owned and/or operated by other service providers.

A WLAN in infrastructure basic service set (BSS) mode has an AP for the BSS and one or more stations (STAs) (also referred to herein as WTRUs) associated with the AP. As used in the embodiments described hereinafter, a WTRU may include, but is not limited to, a STA or a communication device.

The AP typically has access or an interface to a distribution system (DS) or another type of wired/wireless network that carries traffic in and out of the BSS. Traffic to WTRUs that originates from outside the BSS arrives through the AP and may be delivered to the WTRUs. Traffic originating from WTRUs to destinations outside the BSS may be sent to the AP to be delivered to the respective destinations. Traffic between WTRUs within the BSS may also be sent to through the AP where the source WTRU sends traffic to the AP and the AP delivers the traffic to the destination WTRU. Such traffic between WTRUs within a BSS may be peer-to-peer traffic. Such peer-to-peer traffic may also be sent directly between the source and destination WTRUs with a direct link setup (DLS) using an 802.11e DLS or an 802.11z tunneled DLS (TDLS). A WLAN in Independent BSS mode may have no AP and WTRUs that communicate directly with each other.

Coordinated multi-point (CoMP) transmission/reception may be considered for LTE-Advanced (LTE-A) to improve the coverage of high data rates, improve the cell-edge throughput, and/or to increase system throughput in both high load and low load scenarios. CoMP in LTE may be applied in the downlink or the uplink.

In a Joint Transmission (JT) CoMP scheme, data may be shared between base stations and is available at each cooperating cell. With a JT CoMP scheme being applied, a WTRU may receive its desired signals from multiple transmitting points (or cells) in such a way that the received signal to interference and noise ratio may be improved. The reasons why the received signal to interference and noise ratio may be improved are twofold. The first may be due to received signal strength improvement, and the second may be due to received interference strength deduction.

The Coordinated Beamforming/Coordinated Scheduling (CS/CB) may not require any data sharing between cells. The data may only be available at, and transmitted from, the serving cell. However, the user scheduling and beamforming decisions may be made with coordination among the cells in the set of cooperating cells. For CS/CB CoMP, the potential gains may be obtained from the fact that the received interference strength of a WTRU may be reduced in such a way that the received signal to interference and noise ratio is improved. The CS/CB CoMP may have a lower implementation complexity and a lower requirement on backhaul capacity than JT CoMP.

Dynamic Transmission Point Selection may also be referred to as Downlink CoMP. Dynamic cell selection may refer to the technique where at any given moment there is only one transmission point, for example, a single cell transmitting to the WTRU. The transmission point may change dynamically and may not be the serving cell. Similar to JT CoMP, data may be shared between base stations and may be available at each cooperating cell. Based on each cell's instantaneous channel to the WTRU, dynamic selection may be used to determine which cell may be transmitting to the WTRU. For example, the cell that has the highest SINR to the WTRU may be selected to transmit in that subframe.

In uplink CoMP, cell edge user throughput may be improved by coordinating signal reception from different cells. In joint reception and processing, the system may utilize antennas at different cell sites to form a virtual antenna array. The resulting signals may be combined and processed to create the final output signal. This example may require a large capacity backhaul between the eNBs. In coordinated scheduling, the scheduling decisions of the eNBs may be coordinated to minimize the interference.

Coordinated Transmissions may be performed in 802.11ad. For example, coordinated beamforming within a personal basic service set (PBSS) may be implemented in 802.11ad. A PBSS central point (PCP) may request a pair of WTRUs that intend to conduct directional transmissions to each other to conduct a directional measurement, while another pair of WTRUs may be actively transmitting directionally. Subsequently, the PCP may request the second pair of WTRUs to conduct directional measurements, while the first pair of WTRUs may transmit directionally to each other. If both pairs of WTRUs report little or no interference from each other's transmissions, the two pairs of WTRUs may be scheduled in the same Service Period (SP) to conduct concurrent directional transmissions.

Figure 2:
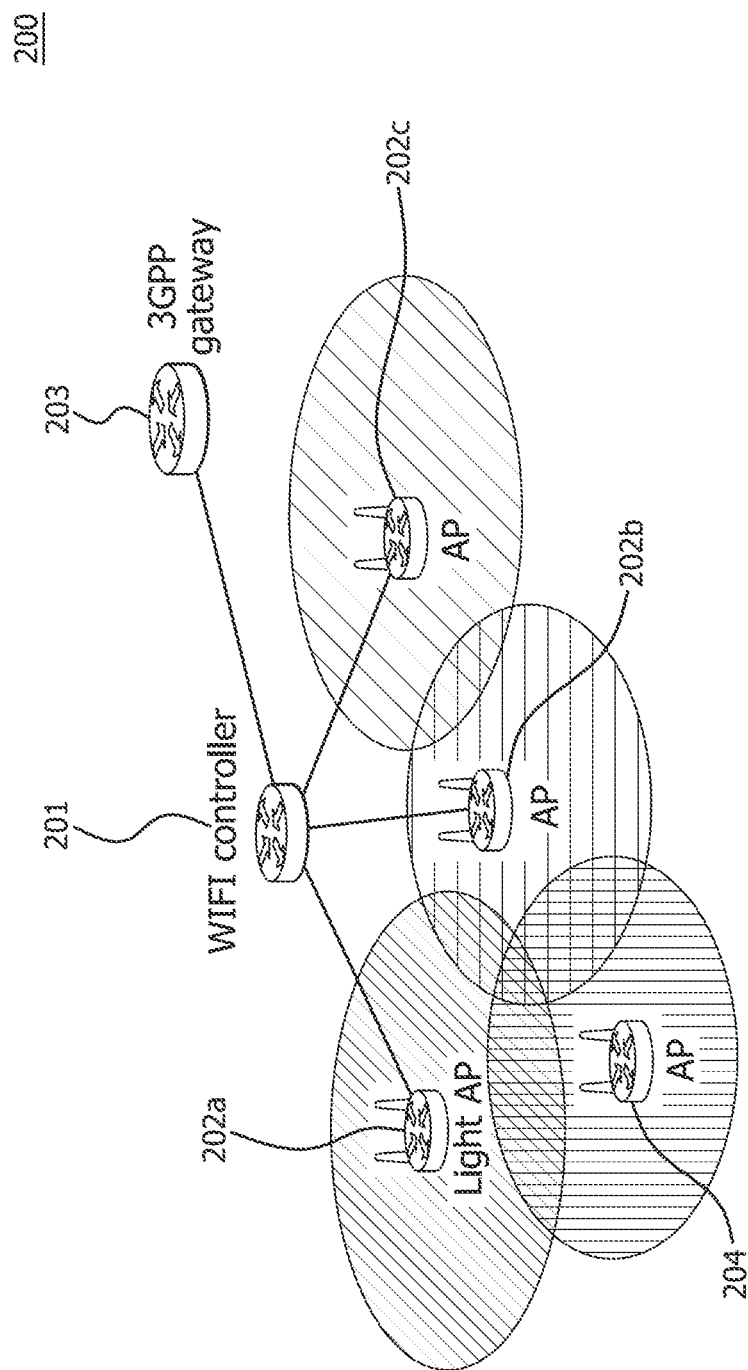
FIG. 2 is a diagram of an example wireless fidelity (WiFi) hotspot deployment.

FIG. 2 is a high level diagram of the various use cases that may be used for WiFi hotspot deployment 200. A first use case may include use of a fixed network interconnected to the cellular core network via a 3GPP gateway 203 resulting in a high layer interconnection. This fixed network connection may be used with a WiFi controller 201. A second use case for WiFi hotspot deployment may cluster APs 202a, 202b, 202c with the WiFi controller 201. In yet another use case for WiFi hotspot, a stand-alone AP 204 may be used. WTRUs associated with the APs may experience poor downlink (DL)/uplink (UL) performance when located a farther distance from the associated AP, or when the WTRUs do not have acceptable channel conditions compared to other WTRUs in the BSS or overlapping BSS (OBSS). For example, when the WTRU is located at a long distance from the AP, its throughput performance may be significantly limited when compared to other WTRUs that may be located closer to the AP.

Figure 3A:
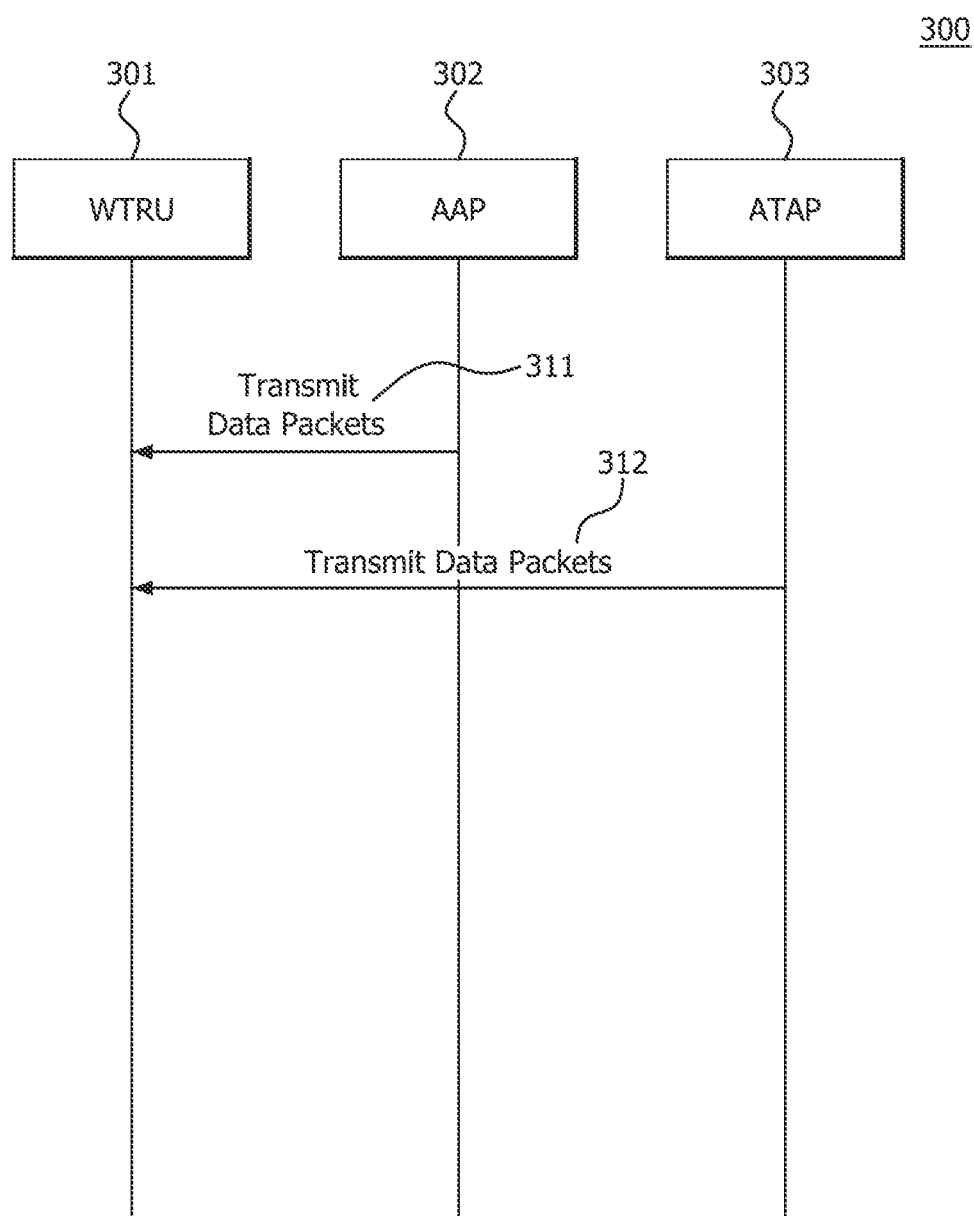
FIG. 3A is a high level signal flow diagram of multi-AP coordinated joint transmission.
Figure 3B:
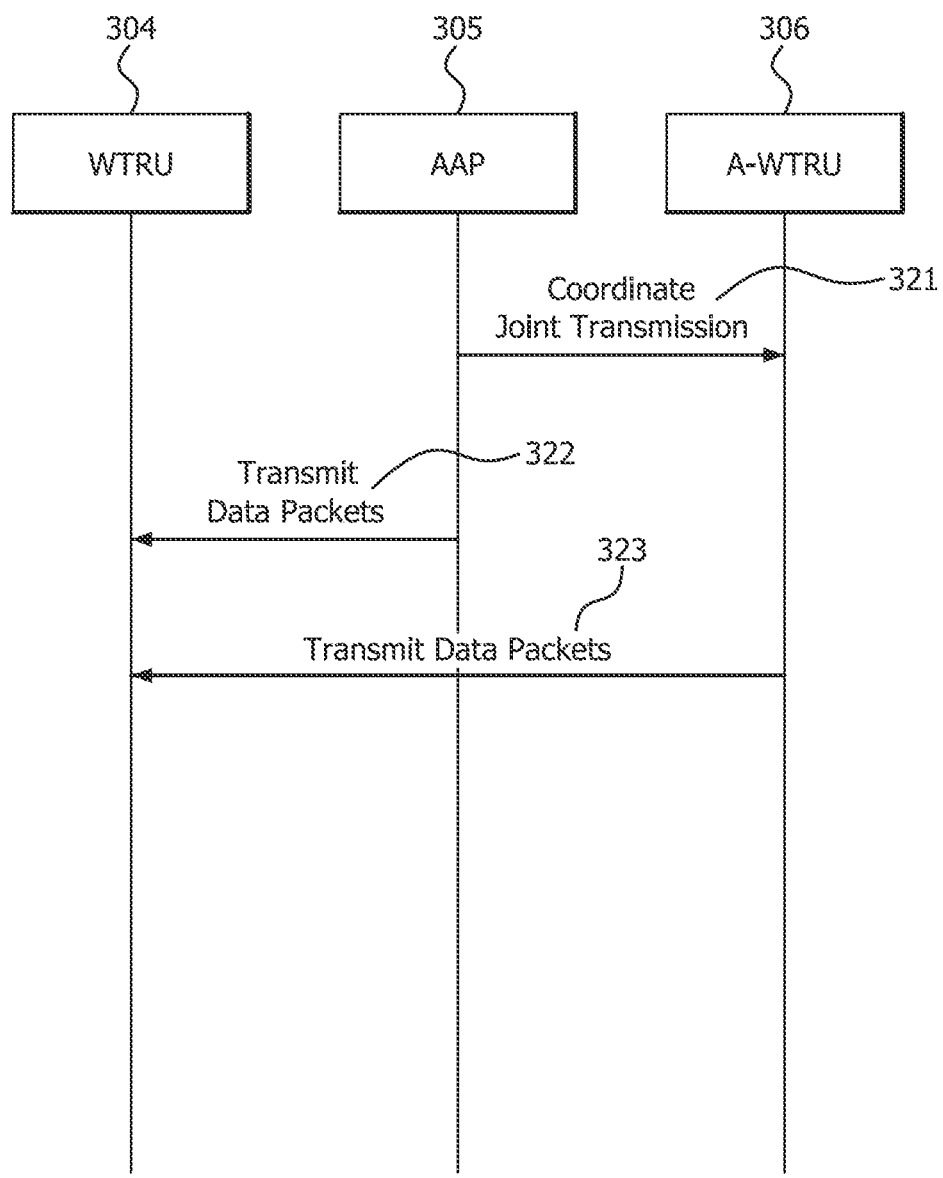
FIG. 3B is a high level signal flow diagram of multi-WTRU coordinated joint transmission in the downlink.
Figure 3C:
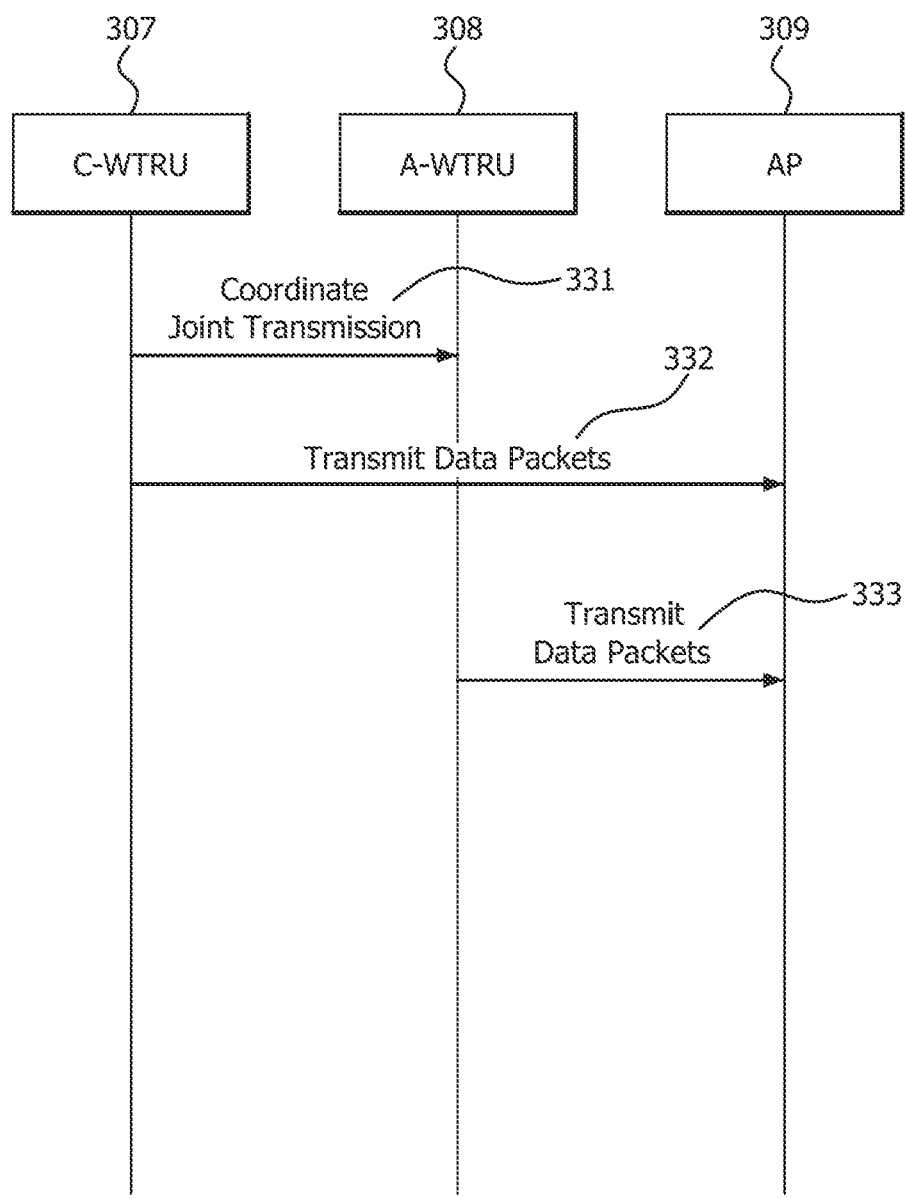
FIG. 3C is a high level signal flow diagram of multi-WTRU coordinated joint transmission in the uplink.

FIG. 3A-3C show examples of coordinated joint transmissions in accordance with a first embodiment, which may provide more uniform DL/UL throughput performance for all WTRUs in a WLAN BSS or an OBSS. In the first embodiment, multiple WTRUs or multiple APs may conduct joint transmission to the same receiving WTRU or AP either concurrently or sequentially. This may enable more uniform performance for all WTRUs and APs in a BSS or OBSS. Joint transmissions may also allow DL transmission and UL transmission to be conducted at higher average rates resulting in higher DL and UL throughput performance. Joint transmissions may be used in situations including but not limited to the following: (1) when a WTRU is located too great of a distance from an AP; (2) when the instantaneous channel between the WTRU and the AP experiences poor quality due to mobility, limited power, fading, and interference; (3) or when the DL/UL throughput is limited.

FIG. 3A shows a high level signal flow diagram of an example coordinated multi-AP joint transmission 300. The AP with which WTRU 301 may be associated may be referred to as the Associated AP (AAP) 302. A second AP participating in the multi-AP transmission to receiving WTRU (R-WTRU) 301 may be referred to as the Assistant AP (ATAP) 303. In this example, AAP 302 may transmit data packets 311 to WTRU 301. ATAP 303 may also transmit the same data packets 312 to WTRU 301. As an alternative to transmitting the same data packets 311 and 312 to WTRU 301, the transmitted data packets from AAP 302 and ATAP 303 may be different versions of the same data packets. For example, the data packets from the AAP 302 and the ATAP 303, may be coded using different data rates, transmitted using different MCS, space-time block coded (STBC), or using Hybrid ARQ (HARQ) schemes. In the example of FIG. 3A, the coordinated multi-AP joint transmission may be conducted either concurrently or sequentially. In the sequential transmission scheme, AAP 302 and the ATAP 301 may transmit sequentially to receiving WTRU 301 with or without delay between their transmissions.

FIG. 3B shows a high level signal flow diagram of an example multi-WTRU coordinated joint transmission, in which an AP and at least one WTRU may transmit to a receiving WTRU in the downlink. In the example of FIG. 3B, a multi-WTRU downlink joint transmission is performed. AAP 305 may coordinate a joint transmission 321 with a non-AP referred to as an Assistant WTRU (A-WTRU) 306 to a receiving WTRU 301. AAP 305 may transmit data packets 322 to WTRU 304. A-WTRU 306 may also transmit the same data packets 323 to WTRU 304. As an alternative to transmitting the same data packets 322 and 323 to WTRU 304, the transmitted data packets from AAP 305 and A-WTRU 306 may be different versions of the same data packets. In the example of FIG. 3B, the coordinated multi-WTRU joint transmission in the downlink may be conducted either concurrently or sequentially. In the sequential transmission scheme, AAP 305 and the A-WTRU 306 may transmit sequentially to receiving WTRU 304 with or without delay between their transmissions.

FIG. 3C shows a high level signal flow diagram of an example multi-WTRU coordinated uplink joint transmission. In the example of FIG. 3C, a non-AP referred to as a coordinating WTRU (C-WTRU) 307 may coordinate an UL joint transmission 331 in with an assistant WTRU (A-WTRU) 308 to a receiving AP 309. C-WTRU 307 may transmit data packets 332 to AP 309. A-WTRU 308 may also transmit the same data packets 333 to AP 309. As an alternative to transmitting the same data packets 332 and 323 to AP 309, the transmitted data packets from C-WTRU 307 and A-WTRU 308 may be different versions of the same data packets. In the example of FIG. 3C, the coordinated multi-WTRU joint transmission in the uplink may be conducted either concurrently or sequentially. In the sequential transmission scheme, C-WTRU 307 and A-WTRU 308 may transmit sequentially to receiving AP 309 with or without delay between their transmissions.

Figure 4:
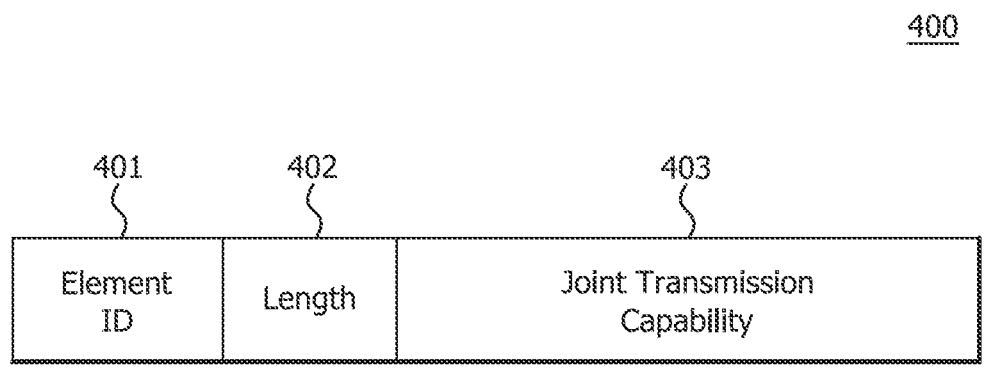
FIG. 4 is a diagram of an example Joint Transmission Capability Information Element (IE)

FIG. 4 shows an example of a joint transmission capability information element (IE) that an AP or WTRU may use as a joint transmission capability indication in accordance with the first embodiment 400. An AP or WTRU may indicate its capability for multi-AP or multi-WTRU joint transmission using a joint transmission capability IE in its beacon or in another management or control frame including but not limited to a probe request/response frame, association request/response frame, action frame, or action no ACK frame. A WTRU may also indicate that it is capable of joint transmission by sending a management or control frame which includes a joint transmission capability IE.

The joint transmission capability information element (IE) example design of FIG. 4 may contain the following fields: element ID field 401, length field 402, and joint transmission capability field 403.

The element ID field 401 may indicate that the IE is a joint transmission capability IE. The length field 402 may contain the length of the joint transmission capability IE. The joint transmission capability field 403 may indicate that the device is joint transmission capable. Example indications for the joint transmission capability field 403 are shown in Table 1 below.

TABLE 1

| Indication | Description |
| --- | --- |
| Associated AP Joint Transmission Capable | Capable of joint transmission as the AAP |
| Assistant AP Joint Transmission Capable | Capable of joint transmission as the ATAP |
| Assistant WTRU (A-WTRU) Joint Transmission Capable | Capable of conducting joint transmission as an A-WTRU |
| Assistant AP Coordination Capable | Capable of conducting coordination with an AAP for joint transmission |
| Assistant WTRU (A-WTRU) Coordination Capable | Capable of conducting coordination with an A-WTRU for joint transmission |
| Concurrent Joint Transmission Capable | Capable of concurrent joint transmission |
| Sequential Joint Transmission Capable | STBC capable |
| | Different MCS capable |
| | HARQ capable |
| | Different channel coding capable |
| Concurrent Joint Transmission Reception Capable | Capable of reception of a joint transmission |
| Sequential Joint Transmission Reception Capable | STBC reception capable |
| | Different MCS reception capable |
| | HARQ reception capable |
| | Different channel coding reception capable |
| Joint Transmission Coordination Options | Coordination over DS (Distribution System) capable |
| | Coordination over wireless capable |
| | Coordination control transmission format: Ethernet, 802.11 legacy/a/b/g/n/ac/af/ah, X-1, UMTS, LTE, WiMAX, etc. |
| | Coordination control transmission band and channel: channel numbers as well as frequency bands such as sub 1 GHz as for 802.11af and 802.11ah, 2.4 GHz, 5 GHz, 60 GHz, etc. |

TABLE 1-continued

| Indication | Description |
| --- | --- |
| Data/Control Forwarding Options | TDLS (Tunneled Direct Link Setup)<br>DLS (Direct Link Setup)<br>OCT (On Channel Transfer)<br>Joint transmission forwarding: a forwarding method that is specially designed for forwarding data and control packets associated with joint transmissions<br>Data/Control forwarding over DS capable<br>Data/Control forwarding over wireless capable<br>Data/Control forwarding transmission format: Ethernet, 802.11 legacy/a/b/g/n/ac/af/ah, X-1, UMTS, LTE, etc.<br>Data/Control forwarding transmission band and channel: channel numbers as well as frequency bands such as sub 1 GHz as for 802.11af and 802.11ah, 2.4 GHz, 5 GHz, 60 GHz, etc. |

Although the joint transmission capability indication as designed in Table 1 is described as an IE, any field, subfield, or subset of the elements described herein may be implemented. The IE may be any part of a management frame, control frame, data frame, or any other type of frame. The joint transmission capability indication may include all explicit and implicit signaling, which may include but is not limited to any part of the Physical Layer Convergence Procedure (PLCP) or medium access control (MAC) header, frame body, scrambler initialization seeds, etc.

Figure 5A:
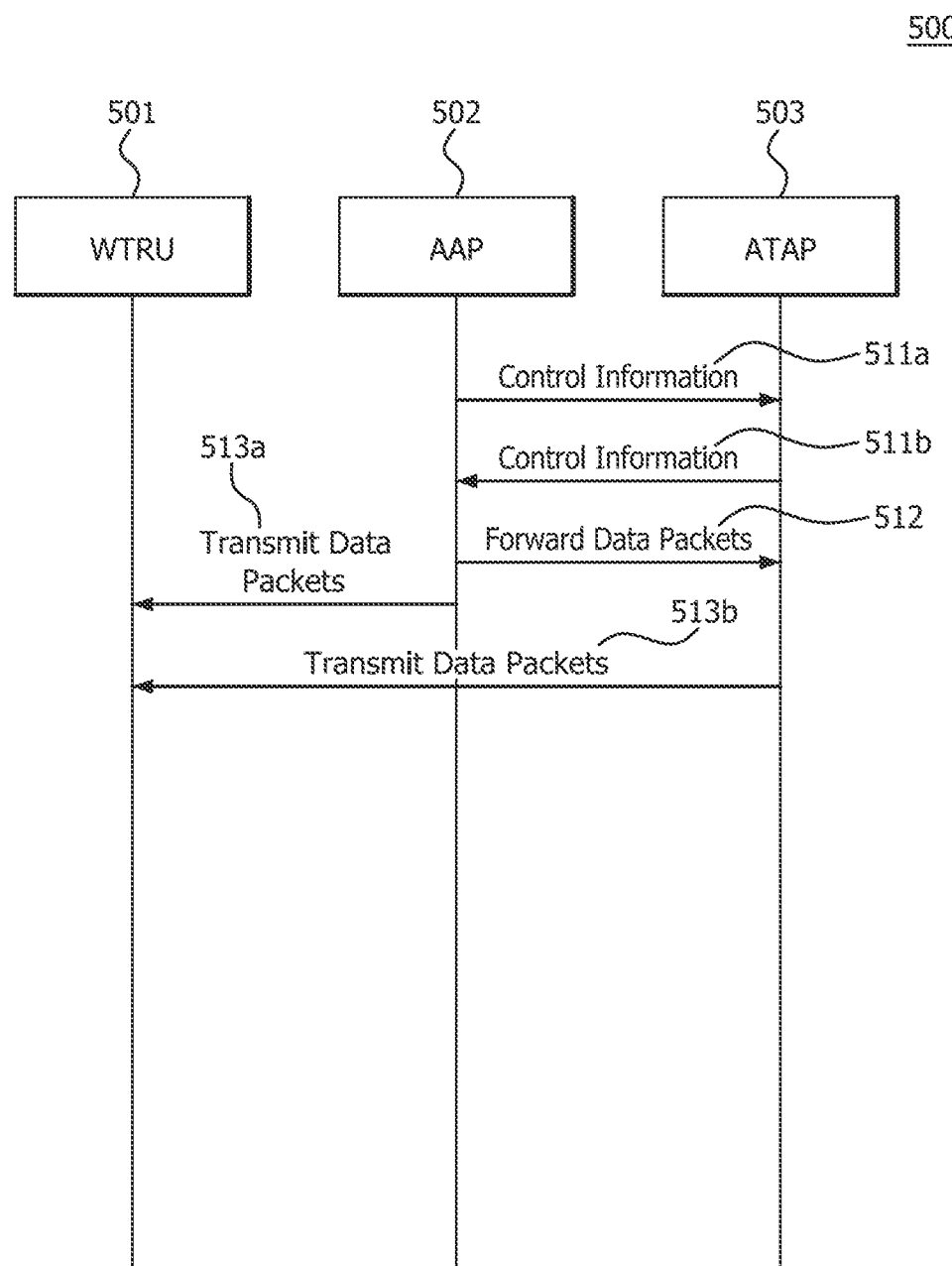
FIG. 5A shows a high level signal flow diagram of an example control information exchange used for coordinated joint transmission.

FIG. 5A shows a high level signal flow diagram of an example control information exchange used for coordinated joint transmissions 500. In the example of FIG. 5A, AAP 502 and ATAP 503 may exchange control information 511a and 511b to prepare to conduct multi-AP joint transmission as described above. Control information 511a may include a joint transmission request. Control information 511b may include a joint transmission response. Additionally or alternatively, AAP 502 may forward data packets 512 to ATAP 503. AAP 502 and ATAP 503 may then transmit the data packets 513a and 513b to receiving WTRU 501 in the joint transmission session. The exchange of the coordination information as well as the forwarding of the associated data packets may take places in at least two ways. First, they may be transmitted wirelessly using the same or a separate wireless interfaces including but not limited to another WLAN, UMTS, LTE, WiMAX interface. Second, they may be transmitted over a wired backhaul link. Control information may be exchanged between WTRUs and between APs and WTRUs for multi-WTRU coordinated joint transmission using the same procedure shown in FIG. 5A.

Figure 5B:
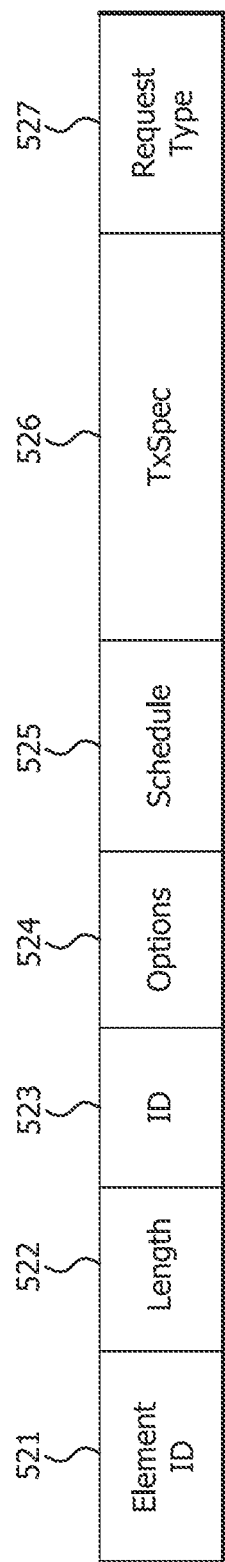
FIG. 5B is a diagram of an example Joint Transmission Request IE.

FIG. 5B shows an example joint transmission request IE that may be used for conducting coordination between an AAP and ATAP and for transmitting coordination control information. A joint transmission request IE may include but is not limited to the following fields and/or information: element ID field 521, length field 522, ID field 523, options field 524, schedule field 525, Transmission Specification (TxSpec) field 526, and request type field 527.

Element ID field 521 that may indicate that the IE is a joint transmission request IE. Length field 522 may contain the length of the joint transmission request IE.

ID field 523 may contain one or more IDs shown in Table 2 below. The ID(s) may be implemented as a MAC address, a BSSID, an SSID, an AID, or any other type of IDs that the WTRUs may agree upon.

TABLE 2

| Example ID | Description |
| --- | --- |
| Receiving WTRUs that are the recipient of the joint transmission | ID of the WTRU(s) receiving data packets in the joint transmission |
| Requesting AAP | ID of the requesting AAP |
| ATAP being requested | ID of ATAP being requested |
| Session ID | Sequence number identifying a particular joint transmission session to a particular receiving WTRU or requested by a particular AAP |

The Options field 524 may contain various options for the joint transmissions. Example contents of the Options field are shown in Table 3.

TABLE 3

| Example Options | Description |
| --- | --- |
| Number of joint transmission packets | The number of packets may be expected to be transmitted during the joint transmission sessions |
| Size of joint transmission packets/time/TXOP | The size of the joint transmission packets may be specified in bytes, in transmission time or in TXOP expressed in microseconds or any other time units |
| Data rate (or MCS) expected for the joint transmission session | Data rate (or MCS) to be used in joint transmission |
| Duration of joint transmission session | Duration to be used in joint transmission |
| Concurrent Joint Transmission | The ATAP may conduct concurrent joint transmission |

TABLE 3-continued

| Example Options | Description |
| --- | --- |
| Sequential Joint Transmission | The ATAP may conduct sequential joint transmission. The ATAP may use one or more of the following specifications to construct the PPDU or PSDU frames containing the data packets forwarded to it by the AAP according to the channel conditions between itself and the receiving WTRU and/or its own transmitting capabilities. These specifications may include STBC, different MCS, HARQ, and different channel coding. |
| Scheduled Joint Transmission | The ATAP may conduct joint transmission at a scheduled time according to the Schedule specified by the AAP. |
| Coordination Information Forwarding Option | TDLS<br>DLS<br>OCT<br>Joint Transmission Forwarding: a forwarding method that may be designed for forwarding data and control packets associated with Joint Transmissions<br>Forwarding over Distribution System (DS)<br>Forwarding over wireless<br>Forwarding transmission format: Ethernet, 802.11 legacy/a/b/g/n/ac/af/ah, X-1, UMTS, LTE, etc.<br>Forwarding transmission band and channel: channel numbers as well as frequency bands such as sub 1 GHz as for 802.11af and 802.11ah, 2.4 GHz, 5 GHz, 60 GHz, etc. |
| Data Forwarding Options | TDLS<br>DLS<br>OCT<br>Joint Transmission Forwarding: a forwarding method that may be designed for forwarding data and control packets associated with Joint Transmissions<br>Forwarding over DS<br>Forwarding over wireless<br>Forwarding transmission format: Ethernet, 802.11 legacy/a/b/g/n/ac/af/ah, X-1, UMTS, LTE, etc.<br>Forwarding transmission band and channel: channel numbers as well as frequency bands such as sub 1 GHz as for 802.11af and 802.11ah, 2.4 GHz, 5 GHz, 60 GHz, etc. |
| Medium Access Control Options | CTS forwarding options: Similar to Coordination Information Forwarding as described above |

The TxSpec field 526 may include transmission specifications that may be associated with the joint transmissions. Example contents of the TxSpec field 526 are shown in Table 4. The TxSpec 526 may be implemented such that it may be similar to the PHY service primitive, TXVECTOR, or it may be a modified version of the TXVECTOR and may specify an MCS, a transmit power, a channel matrix, and/or a pre-coding matrix, etc. When sequential joint transmission is used, the AAP may include a TxSpec for the ATAP on how to construct the MAC protocol data unit (MPDU), such as frame check sequence (FCS) length, address field values, etc. The ATAP may construct the PLCP header and the associated PLCP service data units (PSDUs)/PLCP protocol data units (PPDUs) based on the TxSpec and the forwarded packets received from the AAP.

TABLE 4

| Example TxSpec | Description |
| --- | --- |
| Channel access method | Scheduled<br>Contention-based<br>Signaled by the AAP |
| AAP transmission specifications | Various transmission specifications, at which the AAP may transmit the original data packet, such as MCS, transmit power, channel matrix, pre-coding matrix, etc. |

TABLE 4-continued

| Example TxSpec | Description |
| --- | --- |
| | The ATAP may be able to determine its most optimal setting to transmit the packets to the receiving WTRUs in the joint transmission session based on the transmission specifications of the AAP and the channel conditions between the ATAP and the receiving WTRU. |

Example contents of the Schedule field 505 are shown in Table 5.

TABLE 5

| Example Schedule | Description |
| --- | --- |
| Scheduled start | The scheduled start time of the joint transmission session; the time may be referenced to the TSF timer of either AP, Greenwich Mean Time (GMT) or any other reference clock. |
| Schedule transmission times | The scheduled transmission times of the joint transmission packets; the times may be referenced to the TSF timer of either AP, GMT or any other reference clock. |
| Scheduled frequency | How often a joint transmission may take place |
| Scheduled end | The scheduled end of the joint transmission session |
| Current TSF timer | The current TSF timer of the AAP; the times in this schedule may use the TSF timer of the AAP as the reference. Alternatively, the reference clock may be specified using this field as well. |
| Estimated mutual clock drift | This subfield may contain the estimated clock drift between the reference clock and the local clock at the ATAP. The estimated clock drift may also be estimated by monitoring the beacons, short beacons, sync packets, or any other types of frames that may contain a clock reference time. |

Example contents of the Request type field 507 are shown in Table 6.

TABLE 6

| Example Request | Description |
| --- | --- |
| New joint transmission request | |
| Joint transmission request renewal | Renewal of the current or previous joint transmission session request |
| End | The end of the joint transmission session. |

Although the joint transmission request is described in the form of an IE in FIG. 5B, any field, subfield, or subset of the elements discussed may be implemented as any part of a management frame, control frame, data frame, or any other type of frame. These frames may include all explicit and implicit signaling, such as any part of the PLCP/MAC header, frame body, and/or scrambler initialization seeds, etc. The joint transmission request may also be implemented as frames or fields of frames in other types of communication systems such as, for example, LTE, UMTS, any WiFi standards, and Ethernet, etc. For example, it may be implemented using the Ethertype 89-0d, with a Payload Type set to 4 or any other numbers between 4-255 to indicate that the frame may contain a Joint Transmission Protocol, or may be related to multi-AP transmission protocol frames. Additional fields may be included to indicate that the frame contained may be of the subtype Joint Transmission Request Packet (JDReq). Session IDs may identify a particular joint transmission session to one or more receiving WTRUs. The receiving WTRUs may be a set of receiving WTRUs. An ID of the frame, for example, the sequence number of the packet in the joint transmission session identified by the session ID, ID of the AAP, and/or ID of the ATAP may be included as an additional field.

Figure 6:
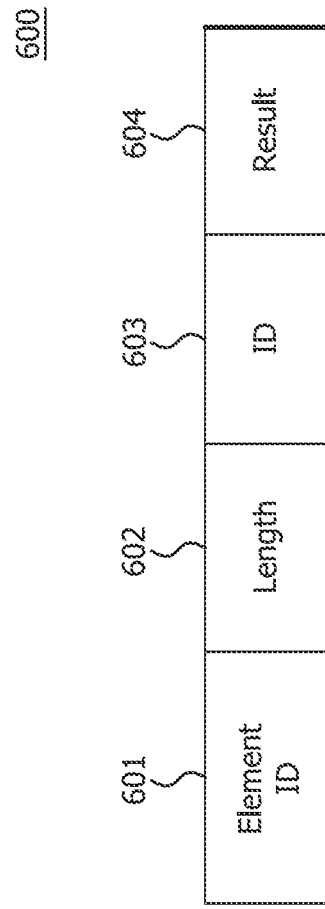
FIG. 6 is a diagram of an example Joint Transmission Response IE.

FIG. 6 shows an example of a joint transmission response IE that the ATAP may transmit to the AAP after receiving the joint transmission request in the control information from the AAP 600. The joint transmission response IE may be included in its individual frame, a management frame, control frame, or any other type of frame that may contain the joint transmission response IE. The joint transmission response IE may include but is not limited to the following fields and/or information: element ID field 601, length field 602, ID field 603, and result field 604.

Element ID field 601 may indicate that the IE is a joint transmission response IE. The length field 602 may contain the length of the joint transmission response IE. The ID field 603 may contain one or more IDs of receiving WTRUs that may be the recipient of the joint transmission. Example contents of the ID field 603 are shown in Table 7. The ID(s) may be implemented as a MAC address, a BSSID, an SSID, an AID, or any other type of ID that the WTRUs may agree upon.

TABLE 7

| Example ID | Description |
| --- | --- |
| Requesting AAP | |
| ATAP being requested | |
| Session ID | Sequence number identifying a particular joint transmission session to a particular receiving WTRU or requested by a particular AAP |
| ID of the frame | For example, the sequence number of the packet in the joint transmission session identified by the session ID. |

Example contents of the Result field 604 are shown in Table 8.

TABLE 8

| Example Result | Description |
| --- | --- |
| Accept | The ATAP may participate in the requested joint transmission session as specified by the Joint Transmission Request frame. |
| Reject | The ATAP may not participate in the requested joint transmission session as specified by the Joint Transmission Request frame. Example reasons to reject may include one or more of the following: No joint transmission capability, No links to the receiving WTRU, Unacceptable TxSpec, Temporary disabling joint transmission, High traffic load/congestion, Unknown receiving WTRU, Unacceptable schedule, Circumstances change and the ATAP cannot longer accommodate the Joint Transmission Session, and/or, None. |

Figure 7A:
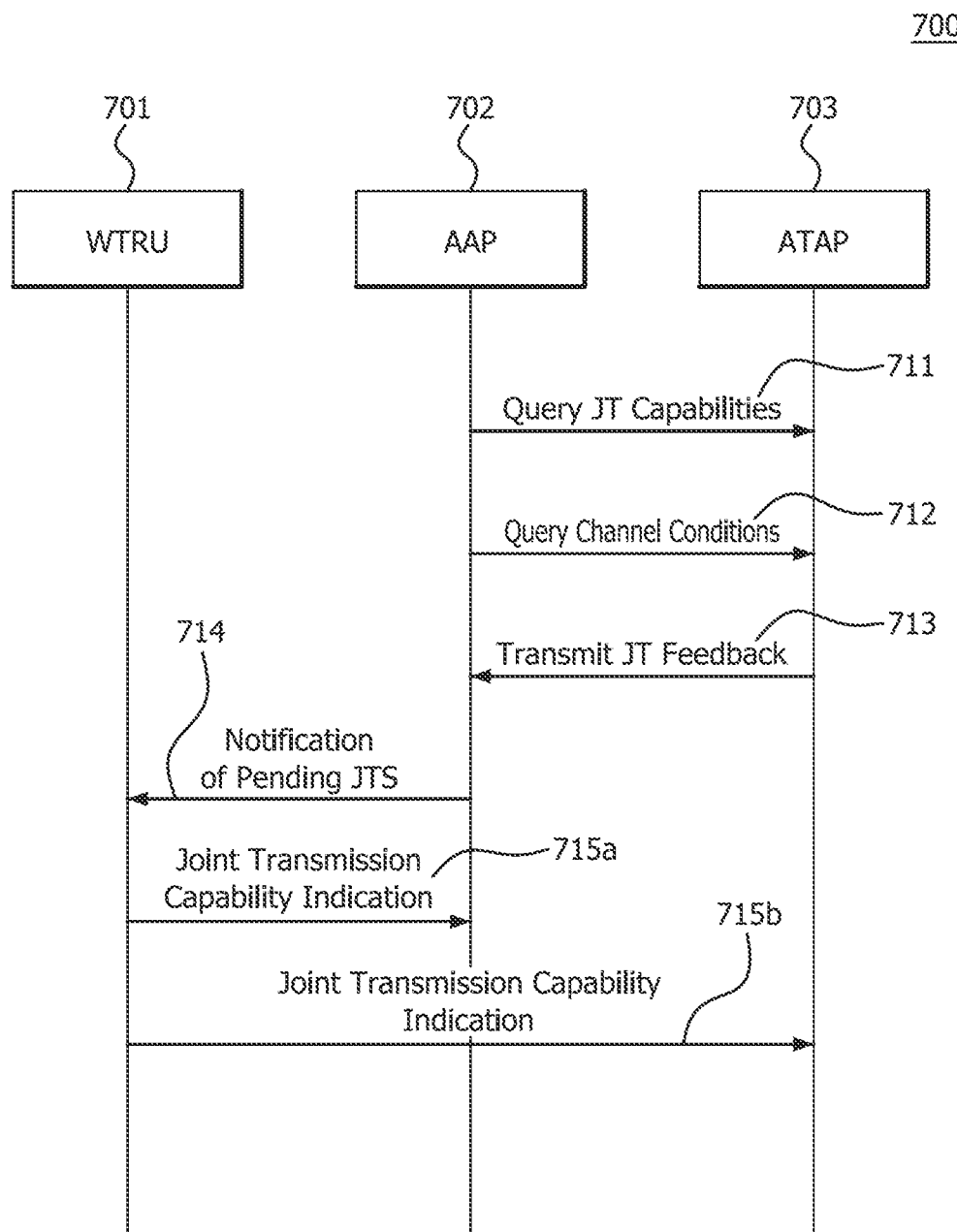
FIG. 7A shows an example flow diagram for determining joint transmission capabilities in APs and preparing for joint transmission.

FIG. 7A shows an example flow diagram for determining joint transmission capabilities in APs and preparing for joint transmission 700. In the example of FIG. 7A, AAP 702 may query another AP or ATAP 703 on its joint transmission (JT) capabilities 711 and/or on its channel conditions 712 associated with one or more WTRUs that are targeted for joint transmissions. ATAP 703 may respond with joint transmission feedback 713. WTRU 701 may then receive notification of the pending joint transmission session 714 from AAP 702. WTRU 701 before participating in the reception of joint transmissions may indicate its joint transmission and reception capability by transmitting to AAP 702 and/or ATAP 703 a joint transmission capability indication 715a and 715b in any management frame, control frame, or any other type of frame such as Probe Request, Association Request, etc. Alternatively, if concurrent joint transmission is conducted, the joint transmission session may take place transparently to the receiving WTRU. WTRU 701 may also indicate that it is capable of receiving sequential joint transmissions.

Figure 7B:
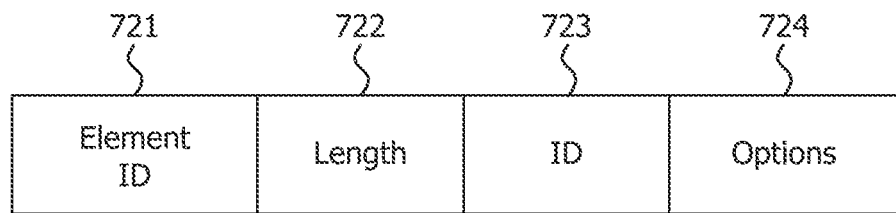
FIG. 7B is a diagram of an example Joint Transmission Query IE.

The AAP may use a joint transmission query frame or any type of frame containing a joint transmission query IE for querying the JT capabilities of an ATAP. FIG. 7B shows an example of a joint transmission query IE. The joint transmission query IE may include but is not limited to the following fields and/or information: an element ID field 721, length field 722, ID field 723, and options field 724.

Element ID field 721 may indicate that the IE is a joint transmission query IE. Length field 722 may contain the length of the joint transmission query IE.

ID field 723 may contain one or more IDs of receiving WTRUs about which the AAP is querying. The ID(s) may be implemented as a MAC address, a BSSID, an AID, or any other type of ID that the WTRUs may agree upon. A pre-established generic ID or the ID of the AP that is being queried may be used to indicate that the joint transmission query frame is meant to query the joint transmission capability of the AP.

Options field 724 may contain information on the content of the feedback requested and may include indications shown in Table 9.

TABLE 9

| Example Indication | Description |
| --- | --- |
| Channel feedback | Compressed or uncompressed, between the AP being queried and the receiving WTRU |
| Capabilities of joint transmission | Indicates capabilities of joint transmission |
| Channel feedback | Compressed or uncompressed, between the querying AP and the AP being queried |
| Preferred Joint Transmission Parameters | The AP being queried may provide preferred Joint Transmission Options as well as TxSpec. Preferred TxSpec may be for each receiving WTRU. Preferred Joint Transmission Options may be as explained for the Joint Transmission Request IE. |

Figure 7C:
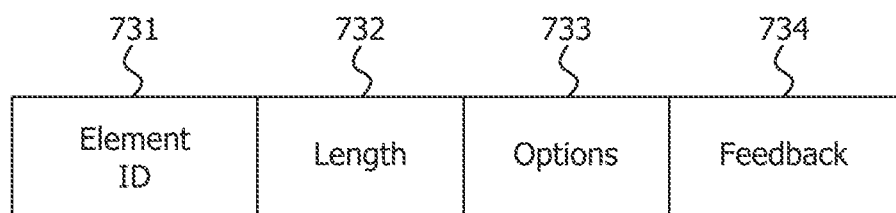
FIG. 7C is a diagram of an example Joint Transmission Feedback IE.

The ATAP may use joint transmission feedback frame or any type of frame containing a joint transmission feedback IE for responding to the JT capabilities query by the AAP. FIG. 7C provides an example of the joint transmission feedback IE. The joint transmission feedback IE may include but is not limited to the following fields and/or information: element ID field 731, length field 732, options field 733, and feedback frame 734.

Element ID field 731 may indicate that the IE is a joint transmission feedback IE. Length field 732 may contain the length of the joint transmission feedback IE. Options field 733 may contain joint transmission capabilities and preferred joint transmission options for the transmitting AP.

Feedback field 734 may contain the feedback of one or more WTRUs. Example contents of the Feedback field 734 are shown in Table 10.

TABLE 10

| Example Feedback | Description |
| --- | --- |
| Number of feedback fields | Number of feedback fields included |
| Feedback field 1-N | ID: the ID of the receiving WTRU that was queried by the Querying AP or the ID of the querying AP if the feedback field contains the feedback for the querying AP; this may be implemented as MAC addresses, AID, or any other type of IDs that the WTRUs agree upon<br>Channel feedback between the transmitting AP and the WTRU indicated in the ID field<br>Preferred Joint Transmission Options for this WTRU<br>Preferred Joint Transmission TxSpec for this WTRU |

The AAP may use joint transmission notification frame or any type of frame containing a joint transmission notification IE or fields or subfields thereof for notifying the receiving WTRU of the pending joint transmission session (JTS) once the AAP and the ATAP have agreed on a JTS. This notification may be used by the receiving WTRU in a non-transparent JTS, in which a receiving WTRU may be aware that it is receiving similar or related data from more than two APs. For example, in a non-transparent JTS, the AAP and the ATAP may transmit MPDUs that may be associated with a particular data packet but with different TA addresses in the header. It may also be important to notify the receiving WTRU of the pending scheduled joint transmission so that the receiving WTRU does not go into a sleep state for power saving.

Figure 7D:
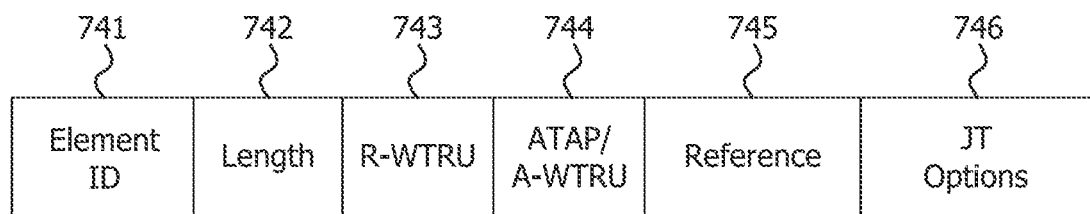
FIG. 7D is a diagram of an example Joint Transmission Notification IE.

FIG. 7D shows an example design of the joint transmission notification IE. The joint transmission notification IE may include but is not limited to the following fields and/or information: element ID field 741, length field 742, receiving WTRU (R-WTRU) field 743, ATAP/A-WTRU field 744, reference field 745, and joint transmission (JT) options field 746.

Element ID field 741 may indicate that the IE is a joint transmission notification IE. Length field 742 may contain the length of the joint transmission notification IE. Reference field 745 may contain one or more references to the pending JTS, such as the ID or the sequence number of the JTS.

The R-WTRU field 743 may contain one or more IDs of the R-WTRUs for the JTS. The IDs may be implemented as MAC addresses, AIDs, etc. The R-WTRU field 743 may not be included in a frame when the IDs or addresses of the intended R-WTRUs may already be included in the MAC header as a group or individual address.

ATAP field 744 may contain one or more IDs of the ATAP assigned to the receiving WTRU (R-WTRU) for the pending JTS. The IDs may be implemented as MAC addresses, BSSIDs, SSIDs, AIDs, etc.

JT Options field 746 may contain various options for the joint transmissions. Example contents of JT Options field 746 are shown in Table 11.

TABLE 11

| Example JT Option | Description |
| --- | --- |
| Number of joint transmission packets | The number of packets that may be expected to be transmitted during the joint transmission sessions |

TABLE 11-continued

| Example JT Option | Description |
| --- | --- |
| Size of joint transmission packets/time/TXOP | The size of the joint transmission packets may be specified in bytes, in transmission time or in TXOP expressed in microseconds or any other time units |
| Data rate (or MCS) expected for the joint transmission session | Data rate (or MCS) used for JTS |
| Duration of joint transmission session | Duration used for JTS |
| Concurrent Joint Transmission | The ATAP may conduct concurrent joint transmission |
| Sequential Joint Transmission | The ATAP may conduct sequential joint transmission. The ATAP may use one or more of the following specifications to construct the PPDU or PSDU frames containing the data packets forwarded to it by the AAP according to the channel conditions between itself and the receiving WTRU and/or its own transmitting capabilities. The example specifications may include STBC, different MCS, HARQ, and/or different channel coding. |
| Scheduled Joint Transmission | The ATAP may conduct joint transmission at a scheduled time according to the Schedule specified by the AAP |
| TxSpec | The transmission specifications that are associated with the joint transmissions: The TxSpec may be implemented similar to the TXVECTOR or as a modified version of the TXVECTOR and may specify MCS, transmit power, channel matrix, pre-coding matrix, etc. If sequential joint transmission is used, the AAP may include TxSpec for the ATAP on how to construct the MPDU, such as FCS length, address field values, etc. The ATAP may construct the PLCP header and the associated PSDUs/PPDUs based on the TxSpec and the forwarded packets received from the AAP Channel access method: may include Scheduled, Contention-based, or Signaled by the AAP AAP transmission specifications: Various transmissions specifications at which the AAP transmits the original data packet such as MCS, transmit power, channel matrix, pre-coding matrix, etc. The ATAP may be able to determine its most optimal setting to transmit the packets to the receiving WTRUs in the joint transmission session based on the AAP's transmission specifications and the channel conditions between the ATAP and the receiving WTRU |
| Schedule | Scheduled start: the scheduled start time of the joint transmission session; the time may be referenced to the TSF timer of either AP, GMT or any other reference clock Schedule transmission times: the scheduled transmission times of the joint transmission packets; the times may be referenced to the TSF timer of either AP, GMT or any other reference clock Scheduled frequency: how often a joint transmission takes place Scheduled end: the scheduled end of the joint transmission session Current TSF timer: the current TSF timer of the AAP; the times in this schedule may use the TSF timer of the AAPs as the reference. Alternatively, the reference clock may be specified using this field as well. |

Although the example of the various joint transmission frames in FIGS. 7B-7D are described in the form of an IE, any field or subfield or subset of the elements discussed may be implemented as any part of a management frame, control frame, data frame, or other type of frame. These frames may include all explicit and implicit signaling such as any part of the PLCP/MAC header, frame body, and/or scrambler initialization seeds, etc. The Joint Transmission frames may also be implemented as frames, or fields of frames, in another type of communication system, for example, LTE, UMTS, any WiFi standard, and/or Ethernet, etc. For example, the frame may be implemented using the Ethertype 89-0d, with a Payload Type set to 4 or any other numbers between 4-255 to indicate that it contains Joint Transmission Protocol related frames or multi-AP transmission protocol related frames. Additional fields may be included to indicate: that the frame contained is of the subtype joint transmission data packets (JTDP), one or more session IDs to identify a particular joint transmission session to a (set of) receiving WTRUs, an ID of the AAP, an ID of the ATAP, and/or an ID of the R-WTRU.

Figure 8:
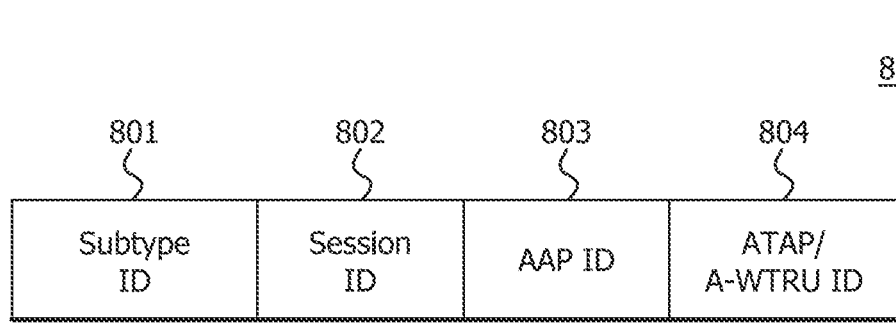
FIG. 8 shows an example of a data packet that may be sent from an AAP to an ATAP to be sent to a receiving WTRU during a joint transmission session.

FIG. 8 shows an example of a data packet that may be sent from an AAP to an ATAP to be sent to a receiving WTRU during a joint transmission session 800. These packets may be referred to as the joint transmission data packets (JTDP). The JTDP may not necessarily be of the type data. However, they may be referred to as data packets since they are packets that are transmitted to the receiving WTRU during the joint transmission sessions. The JTDP may include but is not limited to the following field: subtype ID field 801 that may indicate that the frame contained may be of the subtype JTDP, one or more session ID fields 802 to identify a particular joint transmission session to one or more receiving WTRUs, AAP ID field 803, and/or ATAP/A-WTRU ID field 804.

The JTDP as shown in FIG. 8 may be of the type MAC protocol data units (MPDUs) or MAC service data units (MSDUs). The JTDP may also be of other types of frame which carry MPDU/MSDUs in its frame body. The JTPDs may also be implemented as frames, or fields of frames, in another type of communication system, including but not limited to LTE, UMTS, any WiFi standards, and/or Ethernet, etc. For example, the frames may be implemented using the Ethertype 89-0d, with a Payload Type set to 6 or any other numbers between 4-255 to indicate that they contain Joint Transmission Protocol frames or multi-AP transmission protocol data frames.

When concurrent joint transmission is used, the AAP may forward to the ATAP the original MPDUs and the transmission specifications to be used in accordance with the methods described above. The original MPDUs may be identical to the ones that the AAP may be transmitting to the receiving WTRUs during the joint transmission. In concurrent joint transmission, both the AAP and the ATAP may transmit identical PPDUs including the address fields in the MAC headers.

When sequential or scheduled joint transmission is used, the AAP and the ATAP may transmit different PPDUs in accordance with the methods described above. The AAP may forward the original MSDUs to the ATAP along with the transmission specifications for the AAP and/or for the ATAP. The AAP may determine the transmission specification for the ATAP when transmitting during the joint transmission session. Alternatively or additionally, the ATAP may determine its own transmission specifications based on the channel condition between itself to the receiving WTRU and/or the transmission specifications used by the AAP.

Figure 9:
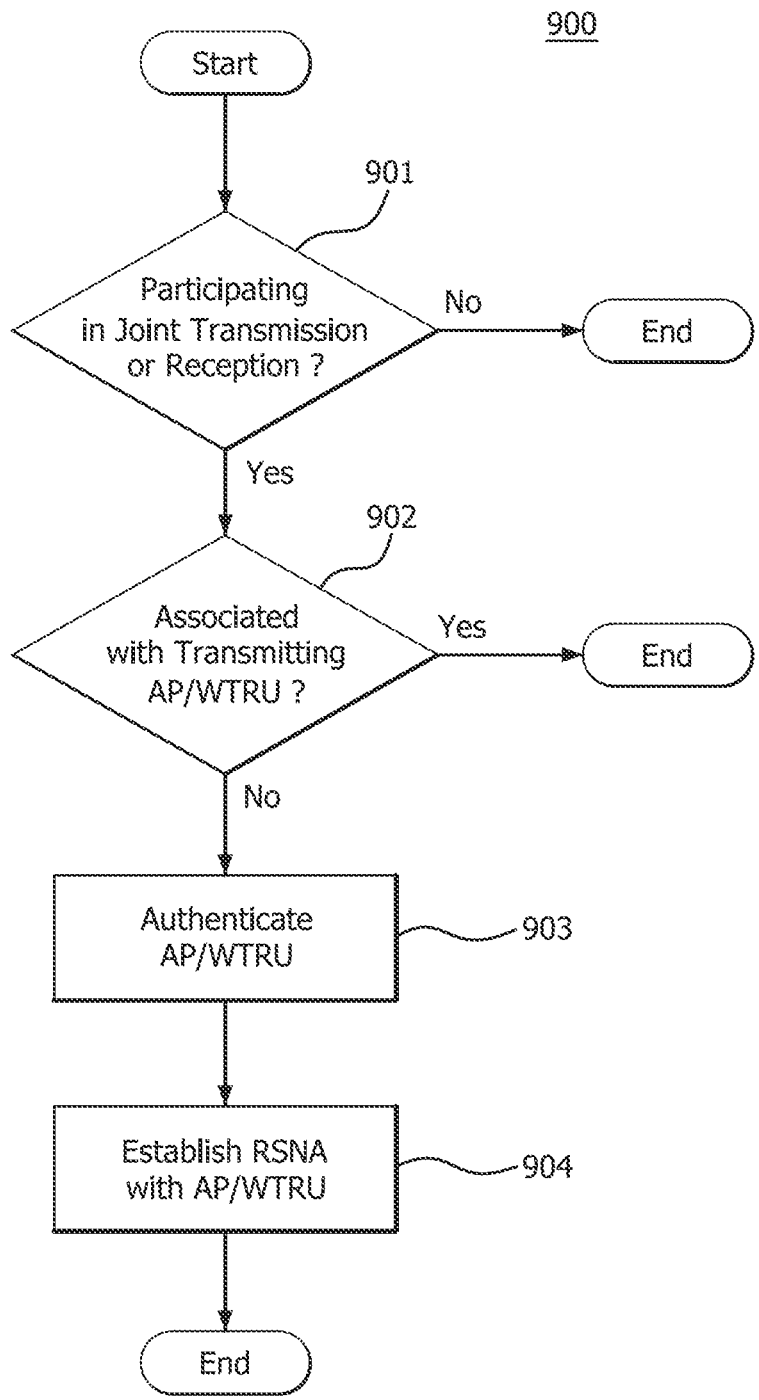
FIG. 9 shows a flow chart of an example procedure for associating with an AP or WTRU to enable coordinated joint transmission.

FIG. 9 shows a flow chart of an example procedure for authenticating and establishing Robust Security Network Association (RSNA) with an AP or WTRU to enable coordinated joint transmission 900. A WTRU or AP may not receive a Class 3 packet such as a data frame over an 802.11 interface, unless the WTRU is associated with the transmitting AP. An AAP therefore may not be able to forward a JTDP to the ATAP or A-WTRU, or a receiving WTRU may not accept the packet sent to it by an ATAP or A-WTRU unless the receiving WTRU is associated with it. Transitioning to State 4 in a similar way as defined in 802.11ad may enable transmission and reception of all classes of frames between the AAP, ATAP, A-WTRU, C-WTRU, and the receiving WTRU. In the example procedure, an AAP may determine whether another AP or WTRU is going to participate in joint transmission 901. If the targeted AAP or WTRU is going to participate in joint transmission, the AAP may then determine whether the targeted AP or WTRU is associated with the AAP 902. If the targeted AP or WTRU is not associated, then the AAP may authenticate the targeted AP or WTRU 903 and then establish RSNA with targeted AP or WTRU 904 in order to enter State 4 and be able to transmit and receive all classes of frames to and from the AAP. This procedure may also be extended to be performed by an ATAP, A-WTRU, or C-WTRU.

If the AAP and the ATAP or A-WTRU communicate on other interfaces including but not limited to LTE and/or wired Ethernet, the procedure of FIG. 9 on the WiFi interface may not be needed. In that case, the receiving WTRU may authenticate with either or both the AAP and the ATAP or A-WTRU in accordance with the procedure of FIG. 9. The WTRU may be associated with the AAP only, or it may associate with the AAP as well as the ATAP or A-WTRU. Alternatively, the WTRU may not conduct association with the AAP and/or the ATAP or A-WTRU, but instead establish RSNA with either or both the AAP and the ATAP or A-WTRU.

Figure 10:
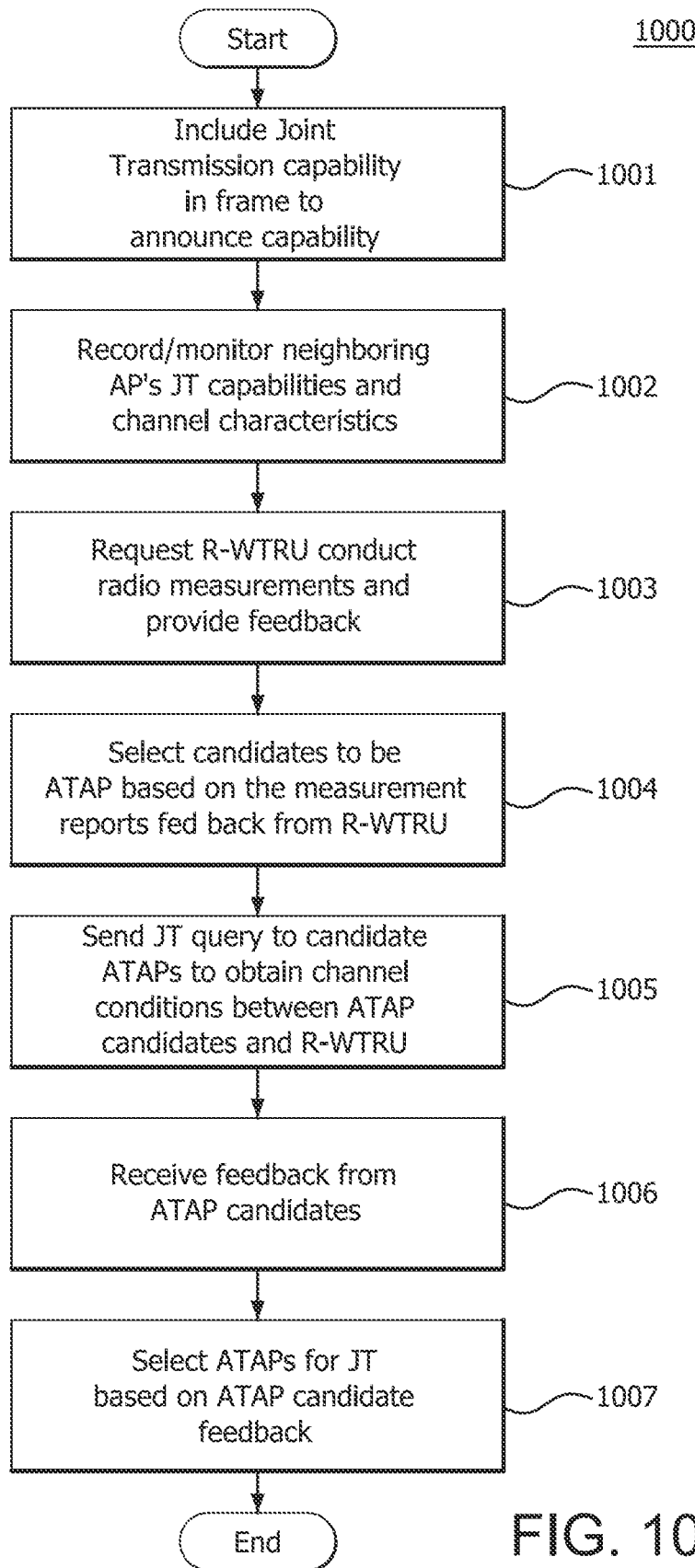
FIG. 10 shows an example procedure for selecting an ATAP for coordinated joint transmission.

FIG. 10 shows an example procedure for selecting an ATAP for coordinated joint transmission 1000. In the example procedure of FIG. 10, the AAP may include a joint transmission capability indication 1001 in its beacon, probe response, association response, or any other type of management and control frame to announce its capabilities.

The AAP may also monitor/record neighboring AP's joint transmission capabilities and the channel characteristics associated with WTRUs 1002. These capabilities and channel characteristics may be received by the AP when it receives frames such as a beacon, probe response, association response, or any other type of management and control frame that may include a joint transmission capability indication. Any AP when receiving a frame from another WTRU, may record the conditions of the channel between the transmitting WTRU and itself.

The AAP may identify a receiving WTRU for joint transmission and may request that the receiving WTRU conduct one or more beacon radio measurements or radio measurements on other types of frames from surrounding APs and provide feedback 1003. The receiving WTRU may conduct the requested radio measurements and may provide feedback to the AAP. The AAP may also be requested by the receiving WTRU to conduct measurements of a neighbor AP to obtain a measurement report.

The AAP may select candidates to be an ATAP based on the measurement reports fed back from the receiving WTRU 1004.

The AAP may send a joint transmission query to candidate ATAPs based on the feedback from the receiving WTRU to obtain channel conditions between the ATAP candidates and the receiving WTRU 1005. The AAP may send the joint transmission query to the APs which are known to have joint transmission capabilities or may query the joint transmission capabilities of the APs if they are not known beforehand in accordance with the method described above.

These APs may then receive feedback from the queried ATAP candidates in a joint transmission feedback frame 1006 that may provide a channel quality indication, preferred Joint Transmissions Options, and/or a Joint Transmission TxSpec that the responding AP has determined locally based on its local situation such as channel conditions, traffic load, local medium occupancy time, and transmit power limits, etc.

The AAP may select one or more candidate ATAPs as the ATAP for a joint transmission session to one or more receiving WTRUs based on the joint transmission feedback 1007 that the AAP received from all the APs. Selection criteria for an ATAP may include but is not limited to:

(1) an ATAP having good channel conditions to the receiving WTRU such that the joint transmission may significantly provide throughput improvement for the receiving WTRU;

(2) an ATAP having good channel conditions with the AAP such that the forwarding of coordination information and JTDP, which may be considered as overhead, takes a relatively short period of time;

(3) an ATAP sharing similar capabilities as the AAP such as scheduled channel access, and similar wired/wireless interfaces, etc.;

(4) an ATAP being capable of joint transmission options and TxSpec that the AAP desires during the JTS; and (5) an ATAP not receiving an excessive overload of traffic, which may cause delay for the joint transmission session.

This procedure may also be extended to be performed by an ATAP, A-WTRU, or C-WTRU. Alternatively or additionally, at any time an AAP may exit the above procedure and may conduct a joint transmission capability procedure as described in FIG. 7A by transmitting a joint transmission query frame to one or more neighboring APs to obtain their joint transmission capabilities as described above.

Once an AAP has selected an ATAP for a JTS to one or more receiving WTRUs, the AAP, ATAP, and WTRU may conduct a multi-AP joint transmission procedure. Using the joint transmission request and response exchanges as described herein, an AAP and ATAP may agree on a type of coordinated joint transmission. Examples of coordinated joint transmission include but are not limited to: scheduled concurrent joint transmissions, scheduled sequential joint transmissions, contention-based concurrent joint transmissions, and contention-based sequential joint transmission. The procedure for each type of joint transmissions is discussed below.

Figure 11:
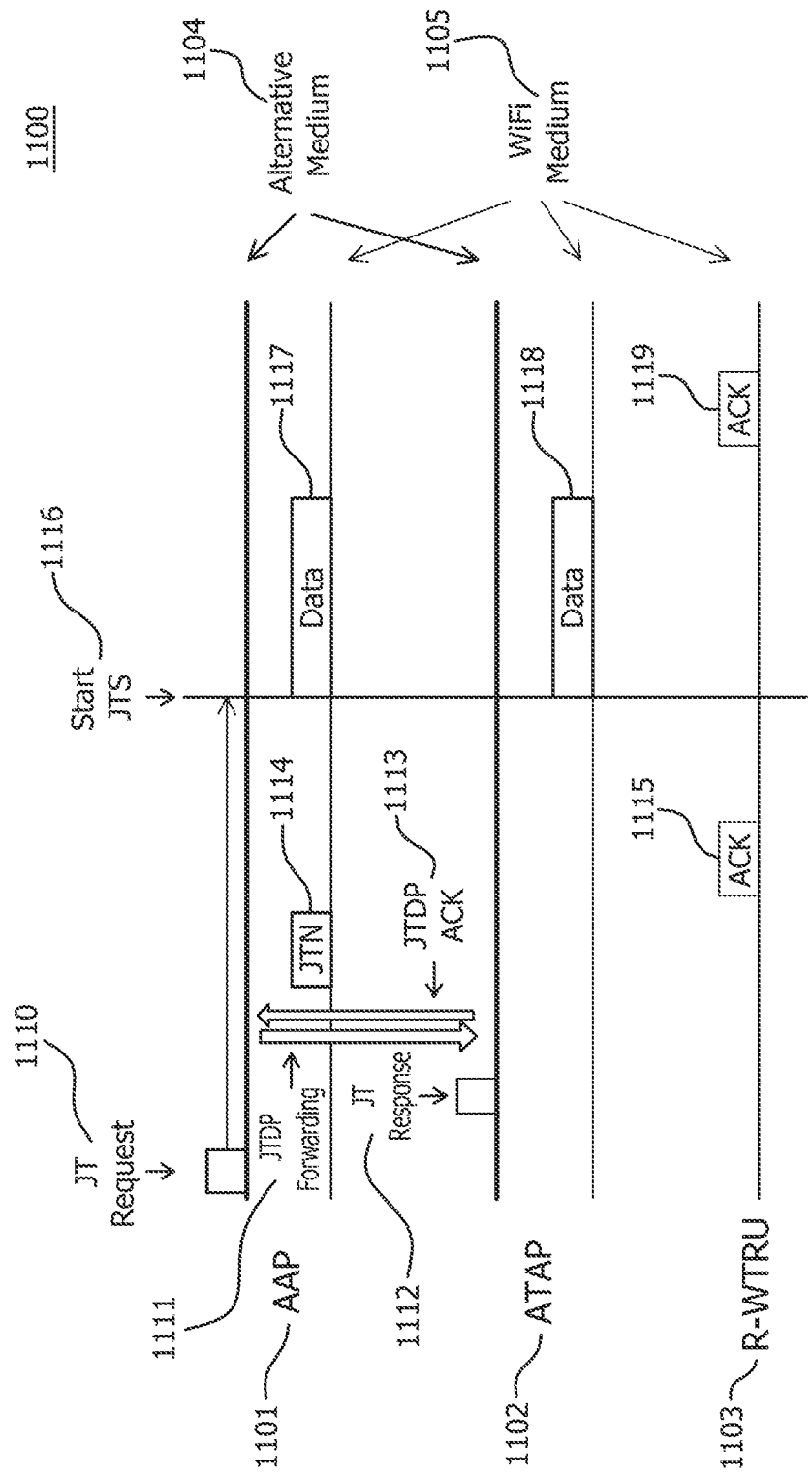
FIG. 11 is a diagram of an example scheduled concurrent joint transmission Procedure.

FIG. 11 shows an example of a scheduled concurrent joint transmission procedure 1100. AAP 1101 and ATAP 1102 may listen to each other's beacons and determine the difference between their local timer, such as the TSF timers at AAP 1101 and ATAP 1102. Joint transmission may be possible even if AAP 1101 and ATAP 1102 are not within range of each other on the wireless WiFi interface. The beacons may be exchanged over the DS or other type of wireless or wired interface.

AAP 1101 may set up a JTS using a joint transmission request 1110 transmitted either wirelessly or on a wired connection. The joint transmission request 1110 may be sent on the same WiFi medium 1105 as the pending JTS. Alternatively, the joint transmission request 1110 may also be sent on an alternative medium 1104 over an alternative interface provided that it may be delivered to ATAP 1102. For example, the joint transmission request 1110 may be transmitted using a different interface conforming to LTE, UMTS, WiMAX, Ethernet, or a different WiFi standard, or the same WiFi standards but on a different channel.

The AAP may provide schedule information for the JTS for the transmission of one or more transmit opportunities using the joint transmission request 1110. This schedule information may be referenced to the local timer at either the ATAP or the AAP, or may be referenced to any other timer that is agreed upon. This schedule may be, for example, time and duration or any other type of indication of a period such as, for example, transmit opportunities (TXOPs), power save multi-poll (PSMP) downlink (DL) slots, scheduled automatic power save delivery (S-APSD) slots, or service periods for example, in 802.11ad. The AAP and/or the ATAP may announce such a schedule in their beacons, short beacons, or any other type of frame.

ATAP 1102 may respond by sending a joint transmission response 1112 either accepting or rejecting the JTS on the same medium used for transmitting the joint transmission request 1110. If the JTS is rejected, AAP 1101 may select the next suitable AP to which to transmit a joint transmission request 1110. Alternatively, AAP 1101 may adjust the joint transmission parameters and specifications according to a reject reason code and send a new joint transmission request 1110 to the same AP. If the selected AP accepts the JTS, ATAP 1102 may remain the same for the JTS for a WTRU or a set of WTRUs, unless AAP 1101 selects a new ATAP or ATAP 1102 indicates to AAP 1101 that it may no longer accommodate the JTS by sending a joint transmission response 1112 to the AP with a result field indicating the change. Alternatively, ATAP 1102 may choose a different medium, such as the same WiFi medium 1105 for the JTS.

AAP 1101 may then forward JTDPs 1111 to ATAP 1102. If JTDPs 1111 are forwarded together in aggregated packets with the joint transmission request 1110, the joint transmission response may be aggregated with JTDP ACK/block ACK (BA) 1113 frames for the forwarded JTDPs 1111. Alternatively, the joint transmission request 1110 frames may include fields containing JTDPs, and the joint transmission response 1112 frames may include a field indicating JTDP ACK/BA 1113 frames for the forwarded JTDPs 1111.

JTDPs may be forwarded to ATAP 1102 by AAP 1101 according to the data forwarding options included in the joint transmission capabilities or according to an agreement during the joint transmission request 1110 and joint transmission response 1112 exchange. Forwarding of JTDPs 1111 may be done with the coordination information such as a joint transmission request 1110 in aggregated frames. The forwarding of JTDPs 1111 may be completed and acknowledged before the joint transmission of those JTDPs commences. The forwarded JTDPs may be MPDUs or MSDUs. These MPDUs or MSDUs may be encapsulated in the frame body and transmitted as, for example, Ethernet, WiFi, LTE, or WiMax frames.

If MSDUs are forwarded to ATAP 1102, ATAP 1102 may construct MPDUs using the MSDUs and the information and TxSpec provided by AAP 1101. When AAP 1101 forwards MPDUs to ATAP 1102 along with TxSpec, ATAP 1102 may extract MPDUs directly. For joint transmission, ATAP 1102 may save the MPDUs in a separate queue and pass the MPDUs to the physical (PHY) layer at an appropriate time using primitives such as PHY-TXSTART.request (TXVECTOR), where TXVECTOR may be derived from the TxSpec that ATAP 1102 has been determined locally or obtained from AAP 1101.

In joint transmissions that are transparent for the RSTA, the PPDUs that are transmitted by AAP 1101 and ATAP 1102 may be identical including the address fields in the MAC headers and the group IDs in the PLCP headers.

AAP 1101 and/or ATAP 1102 may notify R-WTRU 1103 with the pending scheduled concurrent JTS and its schedule using a joint transmission notification frame 1114. Alternatively or additionally, AAP 1101 and/or ATAP 1102 may include a joint transmission notification IE in their beacon, short beacon or any other type of frames to achieve the same purpose. If R-WTRU 1103 is notified using a uni-cast frame, R-WTRU 1103 may transmit ACK 1115 the reception of the joint transmission notification frame 1114.

AAP 1101 and ATAP 1102 may start the joint transmissions 1116 at the scheduled time, using TXVECTORs that may be derived from the TxSpec locally determined or determined by the AAP. In the scheduled concurrent JTS, the PPDUs containing packet data 1117 and 1118 transmitted by both AAP 1101 and ATAP 1102 may be identical. It may be transparent to the R-WTRU 1103 that the packet data 1117 and 1118 that it is receiving is a scheduled concurrent joint transmission. When having received the jointly transmitted packet data 1117 and 1118, the R-WTRU 1103 may acknowledge the reception by transmitting an ACK 1119, a short ACK, or a BA to AAP 1101. R-WTRU 1103 may also skip the acknowledgement according to the ACK policies specified. If a joint transmission has failed, AAP 1101 may decide to retransmit the packet data 1117, either individually or jointly at a later scheduled time.

Figure 12:
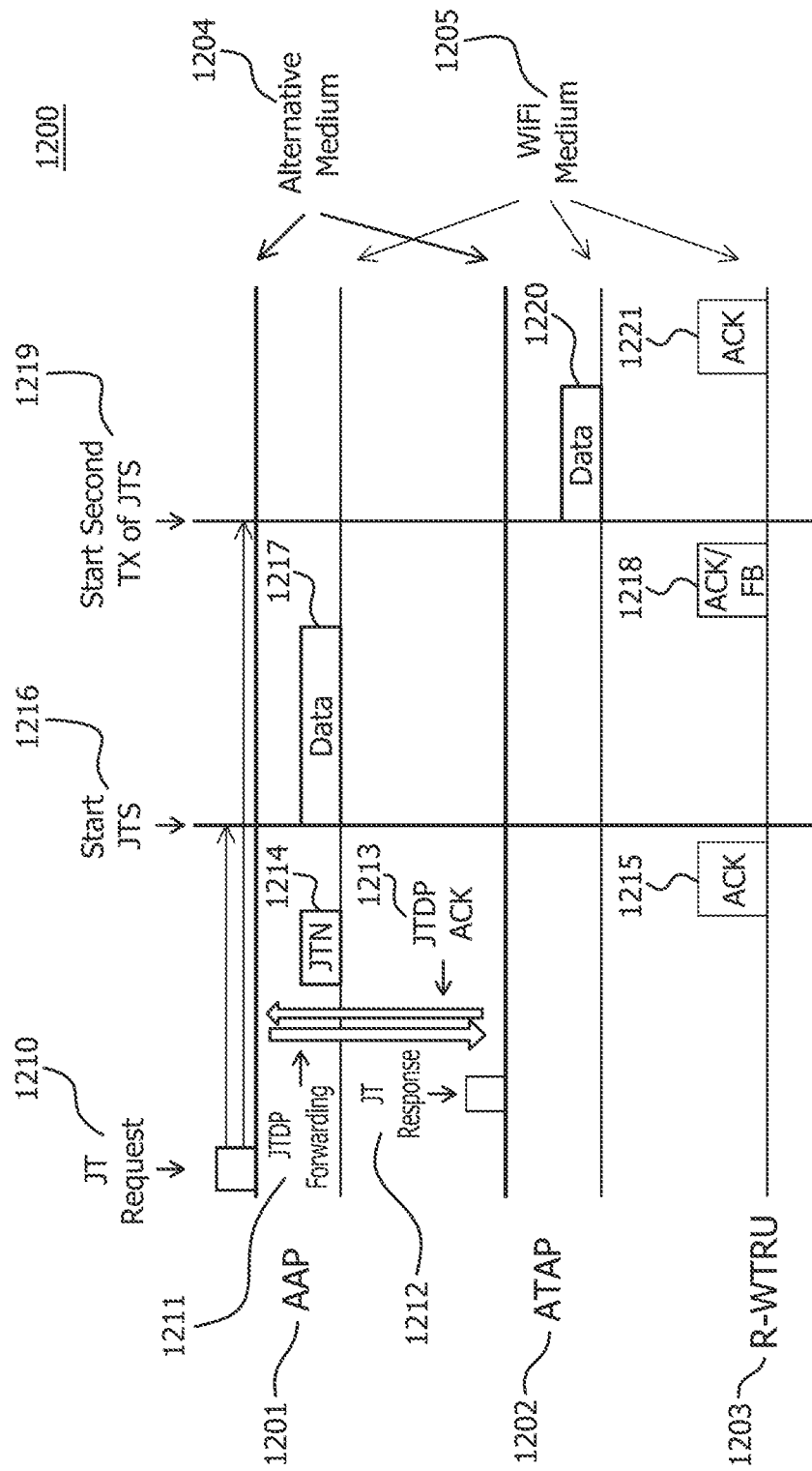
FIG. 12 is a diagram of an example scheduled sequential joint transmission Procedure.

FIG. 12 shows an example of the scheduled sequential joint transmission procedure 1200. AAP 1201 and ATAP 1202 may listen to each other's beacons and determine the difference between their local timer, such as the TSF timers at AAP 1201 and ATAP 1202. Joint transmission may be possible even if AAP 1201 and ATAP 1202 are not within range of each other on the wireless WiFi interface. The beacons may be exchanged over the DS or other type of wireless or wired interface.

AAP 1201 may set up a JTS using a joint transmission request 1210 transmitted either wirelessly or on a wired connection. The joint transmission request 1210 may be sent on the same WiFi medium 1205 as the pending JTS. Alternatively, the joint transmission request 1210 may also be sent on an alternative medium 1204 over an alternative interface provided that it may be delivered to ATAP 1202. For example, the joint transmission request 1210 may be transmitted using a different interface conforming to LTE, UMTS, WiMAX, Ethernet, or a different WiFi standard, or the same WiFi standards but on a different channel.

The AAP may provide schedule information for the JTS for the transmission of one or more transmit opportunities using the joint transmission request 1210. This schedule information may be referenced to the local timer at either the ATAP or the AAP, or may be referenced to any other timer that is agreed upon. This schedule may be, for example, time and duration or any other type of indication of a period such as, for example, transmit opportunities (TXOPs), power save multi-poll (PSMP) downlink (DL) slots, scheduled automatic power save delivery (S-APSD) slots, or service periods for example, in 802.11ad. The AAP and/or the ATAP may announce such a schedule in their beacons, short beacons, or any other type of frame.

ATAP 1202 may respond by sending a joint transmission response 1212 either accepting or rejecting the JTS on the same medium used for transmitting the joint transmission request 1210. If the JTS is rejected, AAP 1201 may select the next suitable AP to which to transmit a joint transmission request 1210. Alternatively, AAP 1201 may adjust the joint transmission parameters and specifications according to a reject reason code and send a new joint transmission request 1210 to the same AP. If the selected AP accepts the JTS, ATAP 1202 may remain the same for the JTS for a WTRU or a set of WTRUs, unless AAP 1201 selects a new ATAP or ATAP 1202 indicates to AAP 1201 that it may no longer accommodate the JTS by sending a joint transmission response 1212 to the AP with a result field indicating the change. Alternatively, ATAP 1202 may choose an alternative medium 1204, such as the same WiFi medium 1205 for the JTS.

AAP 1201 may then forward JTDPs 1211 to ATAP 1202. If JTDPs 1211 are forwarded together in aggregated packets with the joint transmission request 1210, the joint transmission response may be aggregated with JTDP ACK/block ACK (BA) 1213 frames for the forwarded JTDPs 1211. Alternatively, the joint transmission request 1210 frames may include fields containing JTDPs, and the joint transmission response 1212 frames may include a field indicating JTDP ACK/BA 1213 frames for the forwarded JTDPs 1211.

JTDPs may be forwarded to ATAP 1202 by AAP 1201 according to the data forwarding options included in the joint transmission capabilities or according to an agreement during the joint transmission request 1210 and joint transmission response 1212 exchange. Forwarding of JTDPs 1211 may be done with the coordination information such as a joint transmission request 1210 in aggregated frames. The forwarding of JTDPs 1211 may be completed and acknowledged before the joint transmission of those JTDPs commences. The forwarded JTDPs may be MPDUs or MSDUs. These MPDUs or MSDUs may be encapsulated in the frame body and transmitted as, for example, Ethernet, WiFi, LTE, or WiMax frames.

If MSDUs are forwarded to ATAP 1202, ATAP 1202 may construct MPDUs using the MSDUs and the information and TxSpec provided by AAP 1201. When AAP 1201 forwards MPDUs to ATAP 1202 along with TxSpec, ATAP 1202 may extract MPDUs directly. For joint transmission, ATAP 1202 may save the MPDUs in a separate queue and pass the MPDUs to the physical (PHY) layer at an appropriate time using primitives such as PHY-TXSTART.request (TXVECTOR), where TXVECTOR may be derived from the TxSpec that ATAP 1202 has been determined locally or obtained from AAP 1201.

In joint transmissions that are transparent for the RSTA, the PPDUs that are transmitted by AAP 1201 and ATAP 1202 may be identical including the address fields in the MAC headers and the group IDs in the PLCP headers.

AAP 1201 and/or ATAP 1202 may notify R-WTRU 1203 with the pending scheduled sequential JTS and its schedule using a joint transmission notification frame 1214. Alternatively or additionally, AAP 1201 and/or ATAP 1202 may include a joint transmission notification IE in their beacon, short beacon or any other type of frames to achieve the same purpose. If R-WTRU 1203 is notified using a uni-cast frame, R-WTRU 1203 may transmit ACK 1215 the reception of the joint transmission notification frame 1214.

AAP 1201 and ATAP 1202 may start the joint transmissions 1216 and 1219 at the scheduled time, using TXVECTORs that may be derived from the TxSpec locally determined or determined by the AAP. In the scheduled sequential JTS, the PPDUs containing packet data 1217 and 1220 transmitted by both AAP 1201 and ATAP 1202 may be identical. It may be transparent to the R-WTRU 1203 that the packet data 1217 and 1220 that it is receiving is a scheduled sequential joint transmission.

Alternatively, packet data 1217 and 1220 may be different by using, for example, STBC, HARQ schemes as may be specified in the joint transmission options. It may be transparent to R-WTRU 1203 that the packet data 1217 and 1218 that it is receiving is a scheduled sequential transmission. In joint sequential transmissions, the joint transmissions may not necessarily be transparent to R-WTRU 1203. The TA addresses and the frame body, for example, in the sequential transmissions may be different. R-WTRU 1203 may be notified of the non-transparent joint sequential transmissions by AAP 1201 and/or the ATAP 1202 using a joint transmission notification frame 1214.

If HARQ sequential transmission is used, either AAP 1201 or ATAP 1202 may start with transmitting its packet data 1217 and 1220. R-WTRU 1203 may send back an ACK/feedback 1218. Either AAP 1201 or ATAP 1202, whichever has not transmitted, may cancel its transmission if the first transmission has already been acknowledged. Otherwise, it may adjust its own PPDU on the basis of the feedback from R-WTRU 1203 and transmit after an interval, such as an interframe space (IFS) from the feedback from R-WTRU 1203. If STBC is used, AAP 1201 and ATAP 1202 may transmit at the same time according to the STBC scheme. R-WTRU 1203 may process the received signals according the STBC decoding method.

When having received the jointly transmitted packet data 1217 and 1220, the R-WTRU 1203 may acknowledge the reception by transmitting an individual ACK 1221 on the AAP 1201 and ATAP 1202 transmission portions of the joint sequential transmission, a short ACK, or a BA to AAP 1201. R-WTRU 1203 may also skip the acknowledgement according to the ACK policies specified. If a joint transmission has failed, AAP 1201 may decide to retransmit the packet data 1217, either individually or jointly at a later scheduled time.

R-WTRU 1203 may also wait until the entire joint sequential transmission completes and then send ACKs 1218 and 1221 to AAP 1201. AAP 1201 or ATAP 1202 may cancel their pending transmissions if the RSTA has already transmitted an ACK in response to receiving an earlier transmission portion of the joint sequential transmissions indicating that the JTDP has been correctly received. If a joint transmission has failed, the AAP may decide to retransmit the frame, either individually or jointly at a later scheduled time.

Figure 13:
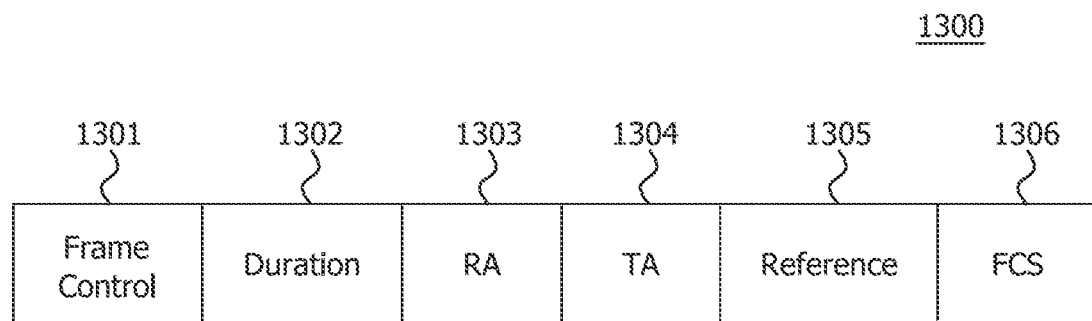
FIG. 13 is a diagram of an example Joint Transmission (JT)-RTS frame.

FIG. 13 provides an example design of the JT-RTS frame, which may be a modified version of the request to send (RTS) frame for use in contention-based joint transmissions 1300. The JT-RTS fame may include but is not limited to the following fields: a frame control field 1301, a duration field 1302, an RA field 1303, a TA field 1304, a reference field 1305, and an FCS field 1306. This frame may also be implemented as any type of control frame, management frame, or any other type of frame, a field, or a subfield thereof.

Frame control field 1301 may contain type information indicating that this is a JT-RTS frame. Alternatively, the type may be an RTS while the other parts of the frame, such as all other fields, including PLCP header, initial scrambling seeds, and/or FCS encoding, may indicate that this is an RTS for a joint transmission.

Duration field 1302 may contain a duration that is sufficient to have the AAP, ATAP and R-WTRU to transmit JT-CTS, regular RTS/CTS exchange, and all the joint transmission, the ACK/BAs, plus the appropriate IFSs between the transmitted frames. The RA field may contain the address of the ATAP, and the TA field may contain the address of the AAP.

Reference field 1305 may contain the references to the pending JTS, such the ID or the sequence number of the JTS for the particular AAP or for the AAP/ATAP pair.

Figure 14:
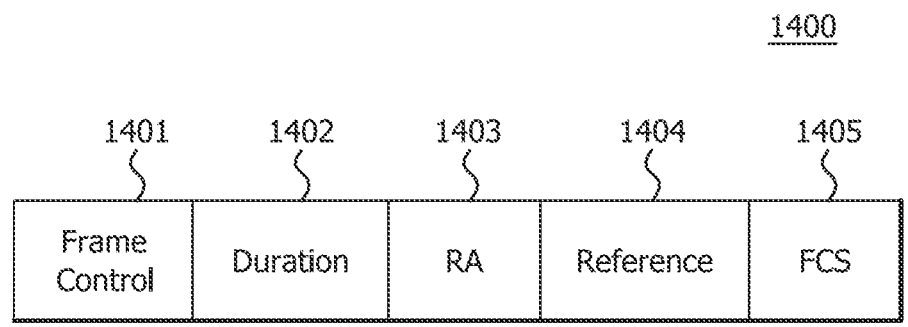
FIG. 14 is a diagram of an example JT-CTS frame.

FIG. 14 shows an example design of the JT-CTS frame, which may be a modified version of the clear to send (CTS) frame for use in contention-based joint transmissions 1400. The JT-CTS frame may include but is not limited to the following fields: frame control field 1401, duration field 1402, RA field 1403, a reference field 1404, and FCS field 1405. This frame may also be implemented as any type of control frame, management frame, or any other type of frame, a field, or subfield thereof.

Frame control field 1401 may contain type information indicating that this is a JT-CTS frame. Alternatively, the type may be CTS, while the other parts of the frame, such as all other fields, including PLCP header, initial scrambling seeds, and/or FCS encoding may indicate that this is an CTS for a joint transmission.

Duration field 1402 may contain the duration that is sufficient to have the AAP, ATAP and R-WTRU to transmit a regular RTS/CTS exchange, and all the joint transmission and ACK/BAs plus the appropriate IFSs between the transmitted frames. The duration field may be set to Duration_in_JT-RTS–aSIFSTime–JT-CTS_Duration, where Duration_in_JT-RTS is the value contained in the JT-RTS frame, aSIFSTime is the duration of a SIFS and JT-CTS_Duration is the duration needed to transmit a JT-CTS frame.

RA field 1403 may contain the address of the AAP. The reference field may contain the references to the pending JTS, such as the ID or the sequence number of the JTS for the particular AAP or for the AAP/ATAP pair.

Figure 15:
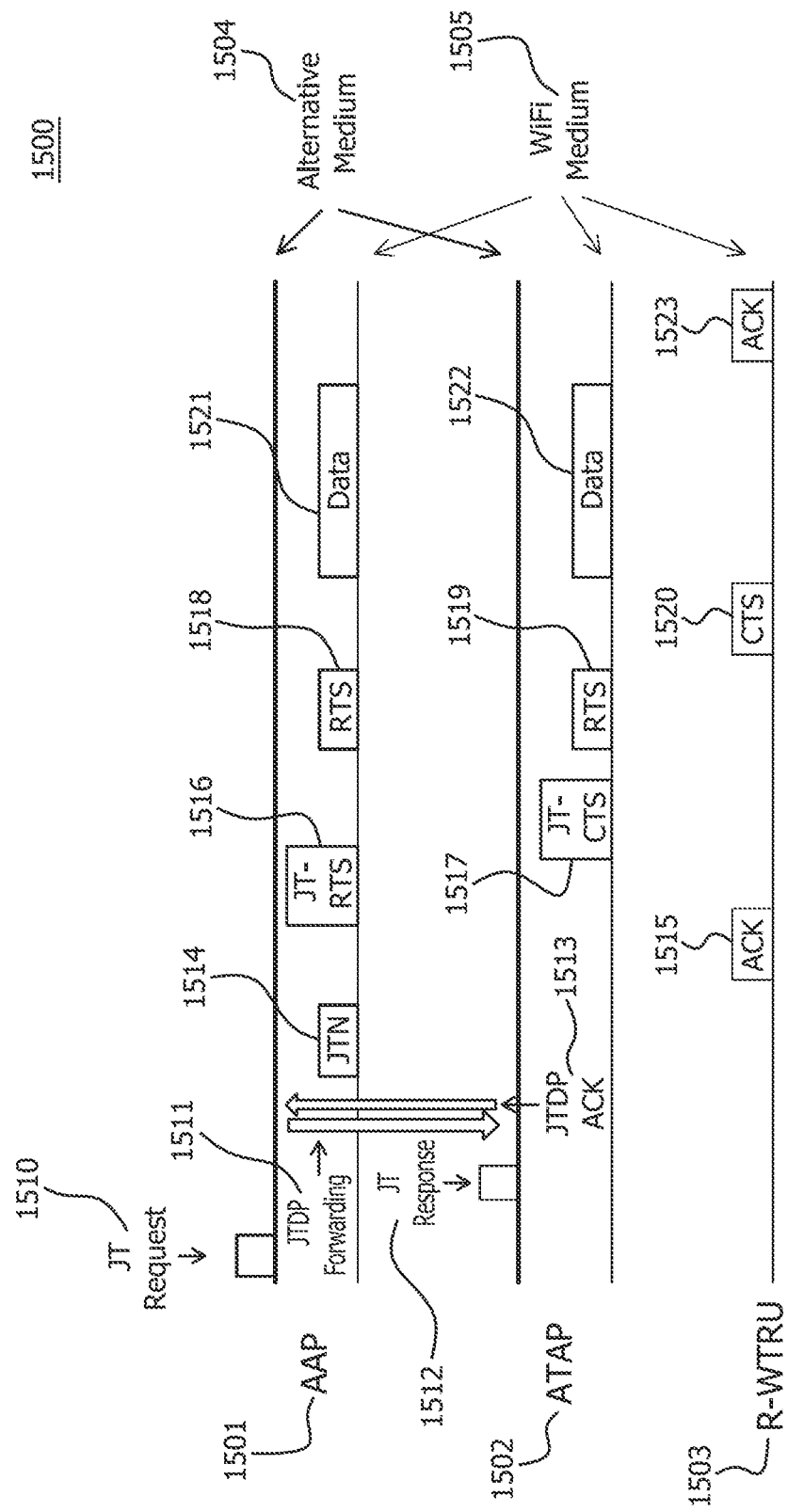
FIG. 15 is a diagram of an example Contention-Based Concurrent Joint Transmission Procedure.

FIG. 15 shows an example of a contention-based concurrent joint transmission procedure 1500. AAP 1501 and ATAP 1502 may listen to each other's beacons and determine each other's joint transmission capabilities. AAP 1501 may set up a JTS using a concurrent joint transmission request 1510. Joint transmission request 1510 may be sent on the same WiFi medium 1505 as the pending JTS. Alternatively, joint transmission request 1510 may also be sent on an alternative medium 1504 over an alternative interface provided that it can be delivered to ATAP 1502. For example, joint transmission request 1510 may be transmitted using a different interface conforming to, for example, LTE, UMTS, WiMAX, Ethernet, or a different WiFi standard, or the same WiFi standards but on a different channel. ATAP 1502 may respond by sending a joint transmission response 1512, either accepting or rejecting the JTS, on the same medium used for transmitting the joint transmission request 1510. Alternatively, ATAP 1502 may choose a different medium, such as the same WiFi medium as the pending JTS. If the JTDPs are forwarded 1511 together in aggregated packets with the joint transmission request 1510, joint transmission response 1512 may be aggregated with ACK/BA frames 1513 for the forwarded JTDPs. Alternatively, joint transmission request 1510 frames may include fields containing the JTDP, and the joint transmission response 1512 frames may include a field indicating ACK/BA for the forwarded JTDP.

If ATAP 1502 accepts JTS, JTDPs may be forwarded 1511 to ATAP 1502 by AAP 1501 according to the data forwarding options included in the joint transmission capabilities or according to an agreement during the joint transmission request 1510 and joint transmission response 1512 exchange. The JTDPs may also be forwarded 1511 together with the coordination information such as a joint transmission request 1510 in aggregated frames. The JTDP forwarding 1511 may be completed and acknowledged before the joint transmission of that JTDP commences. The forwarded JTDPs may be MSDUs or MPDUs. In joint transmissions that are transparent for R-WTRU 1503, the PPDUs that are transmitted by AAP 1501 and ATAP 1502 may be identical, including the address fields in the MAC headers and the group IDs in the PLCP headers.

AAP 1501 and/or ATAP 1502 may notify R-WTRU 1503 of the pending contention-based concurrent JTS using a joint transmission notification 1514 frame. Alternatively, AAP 1501 and/or ATAP 1502 may include a joint transmission notification 1514 IE in their beacon, short beacon or any other type of frame to achieve the same purpose. If joint transmission notification 1514 IE is included in a beacon or short beacon, AAP 1501 and/or ATAP 1502 may include it only for the period when it knows that R-WTRU 1503 is not in a power saving mode, and therefore may receive joint transmission notification 1514 IE. If AAP 1501 and/or ATAP 1502 notify R-WTRU 1503 using a uni-cast frame, R-WTRU 1503 may acknowledge the reception of joint transmission notification 1514 frame. R-WTRU 1503 may respond to the joint transmission notification 1514 frame with ACK 1515.

AAP 1501 may initiate the JTS by transmitting JT-RTS frame 1516 to ATAP 1502 and may update its network allocation vector (NAV) counter using a duration contained in the Duration Field of JT-RTS frame 1516. ATAP 1502 may respond to JT-RTS 1516 with JT-CTS 1517 frame.

After updating their NAV counter using the duration value of the JT-RTS, AAP 1501 may cancel the NAV associated with JT-RTS frame 1516 if ATAP 1502 and other APs/WTRUs in the BSS did not detect any transmission after 2×aSIFS_time+JT-CTS_duration+Interval counting from the end of the JT-RTS frame 1516, where aSIFS_time is the duration of a SIFS, JT-CTS_duration is the duration of transmitting a JT-CTS frame and Interval is some arbitrary time interval and may be implemented as Interval=2*aSlotTime+aPHY-RX-START-Delay where aSlotTime is the duration of a Slot.

Alternatively, these other APs/WTRUs in the BSS may also elect to go to sleep for power saving. In addition, AAP 1501 that has updated its NAV counter using the duration value of the JT-RTS may cancel the NAV associated with JT-RTS frame 1516 if AAP 1501 have not detected a RTS frame after 2×aSIFS_time+JT-CTS_duration counting from the end of the JT-RTS frame, but do not detect any transmission after 4×aSIFS_time+JT-CTS_duration+RTS_Duration+CTS_Duration+Interval counting from the end of the JT-RTS frame, where RTS_Duration and the CTS_Duration are the duration needed to transmit a RTS and a CTS frame.

R-WTRU 1503, which may have been notified of the pending JTS, may detect from JT-RTS frame 1516 that this JTS is intended for itself by comparing the combination of the TA and the Reference to the JTS in JT-RTS frame 1516. If R-WTRU 1503 has detected that the JT-RTS frame 1516 is meant to initiate a JTS for itself, R-WTRU 1503 may not go into a power saving mode and may not need to set its NAV counter.

After a SIFS duration, AAP 1501 and ATAP 1502 may concurrently transmit a regular RTS 1518 and 1519 with the RA address being the address of the RSTA and the TA address being the address of AAP 1501 and the Duration field set to a duration that may be sufficient for AAP 1501, ATAP 1502, and R-WTRU 1503 to transmit a CTS 1520, all joint transmissions, the appropriate response frames, and the appropriate IFSs. Alternatively, AAP 1501 and ATAP 1502 may start the joint concurrent transmissions of data directly without first going through an RTS/CTS exchange.

ATAP 1502 receiving RTS 1518 may modify their NAV counter using a Duration value. For an AP/WTRU that has modified its NAV counter using a JT-CTS and then an RTS and a SIFS time after the JT-CTS, it may cancel the medium reservation if it did not detect any transmission after 3×aSIFS_time+RTS_Duration+CTS_Duration+Interval counting from the end of the JT-CTS time.

R-WTRU 1503 may respond to RTS 1518 and/or 1519 by transmitting CTS frame 1520. Both AAP 1501 and ATAP 1502 may be required to monitor the medium for a CTS that is addressed to AAP 1520. If AAP 1501 and ATAP 1502 do not receive such a CTS from the RSTA, they may send out a CF-End frame concurrently, or separately, to cancel the medium reservation for the JTS at any time during the reserved period. The TA field of the CF-End frame may be set to the MAC address of the AAP. If the AAP/ATAP has received a CTS from R-WTRU 1503, they may commence the joint concurrent transmissions of data to R-WTRU 1503. If a JT TXOP has been reserved using the JT-RTS/JT-CTS and/or RTS/CTS exchanges, the AAP 1501 and ATAP 1502 may concurrently transmit multiple data packets 1521 and 1522 during the TXOP.

R-WTRU 1503 may then acknowledge the reception of one or multiple packets by sending an ACK 1523, a BA or any other frame as allowed in the frame exchange sequences. It may also skip the acknowledgement as the ACK policies dictate. After the completion of the JTS, AAP 1501 and ATAP 1502 may concurrently or separately send out a CF-End frame to cancel the TXOP that may remain provided that the remaining TXOP is sufficient for such transmissions. Alternatively, AAP 1501 may send out the CF-End first and ATAP 1502 may repeat the CF-End. If a joint transmission has failed, AAP 1501 may determine to retransmit the frame, either individually or jointly in a later contention-based or scheduled-based joint transmission session.

Figure 16:
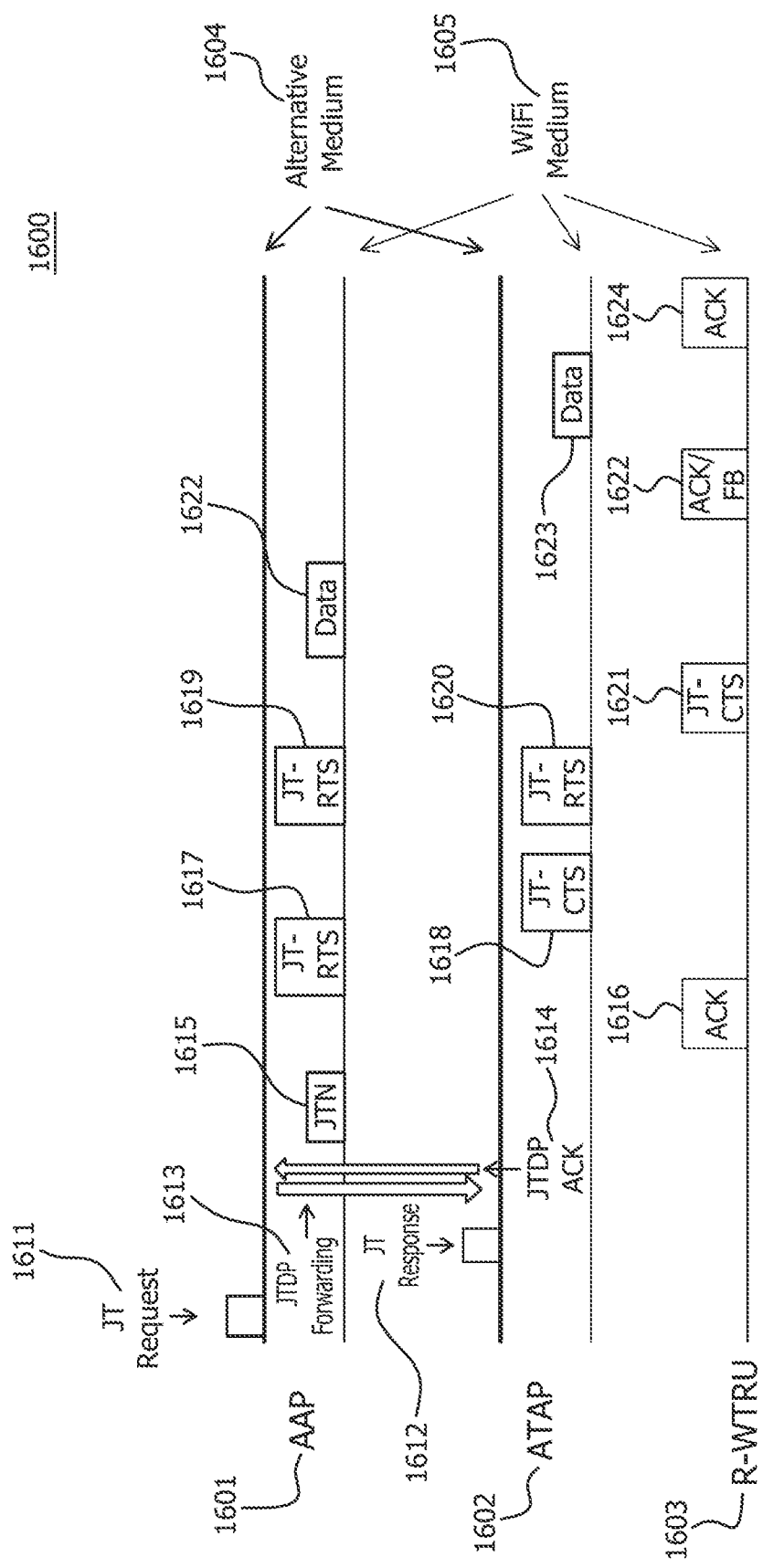
FIG. 16 is a diagram of an example Contention-Based Sequential Joint Transmission Procedure.

FIG. 16 provides an example of the contention-based sequential joint transmission procedure 1600. AAP 1601 and ATAP 1602 may listen to each other's beacons and determine each other's joint transmission capabilities. AAP 1601 may set up a JTS using a sequential joint transmission request 1611. Joint transmission request 1611 may be sent on the same WiFi medium 1605 as the pending JTS. Alternatively, joint transmission request 1611 may also be sent on an alternative medium 1604 over an alternative interface provided that it can be delivered to ATAP 1602. For example, joint transmission request 1611 may be transmitted using a different interface conforming to, for example, LTE, UMTS, WiMAX, Ethernet, or a different WiFi standard, or the same WiFi standards but on a different channel. ATAP 1602 may respond by sending a joint transmission response 1612, either accepting or rejecting the JTS, on the same medium used for transmitting the joint transmission request 1611. Alternatively, ATAP 1602 may choose a different medium, such as the same WiFi medium as the pending JTS. If the JTDPs are forwarded 1613 together in aggregated packets with the joint transmission request 1611, joint transmission response 1612 may be aggregated with ACK/BA frames 1614 for the JTDPs forwarded 1613. Alternatively, joint transmission request 1611 frames may include fields containing the JTDP, and the joint transmission response 1612 frames may include a field indicating ACK/BA 1614 for the forwarded JTDP.

If ATAP 1602 accepts JTS, JTDPs may be forwarded 1613 to ATAP 1602 by AAP 1601 according to the data forwarding options included in the joint transmission capabilities or according to an agreement during the joint transmission request 1611 and joint transmission response 1612 exchange. The JTDPs may also be forwarded 1613 together with the coordination information such as a joint transmission request 1611 in aggregated frames. The JTDP forwarding 1613 may be completed and acknowledged before the joint transmission of that JTDP commences. The forwarded JTDPs may be MSDUs or MPDUs. In joint transmissions that are transparent for R-WTRU 1603, the PPDUs that are transmitted by AAP 1601 and ATAP 1602 may be identical, including the address fields in the MAC headers and the group IDs in the PLCP headers. They may also be different in TA addresses, frame body, and/or MCS, etc. The MPDUs transmitted by ATAP 1602 may be determined by AAP 1601 along with the TxSpec. Alternatively, AAP 1601 may forward the MSDUs to ATAP 1602 and ATAP 1602 may construct the MPDU as well as the PPDUs on the basis of the channel conditions between itself and R-WTRU 1603, local characteristics, and/or feedback from the R-WTRU 1603, etc.

AAP 1601 and/or ATAP 1602 may notify R-WTRU 1603 of the pending contention-based sequential JTS using a joint transmission notification 1615 frame. Alternatively, AAP 1601 and/or ATAP 1602 may include a joint transmission notification 1615 IE in their beacon, short beacon or any other type of frame to achieve the same purpose. If joint transmission notification 1615 IE is included in a beacon or short beacon, AAP 1601 and/or ATAP 1602 may include it only for the period when it knows that R-WTRU 1603 is not in a power saving mode, and therefore may receive joint transmission notification 1614 IE. If AAP 1601 and/or ATAP 1602 notify R-WTRU 1603 using a uni-cast frame, R-WTRU may acknowledge the reception of joint transmission notification 1615 frame. R-WTRU 1303 may respond to the joint transmission notification 1615 frame with ACK 1616.

AAP 1601 may initiate the JTS by transmitting JT-RTS 1617 to ATAP 1602, which is a modified version of the RTS frame with the following settings. A duration field may contain a duration that is sufficient to have the AAP, ATAP and R-WTRU to transmit 2 JT-CTS frames, a JT-RTS frame and all the joint sequential transmission, the ACK/BAs, plus the appropriate IFSs between the transmitted frames. An RA field may contain the address of the ATAP. A TA field may contain the address of the AAP. A Reference field may contain the references to the pending sequential JTS, such as the ID or the sequence number of the JTS for the particular AAP or for the AAP/ATAP pair. AAP 1601 may update its NAV counter using the duration contained in the duration field of the JT-RTS frame and may cancel the NAV associated with the JT-RTS frame if ATAP 1602 and other APs/WTRUs in the BSS did not detect any transmission after 2×aSIFS_time+JT-CTS_duration+Interval counting from the end of the JT-RTS frame, where aSIFS_time is the duration of a SIFS, JT-CTS_duration is the duration of transmitting a JT-CTS frame and Interval is some arbitrary time interval and may be implemented as Interval=2*aSlotTime+PHY_RX_Delay where aSlotTime is the duration of a Slot.

Alternatively, other APs/WTRUs in the BSS may also elect to go to sleep for power saving. In addition, the APs/WTRUs that have updated their NAV counter using the duration value of the JT-RTS may cancel the NAV associated with the JT-RTS frame if these APs/WTRUs have not detected a JT-RTS frame after 2×aSIFS_time+JT-CTS_duration counting from the end of the JT-RTS frame, but do not detect any transmission after 4×aSIFS_time+JT-CTS_duration+JT-RTS_Duration+JT-CTS_Duration+Interval counting from the end of the JT-RTS frame, where JT-RTS_Duration and the JT-CTS_Duration are the duration needed to transmit a JT-RTS and a JT-CTS frame.

The RSR-WTRU 1603, which has been notified of the pending JTS, may detect from JT-RTS frame 1617 that this JTS is intended for itself by comparing the combination of the TA and the reference field to the JTS in JT-RTS frame 1617. If R-WTRU 1603 has detected that JT-RTS 1617 is meant to initiate a JTS for itself, it should not go into power saving mode and may not need to set its NAV counter. It may recognize from the reference field that the pending JTS is a sequential JTS.

ATAP 1602 may respond to JT-RTS 1617 with JT-CTS 1618 frame with the following settings. The duration field may be set to Duration_in_JT-RTS−aSIFSTime−JT-CTS-_Duration, where Duration_in_JT-RTS is the value contained in the JT-RTS frame, aSIFSTime is the duration of a SIFS and JT-CTS_Duration is the duration needed to transmit a JT-CTS frame.

After a SIFS duration, AAP 1602 and ATAP 1603 may concurrently transmit JT-RTS 1619 and 1620 with the RA address being the address of R-WTRU 1603 and the TA address being the address of AAP 1601 and the duration field set to a duration that is sufficient for AAP 1601, ATAP 1602, and R-WTRU to transmit a JT-CTS, all joint transmissions and the appropriate IFSs. Similarly, the JT-RTS may contain a Reference to the sequential JTS. Alternatively, AAP 1601 and ATAP 1602 may start the joint sequential transmissions of data directly without first performing an RTS/CTS exchange.

AAP 1601 and ATAP 1602 may modify their NAV counter using the duration value. R-WTRU 1603 may respond to JT-RTS 1619 and 1620 by transmitting JT-CTS frame 1621. AAP 1601 and ATAP 1602 may be required to monitor the medium for a JT-CTS that is addressed to AAP 1601. If AAP 1601 and/or ATAP 1602 do not receive such JT-CTS 1621 from R-WTRU 1603, they may send out a CF-End frame, concurrently or separately, to cancel the medium reservation for the JTS at any time during the reserved period. The TA field of the CF-End frame may be set to the MAC address of the AAP. If AAP 1601 or ATAP 1602 has received JT-CTS 1621 from R-WTRU 1603, they may commence the joint sequential transmissions of data 1622 and 1623 to R-WTRU 1603. If a JT TXOP has been reserved using the JT-RTS/JT-CTS and/or RTS/CTS exchanges, AAP 1601 and ATAP 1602 may transmit multiple packets during the TXOP.

If HARQ sequential transmission is used, either AAP 1601 or ATAP 1602 may begin with transmitting its packet data 1622 and 1623, R-WTRU 1603 may send back an ACK/feedback 1622. AAP 1601 or ATAP 1602, whichever has not transmitted, may cancel its transmission if the first transmission has already acknowledged. Otherwise, it may adjust its own PPDU on the basis of the ACK/feedback 1622 from R-WTRU 1603 and transmit after an IFS from ACK/feedback 1622 from R-WTRU 1603. If STBC is used, AAP 1601 or ATAP 1602 may transmit at the same time according to the STBC scheme. The R-WTRU 1603 may process the received signals according the STBC decoding method.

R-WTRU 1603 may then acknowledge the reception of one or multiple packets by sending an ACK 1624, a BA or any other frames, as allowed in the frame exchange sequences. It may also skip the acknowledgement as the ACK policies dictate. After the completion of the JTS, AAP 1601 and ATAP 1602 may, concurrently or separately, send out a CF-End frame to cancel the TXOP that may remain provided that the remaining TXOP is sufficient for such transmissions. Alternatively, AAP 1601 may send out the CF-End first and ATAP 1602 may repeat the CF-End. If a joint transmission has failed, AAP 1601 may decide to retransmit the frame, either individually or jointly in a later contention-based or scheduled-based joint transmission session.

As described above, the AP with which the WTRU is associated may also coordinate with another WTRU, for example, an Assistant WTRU (A-WTRU), to conduct joint transmissions to the WTRU so that the downlink (DL) transmission may take place at a higher rate and therefore provide the WTRU with a higher DL throughput performance.

These multi-WTRU DL joint transmission procedures follow those for multi-AP joint transmissions as described above. The AAP may coordinate the multi-WTRU JTS with WTRUs or the A-WTRU instead of with another ATAP. The A-WTRU may or may not be associated with the AP.

Figure 17A:
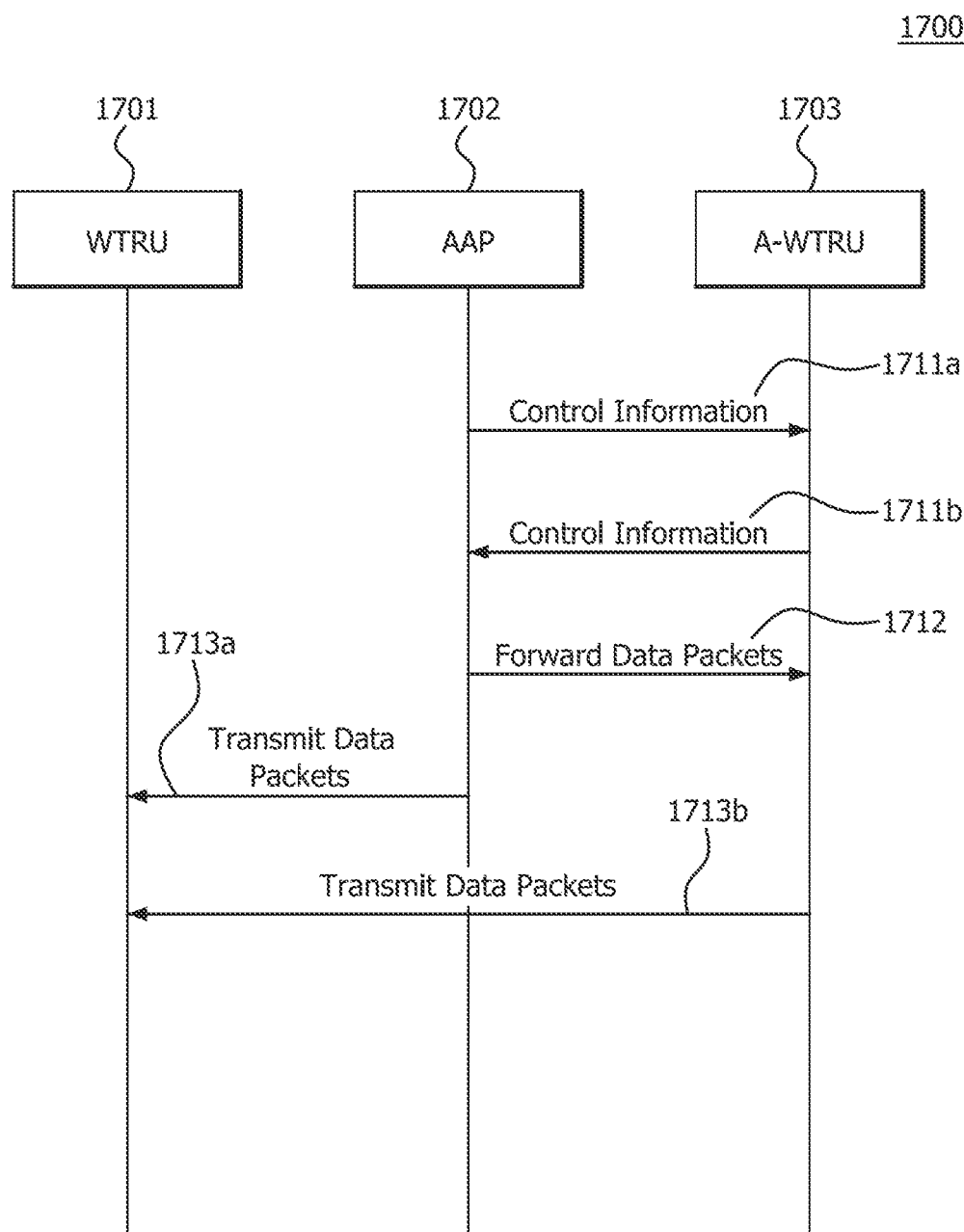
FIG. 17A shows a high level signal flow diagram of an example control information exchange used for multi-WTRU coordinated joint transmission.

FIG. 17A shows a high level signal flow diagram of an example control information exchange used for coordinated joint transmission by an AAP and A-WTRU 1700. In the example of FIG. 17A, AAP 1702 and A-WTRU 1703 may exchange coordination control information 1711a and 1711b to prepare to conduct multi-WTRU joint transmission as described above. Control information 1711a may include a joint transmission request. Control information 1711b may include a joint transmission response. Additionally or alternatively, AAP 1702 may forward data packets 1712 to A-WTRU 1703. AAP 1702 and A-WTRU 1703 may then transmit the data packets 1713a and 1713b to receiving WTRU 1701 in the joint transmission session. The exchange of the coordination information as well as the forwarding of the associated data packets may take places in at least two ways. First, they may be transmitted wirelessly using the same or a separate wireless interfaces including but not limited to another WLAN, UMTS, LTE, WiMAX interface. Second, they may be transmitted over a wired backhaul link.

The AAP may send coordination control information to the A-WTRU concerning the joint transmission using similar coordination control information frames designs as described above. FIG. 17B shows an example joint transmission request frame that may be used for conducting coordination between the AAP and the A-WTRU. The joint transmission request IE may include but is not limited to the following fields and/or information: element ID field 1720, length field 1721, ID field 1722, options field 1723, schedule field 1724, Transmission Specification (TxSpec) field 1725, and request type field 1726.

Element ID field 1720 that may indicate that the IE is a joint transmission request IE. Length field 1721 may contain the length of the joint transmission request IE.

ID field 1722 may contain one or more IDs of: receiving WTRUs that may be the recipient of the joint transmission, a requesting AAP, an A-WTRU being requested, and/or a session ID that may include a sequence number identifying a particular joint transmission session to a particular receiving WTRU or requested by a particular AAP. The ID(s) may be implemented as a MAC address, an AID, or any other type of IDs that the WTRUs may agree on.

TABLE 12

| Example Options | Description |
| --- | --- |
| Number of joint transmission packets | The number of packets expected to be transmitted during the joint transmission sessions |
| Size of joint transmission packets/time/TXOP | The size of the joint transmission packets may be specified in bytes, in transmission time or in TXOP expressed in microseconds or any other time units |
| Data rate (or MCS) expected for the joint transmission session | Data rate (or MCS) used |
| Duration of joint transmission session | Duration used |
| Concurrent Joint Transmission | The A-WTRU may conduct concurrent joint transmission |
| Sequential Joint Transmission | The A-WTRU may conduct sequential joint transmission. The A-WTRU may use one or more of the following specifications to construct the PPDU or PSDU frames containing the data packets forwarded to it by the AAP according to the channel conditions between itself and the receiving WTRU and/or its own transmitting capabilities. The example specifications may include STBC, different MCS, HARQ, and/or different channel coding. |
| Scheduled Joint Transmission | The A-WTRU may conduct joint transmission at a scheduled time according to the Schedule specified by the AAP |
| Coordination Information Forwarding Option | If the ATAP is associated with the AAP, then Regular data exchange over the WiFi interface Joint Transmission Forwarding: a forwarding method that is specially designed for forwarding data and control packets associated with Joint Transmissions Forwarding over DS Forwarding over wireless Forwarding transmission format: Ethernet, 802.11 legacy/a/b/g/n/ac/af/ah, X-1, UMTS, LTE, etc. Forwarding transmission band and channel: channel numbers as well as frequency bands such as sub 1 GHz as for 802.11af and 802.11ah, 2.4 GHz, 5 GHz, 60 GHz, etc. |

TABLE 12-continued

| Example Options | Description |
| --- | --- |
| | If the ATAP is not associated with the AAP, then<br>TDLS<br>DLS<br>OCT<br>Joint Transmission Forwarding: a forwarding method that is specially designed for forwarding data and control packets associated with Joint Transmissions<br>Forwarding over DS<br>Forwarding over wireless<br>Forwarding transmission format: Ethernet, 802.11 legacy/a/b/g/n/ac/af/ah, X-1, UMTS, LTE, etc.<br>Forwarding transmission band and channel: channel numbers as well as frequency bands such as sub 1 GHz as for 802.11af and 802.11ah, 2.4 GHz, 5 GHz, 60 GHz, etc. |
| Data Forwarding Options | If the ATAP is associated with the AAP, then<br>Regular data exchange over the WiFi interface<br>Joint Transmission Forwarding: a forwarding method that may be designed for forwarding data and control packets associated with Joint Transmissions<br>Forwarding over DS<br>Forwarding over wireless<br>Forwarding transmission format: Ethernet, 802.11 legacy/a/b/g/n/ac/af/ah, X-1, UMTS, LTE, etc.<br>Forwarding transmission band and channel: channel numbers as well as frequency bands such as sub 1 GHz as for 802.11af and 802.11ah, 2.4 GHz, 5 GHz, 60 GHz, etc.<br>If the ATAP is not associated with the AAP, then<br>TDLS<br>DLS<br>OCT<br>Joint Transmission Forwarding: a forwarding method that is specially designed for forwarding data and control packets associated with Joint Transmissions<br>Forwarding over DS<br>Forwarding over wireless<br>Forwarding transmission format: Ethernet, 802.11 legacy/a/b/g/n/ac/af/ah, X-1, UMTS, LTE, etc.<br>Forwarding transmission band and channel: channel numbers as well as frequency bands such as sub 1 GHz as for 802.11af and 802.11ah, 2.4 GHz, 5 GHz, 60 GHz, etc. |

Schedule field 1724 may contain various options for the joint transmissions. Example contents of Schedule field 1724 are shown in Table 13.

TABLE 13

| | |
| --- | --- |
| Scheduled start | The scheduled start time of the joint transmission session; the time may be referenced to either APs' TSF timer, GMT or any other reference clock |
| Schedule transmission times | The scheduled transmission times of the joint transmission packets; the times may be referenced to either APs' TSF timer, GMT or any other reference clock |
| Scheduled frequency | How often a joint transmission takes place |
| Scheduled end | The scheduled end of the joint transmission session |
| Current TSF timer | The current TSF timer of the AAP; the times in this schedule may use the AAP's TSF timer as the reference. |

TABLE 13-continued

| | |
|---|---|
| | Alternatively, the reference clock may be specified using this field as well. |
| Estimated mutual clock drift | This subfield contains the estimated clock drift between the reference clock and the local clock at the A-WTRU. The estimated clock drift may also be estimated by monitoring the beacons, short beacons or sync packets or any other types of frames that contains clock reference time. |

TxSpecs field 1725 may contain various options for the joint transmissions. The transmission specifications that are associated with the joint transmissions are included in the TxSpecs field. The TxSpec may be implemented very similarly to the TXVECTOR or as a modified version of the TXVECTOR and may specify MCS, transmit power, channel matrix, pre-coding matrix, etc. If sequential joint transmission is used, the AAP may include TxSpec for the A-WTRU on how to construct the MPDU, such as FCS length, address field values, etc. The A-WTRU may construct the PLCP header and the associated PSDUs/PPDUs based on the TxSpec and the forwarded packets received from the AAP. Example contents of the TxSpecs field 1725 are shown in Table 14.

TABLE 14

| | |
|---|---|
| Channel access method | Scheduled<br>Contention-based<br>Signaled by the AAP |
| AAP transmission specifications | Various transmissions specifications, at which the AAP transmits the original data packet such as MCS, transmit power, channel matrix, pre-coding matrix, etc.<br>The A-WTRU may be able to determine its most optimal setting to transmit the packets to the receiving WTRUs in the joint transmission session based on the AAP's transmission specifications and the channel conditions between the A-WTRU and the receiving WTRU. |

Request type field 1726 may contain various options for the joint transmissions. Example contents of Request type field 1726 are shown in Table 15.

TABLE 15

| | |
|---|---|
| Request type | New joint transmission request<br>Joint transmission request renewal: renewal of the current or previous joint transmission session request<br>End: the end of the joint transmission session |

Although the joint transmission request frame described above is in the form of an IE, any field, subfield, or subset of the elements discussed may be implemented as any part of a management frame, control frame, data frame, or any other type of frame, including all explicit and implicit signaling such as any part of the PLCP/MAC header, frame body, and/or scrambler initialization seeds, etc. The joint transmission request may also be implemented as frames or fields of frames in another type of communication system, for example, LTE, UMTS, any WiFi standards, Ethernet, etc. For example, it may be implemented using the Ethertype 89-0d, with a Payload Type set to 4 or any other numbers between 4-255 to indicate that it contains Joint Transmission Protocol related frames or multi-AP transmission protocol related frames. Additional fields may be included to indicate that the frame contained is of the subtype JTDP. One or more Session IDs may be used to identify a particular joint transmission session to a one or more receiving WTRUs. An ID of the frame, for example, the sequence number of the packet in the joint transmission session identified by the session ID, an ID of the AAP, and/or an ID of the A-WTRU may be included in an additional field.

Once the A-WTRU receives the joint transmission request from the AAP, it may respond with a joint transmission response frame or a management frame, control frame, or any other type of frame containing the Joint Transmission Response IE. The joint transmission response frame may take the same format as shown in the example of FIG. 6. The A-WTRU may accept or reject the JTS.

Figure 18:
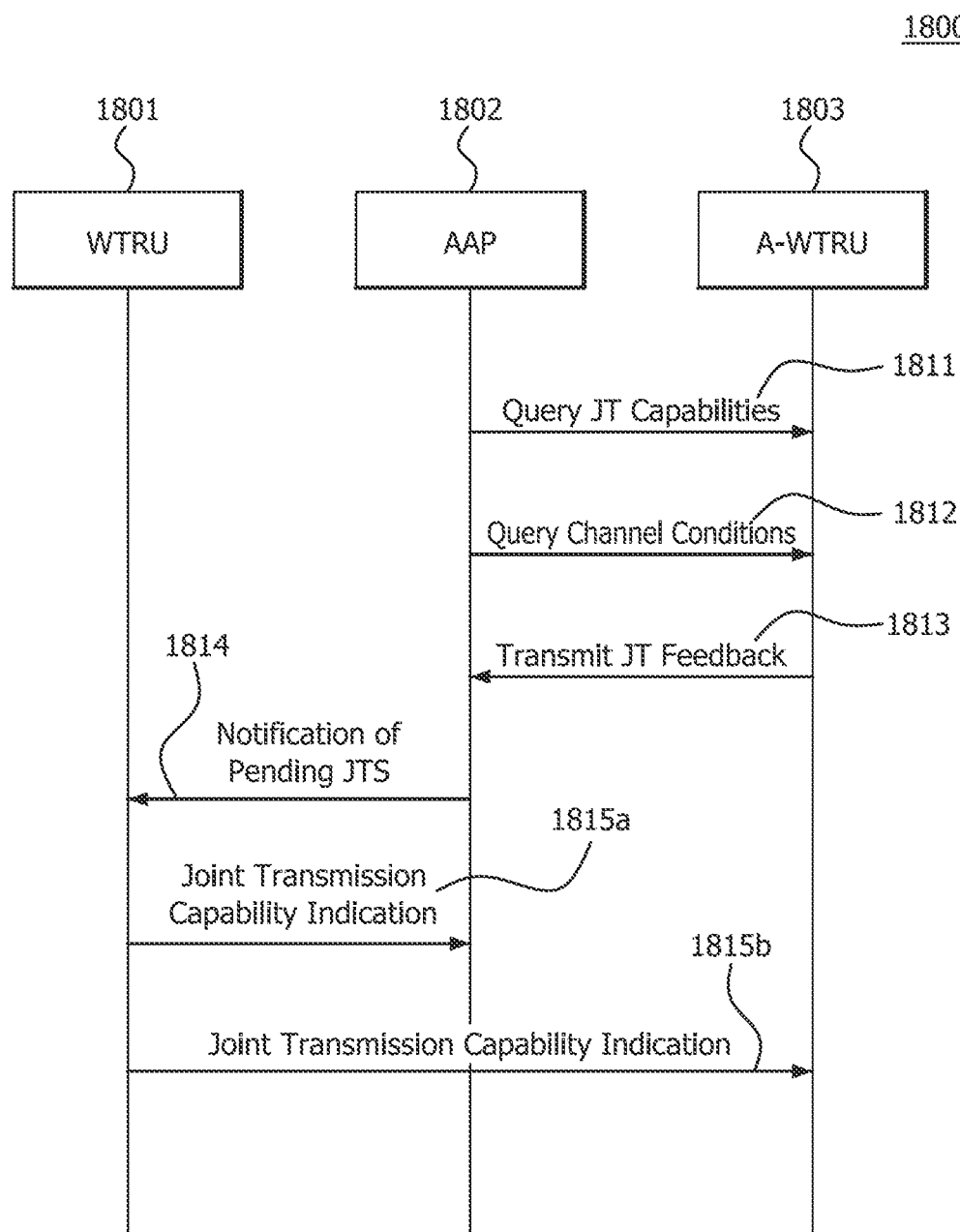
FIG. 18 shows an example flow diagram for determining joint transmission capabilities in APs and preparing for joint transmission.

FIG. 18 shows an example flow diagram for determining joint transmission capabilities in WTRUs and preparing for joint transmission 1800. In the example of FIG. 18, AAP 1802 may query an A-WTRU 1803 on its joint transmission (JT) capabilities 1811 and/or on its channel conditions 1812 associated with one or more WTRUs. When a WTRU is associated with an AP, the AP is fully aware of the WTRU's capability; an AP may need to query a WTRU's capability if that WTRU is not associated with it. A-WTRU 1803 may respond with a joint transmission feedback 1813. WTRU 1801 may then receive notification of the pending joint transmission session 1814 from AAP 1802. WTRU 1801 before participating in the reception of joint transmissions may indicate its joint transmission and reception capability by transmitting to AAP 1802 and/or A-WTRU 1803 a joint transmission capability indication 1815*a* and 1815*b* in any management frame, control frame, or any other type of frame such as Probe Request, Association Request, etc. Alternatively, if concurrent joint transmission is conducted, the joint transmission session may take place transparently to the receiving WTRU. WTRU 1801 may also indicate that it is capable of receiving sequential joint transmissions.

An AAP may query an A-WTRU on its capabilities and its channel conditions to one or more other WTRUs using a joint transmission query frame or any type of frame containing a joint transmission query IE. The joint transmission query frame may be in the same format as defined in the example of FIG. 7B.

When a WTRU is queried by an AP, for example, the AAP, the A-WTRU may respond to the joint transmission query frame by sending a joint transmission feedback frame or any other type of frame containing the joint transmission feedback IE. The joint transmission feedback frame may be in the same format as defined in the example of FIG. 7C.

When the AAP and the A-WTRU have agreed on a JTS, the AAP may inform the receiving of the pending JTS using a joint transmission notification frame or any other type of frame containing the joint transmission notification IE. This may be used in a non-transparent JTS, in which a receiving WTRU may not be aware that it is receiving similar or related data from more than two APs or other WTRUs. For example, in a non-transparent JTS, the AAP and the A-WTRU may transmit MPDUs that may be associated with a particular data packet, but with different TA addresses in the header. It may also be important to notify the receiving WTRU of the pending scheduled joint transmission so that the receiving WTRU does not go into sleep state for power saving. The joint transmission notification IE may be in the same format as defined in the example of FIG. 7D.

The AAP may send the JTDPs to the A-WTRU that may be transmitted to the receiving WTRU during the joint transmission session. The JTDP may be in the same format as defined in the example of FIG. 8.

When concurrent joint transmission is used, the AAP may forward to the A-WTRU the original MPDUs, as well as the transmission specifications used, identical to the ones that the AAP may be transmitting to the receiving WTRUs during the joint transmission. In concurrent joint transmission, both the AAP and the A-WTRU may transmit identical PPDUs that may include the address fields in the MAC headers.

When sequential or scheduled joint transmission is used, the AAP and the A-WTRU may transmit different PPDUs. The AAP may forward the original MSDUs to the A-WTRU along with the transmission specifications for the AAP and/or for the A-WTRU. The AAP may determine the transmission specification for the A-WTRU when transmitting during the joint transmission session. Alternatively or additionally, the A-WTRU may determine its own transmission specifications based on the channel condition between itself to the receiving WTRU and/or the transmission specifications used by the AAP. In order for an AAP to forward JTDPs to an A-WTRU, the same association procedure of FIG. 9 described above may be used. The procedure in FIG. 9 may be used in order for the A-WTRU to authenticate and then establish RSNA with the receiving WTRU in order to enter State 4 in order to transmit and receive all classes of frames to and from the A-WTRU. Alternatively, if the A-WTRU is within the same BSS as the receiving WTRU, it may establish a TDLS or DLS connection with the receiving WTRU so that the A-WTRU and the receiving WTRU may exchange frames of all classes. The AAP and the receiving WTRU may be authenticated and associated, and they may also be in State 4 of authenticated and RSNA Established or Not Required.

Figure 19:
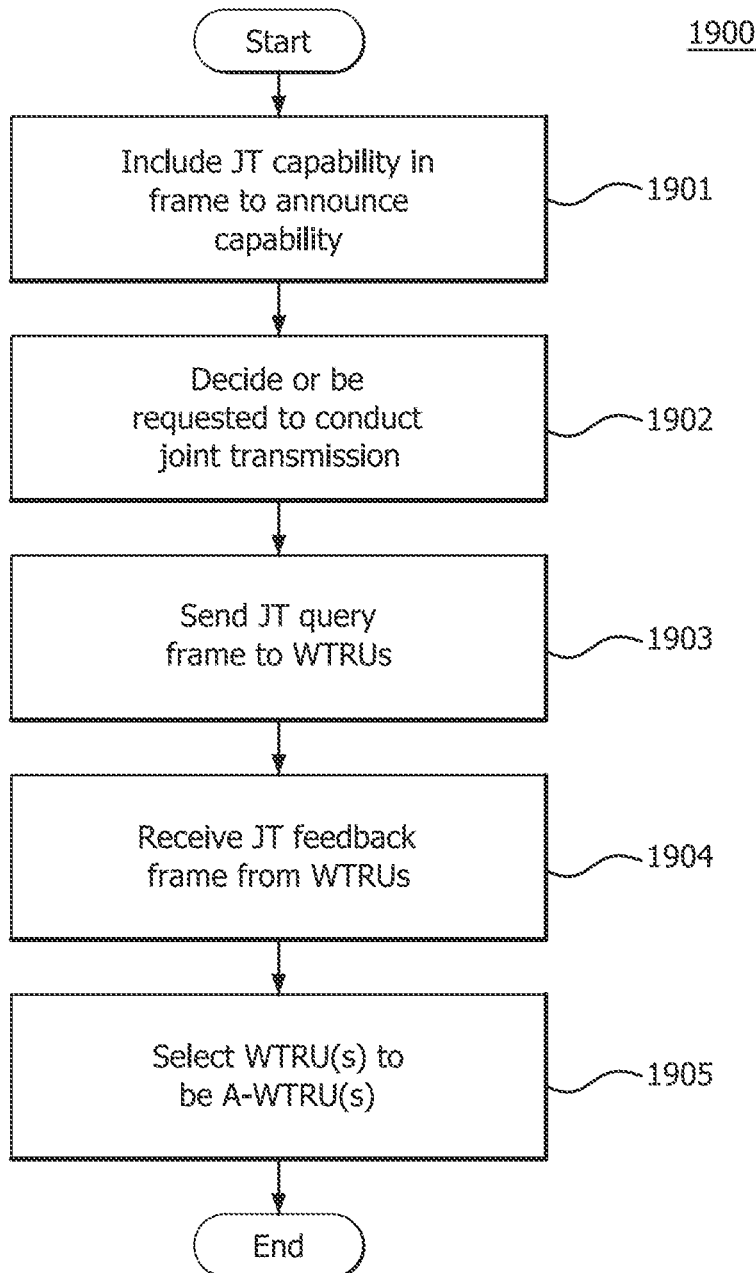
FIG. 19 shows an example procedure for selecting an A-WTRU for coordinated joint transmission in the downlink.

FIG. 19 shows an example procedure for selecting an A-WTRU for coordinated joint transmission in the downlink 1900. In the example procedure of FIG. 19, the AAP may include a joint transmission capability indication in its beacon, probe response, association response, or any other type of management and control frame to announce 1901 its capabilities.

The AAP may then be requested or decide to conduct joint transmission with a particular receiving WTRU 1902. A receiving WTRU that may want to participate in the reception of joint transmissions may indicate its joint transmission and reception capability by including a joint transmission capability indication in any management frame, control frame, or any other type of frame such as probe request, association request, etc. Alternatively, if concurrent joint transmission is conducted, the joint transmission session may take place transparently to the receiving WTRU. For sequential joint transmissions, either scheduled or unscheduled, however, the receiving WTRU must indicate that it is capable to receive sequential joint transmissions. The AAP may detect that joint transmission may be needed to provide more uniform coverage for a receiving WTRU in its BSS. Alternatively or additionally, the WTRU may also desire a better performance such as a higher throughput and request the AAP to conduct joint transmissions to achieve that.

The AAP, upon deciding or being requested to conduct joint transmissions may send a joint transmission query frame 1903 to one or more WTRUs to obtain the channel conditions between them and one or more receiving WTRUs based on the capabilities and/or radio measurement that it has obtained from the receiving WTRU. This measurement may be similar to a beacon measurement. The AAP may send the joint transmission query to the WTRUs which are not known to have joint transmission capabilities. The AAP may also query the joint transmission capabilities of the WTRUs if they are not known beforehand.

These WTRUs that are queried may respond with joint transmission feedback frame 1904 providing channel quality indication, other measurements, and/or preferred joint transmissions options and/or joint transmission TxSpec that the responding AP/WTRU has determined locally based on its local situation such as channel conditions, traffic load, transmit power limits, etc.

Based on the joint transmission feedback that the AAP received from all the WTRUs, the AAP may select one or more WTRUs as the A-WTRU 1905 for a joint transmission session with one or more receiving WTRUs. The selection criteria for an A-WTRU may be similar to those for an ATAP as described above.

Alternatively or additionally, at any time an AAP may exit the above procedure and may conduct a joint transmission capability procedure as described in FIG. 7A by transmitting a joint transmission query frame to one or more neighboring WTRUs to obtain their joint transmission capabilities as described above.

Once the AAP has selected the A-WTRU for a joint transmission session for one or more receiving WTRUs, the AP and A-WTRU(s) may conduct multi-WTRU joint transmission. Similar to the multi-AP joint transmission, the AAP and the A-WTRU may conduct various types of joint transmissions including contention-based concurrent joint transmissions, contention-based sequential joint transmission, scheduled concurrent joint transmissions, and scheduled sequential joint transmissions. The procedures for these joint transmissions may follow those for multi-AP joint transmission with the A-WTRU replacing the ATAP as described in the examples of FIGS. 11, 12, 15, and 16.

When the A-WTRU and the receiving WTRU are in the same BSS and are associated with the AAP, the joint transmission procedure may be optimized. For example, for scheduled concurrent and sequential joint transmissions, the AP may include the JTS information such as schedule information, JTS ID or sequence number, etc., in its beacon, short beacon or any other type of management frame or control frame, or any other type of frame that is received by all WTRUs of the BSS. Because this information may not have been transmitted separately in uni-cast frames, frames such as joint transmission request may be shortened, and frames such as joint transmission notifications may not be necessary, which may lead to higher MAC efficiency and higher system throughput.

Figure 20:
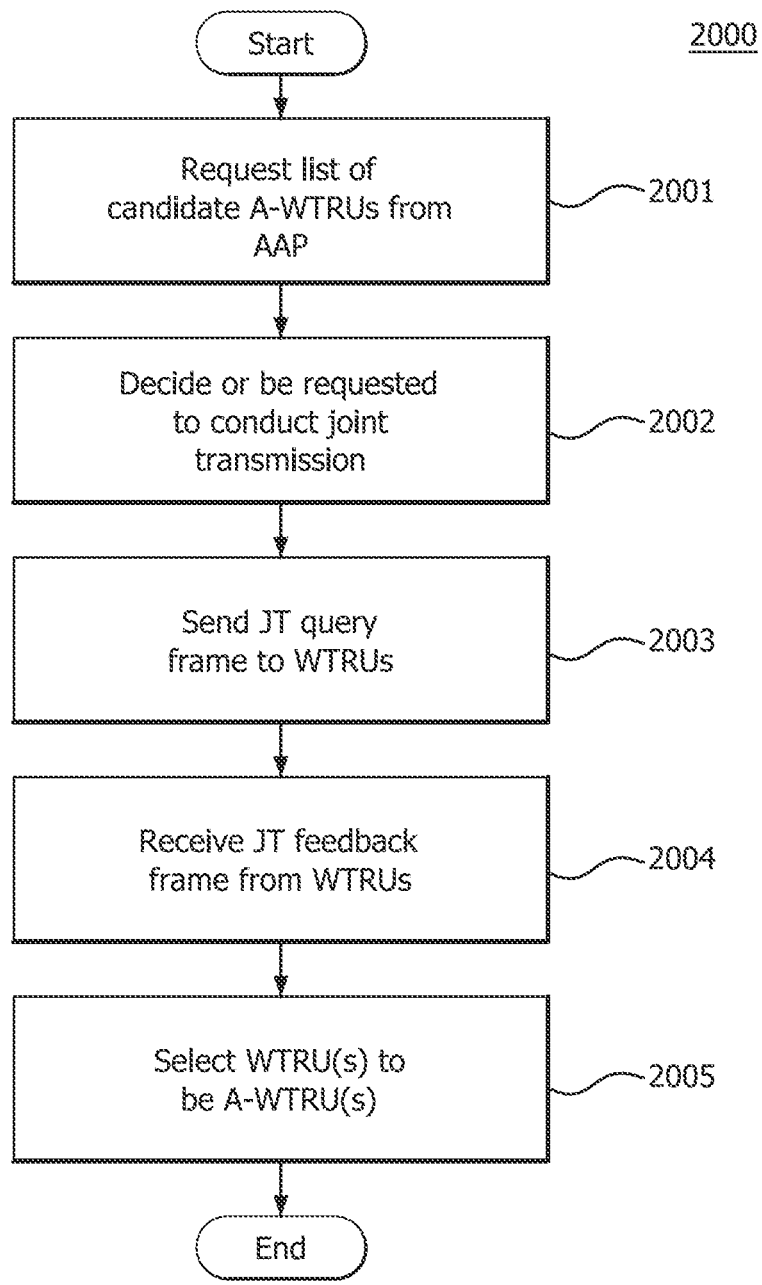
FIG. 20 shows an example procedure used by a C-WTRU for selecting an A-WTRU for coordinated joint transmission in the uplink.

FIG. 20 shows an example procedure used by a C-WTRU for selecting an A-WTRU for coordinated uplink joint transmission 2000. The Multi-WTRU UL joint transmission signaling and procedures may follow those of multi-AP and multi-WTRU joint transmissions in the DL. A C-WTRU may use the same A-WTRU for multi-WTRU joint transmission in the UL as the A-WTRU used by the AAP in the multi-WTRU DL Joint Transmission.

The C-WTRU may request a list of candidate A-WTRUs from the AAP 2001. An AAP that wants to participate in the reception of joint transmissions may indicate its joint transmission and reception capability by including a joint transmission capability indication in any management frame, control frame, or any other type of frame such as a beacon, probe response, association response, etc. Alternatively, if concurrent joint transmission is conducted, the joint transmission session may take place transparently to the AAP. For sequential joint transmissions, either scheduled or unscheduled, however, the AAP must indicate that it is capable to receive sequential joint transmissions.

The C-WTRU may then be requested or decide to conduct joint transmission with a particular receiving WTRU 2002. The decision to conduct multi-WTRU joint transmission in the UL may result from the AAP detecting that joint transmission is needed to provide more uniform coverage for a WTRU in its BSS. Alternatively or additionally, the WTRU may desire improved performance such as a higher throughput and request that the AAP receive joint transmissions in order to improve performance.

The C-WTRU, upon deciding or being requested to conduct joint transmissions may send a joint transmission query frame 2003 to one or more WTRUs to obtain the channel conditions between them and the AP based on the capabilities and/or radio measurement that it has obtained from the AP. The C-WTRU may query the joint transmission capabilities of the WTRUs if they are not known beforehand.

WTRUs that are queried may respond with a joint transmission feedback frame 2004 providing channel quality indications, other measurements, and/or a preferred joint transmissions options and/or joint transmission TxSpec that the responding WTRU may have determined locally based on its local situation, including but not limited to channel conditions, traffic load, and/or transmit power limits.

Based on the Joint Transmission Feedback that the C-WTRU received from all the WTRUs queried, the C-WTRU may select one or more WTRUs as the A-WTRU for joint transmission session to the AP 2005.

The forwarding of coordination information and the JTDPs from the C-WTRU to the A-WTRU may be transmitted over various medium and interfaces including wireless or wired. The coordination information may be implemented as fields of frames in another type of communication systems such as LTE, UMTS, WiMAX, any WiFi standards, Ethernet, etc. For example, it may be implemented using the Ethertype 89-0d, with a Payload Type set to 6 or any other numbers between 4-255 to indicate that it contains joint transmission protocol or multi-AP transmission protocol data frames. In addition, the forwarded coordination information and the JTDPs may also be sent over the TDLS, DLS or OCT connections.

Once the C-WTRU has selected the A-WTRU for a joint transmission session for one or more receiving APs, the WTRUs may conduct multi-WTRU joint transmission. Similar to the multi-WTRU joint transmission in the DL, the C-WTRU and the A-WTRU may conduct various types of joint transmissions including contention-based concurrent joint transmissions, contention-based sequential joint transmission, scheduled concurrent joint transmissions, and scheduled sequential joint transmissions. The procedures for these joint transmissions may follow those for multi-WTRU joint transmission with the C-WTRU replacing the AAP, and the receiving AP replacing the receiving WTRU (R-WTRU) as described in the examples of FIGS. 11, 12, 15, and 16.

Figure 21A:
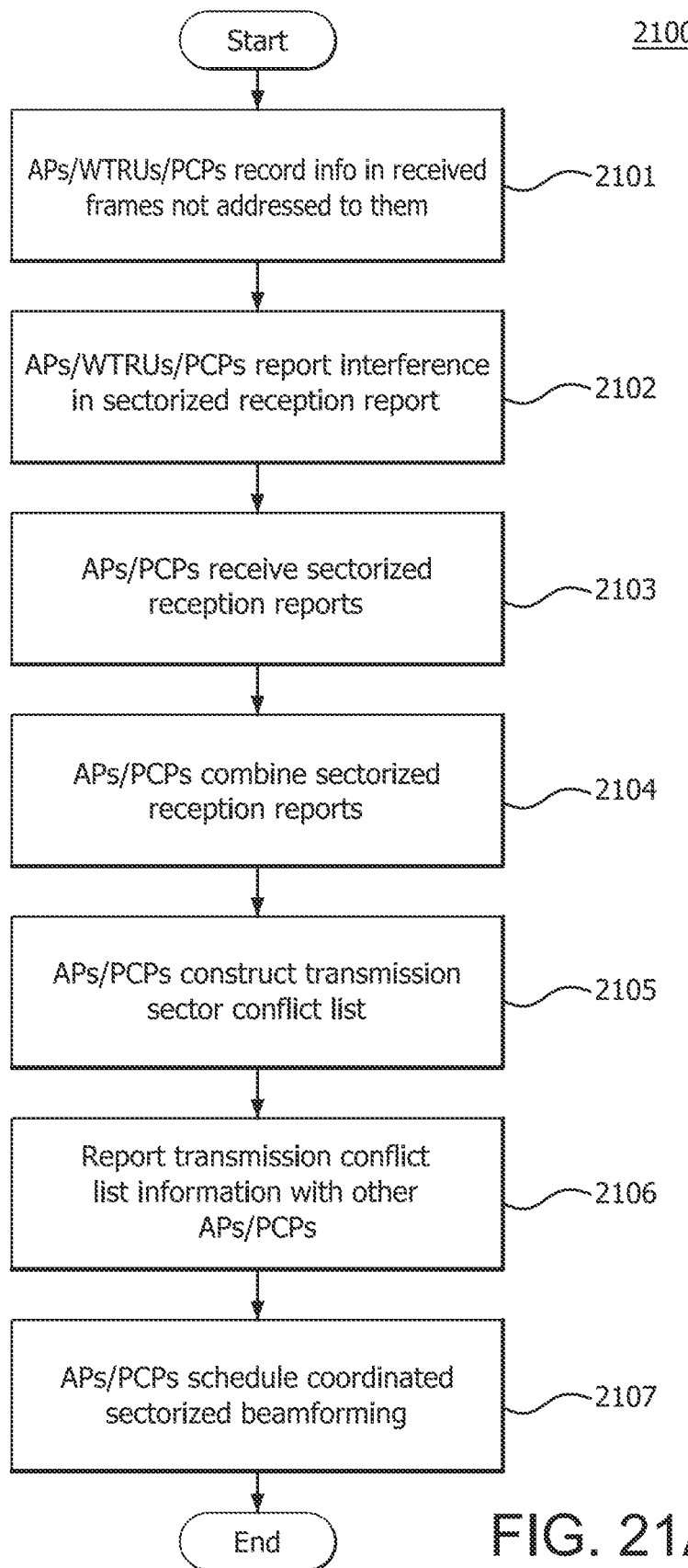
FIG. 21A shows an example procedure for enabling coordinated sectorized operation or beamformed transmissions through AP/PCP/WTRU negotiations.

FIG. 21A shows an example procedure for enabling coordinated sectorized operation or beamformed transmissions through AP/PCP/WTRU negotiations in accordance with a second embodiment 2100, which may be used in combination with any of the embodiments described herein. Performing a sectorized transmission or a beamformed transmission that also may be conducted jointly by multiple APs may not only increase throughput, but also reduce interference. When several BSS are overlapping the APs, WTRUs, or PCPs may be able to conduct concurrent coordinated sectorized operation or beamformed transmissions while ensuring that the transmitted signals are not interfering with each other at the respective receiving WTRUs.

When used herein, a sectorized operation refers to when a WTRU and AP transmit and receive within a sector, which is an angular portion of the AP's coverage to which a WTRU may associate. Sectors are based on area.

When used herein beamformed transmissions refer to transmission using a signal processing technique used by both WTRUs and APs that controls the directionality of the transmission and reception of radio signals. Each AP or WTRU may have specific channels for directional transmission and/or reception.

WTRUs may observe sectorized operation or beamformed transmissions from an overlapping BSS or an overlapping PBSS, which may interfere with that WTRU's transmission or reception of data packets. System capacity may be significantly increased if overlapping BSSs coordinate in such a way that their sectorized or beamformed transmissions/receptions limit their interference for any other concurrent sectorized or beamformed transmissions/ receptions in other PBSSs, BSS, etc.

APs, WTRUs, or PCPs in overlapping BSSs may record information in received frames that are not addressed to them 2101. The APs, WTRUs, or PCPs may then report interference they experience in a beamformed or sectorized reception report 2102. The AP/PCP in the BSS may then receive the beamformed or sectorized reception report 2103, and then combine the beamformed or sectorized reception reports 2104. The APs/PCPs may then construct a transmission conflict list 2105 based on the beamformed or sectorized reception reports and the reported interference contained in those beamformed or sectorized reception reports. The APs/PCPs may then report the transmission conflict list information with other APs/PCPs 2106. The APs/PCPs may then schedule coordinated sectorized or beamformed transmissions based on the reported transmission conflict list information 2107. Inter-BSS or inter-PBSS coordinated beamformed or sectorized transmissions may be achieved through WTRU negotiations using the procedure described above and may be applied to enable concurrent sectorized operation or beamformed transmissions within a WLAN BSS or OBSS. These coordinated sectorized or beamformed transmissions may reduce interference. For example, in this embodiment, an AP/PCP may divide its BSS coverage into sectors and transmit and receive from only one or more sectors at a given time in accordance with the schedule derived from the transmission conflict list created in step 2106.

Figure 21B:
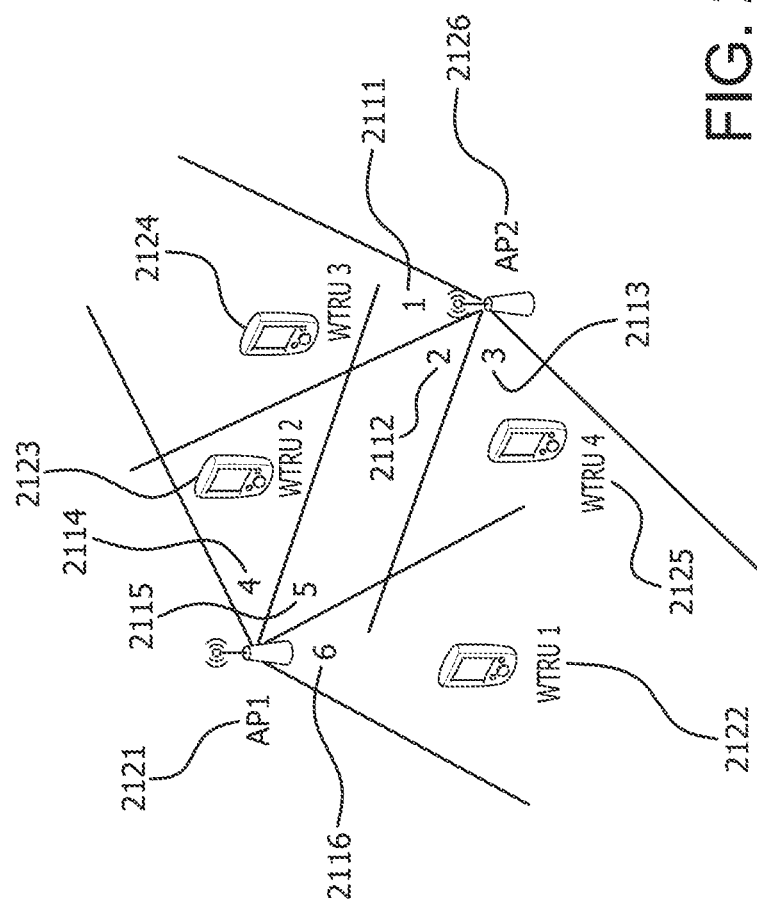
FIG. 21B shows an example of a system using sectorized or beamformed transmissions and receptions.

FIG. 21B shows an example of a system using sectorized or beamformed transmissions and receptions. The system of FIG. 21B may consist of a first BSS that includes AP1 2121, WTRU1 2122, WTRU2 2123, sector 4 2114, sector 5 2115, and sector 6 2116. A second BSS may include AP2 2126, WTRU3 2124, and WTRU4 2125, sector 1 2111, sector 2 2112, and sector 3 2113. As shown in FIG. 21B, the sectors may overlap.

In the example of FIG. 21B, the sectorized transmission and receptions may interfere with each other in the overlapping BSSs (OBSSs). AP1 2121 when transmitting in sector 4 2114 to WTRU2 2123 may interfere with the sectorized transmissions from AP2 2126 to WTRU3 2124. Similarly when AP2 2126 transmits in sector 2 2112, it may interfere with the reception at AP1 2121. In this example, transmit power associated with the sectorized or beamformed transmission may often be concentrated in certain directions. Due to the strongly directional transmissions, multiple sectorized transmissions may take place concurrently to increase aggregated system throughput. The directional transmissions may also cause severe interference for a receiver that may be located inside the transmission beams.

When coordinated sectorized operation or beamforming is used, the WTRU1 2122 may report using a beamformed or sectorized reception report that it experiences interference from sector 3 2113 of the second BSS when AP2 2126 transmits to WTRU4 2125. WTRU1 2122 may also report using a beamformed or sectorized reception report that it experiences interference when AP2 2126 transmits sectorized/beamformed or omnidirectional beacons. Similarly WTRU2 2123 may report using a beamformed or sectorized reception report that it experiences interference from sector 2 2112 of the second BSS when AP2 2126 transmits beacons in sector 2 2112. AP1 2121 may also record any interference it experiences when it is in omni-directional reception mode. When using receiver sectorization in sector 5 2115, AP1 2121 may also record any interference from sector 2 of the second BSS when AP2 2126 transmits beacons either omni-directionally or in a sectorization operation mode.

As stated above, when a WTRU, PCP or AP receives a frame that is not addressed to them, they may record information in the received frames in accordance with the procedure described in FIG. 21A. An example of such information is shown in Table 16.

TABLE 16

| Information | Description |
| --- | --- |
| Transmitter Address | |
| Receiver Address | |
| BSSID | |
| Beamformed or not-beamformed | Whether the received packet is transmitted in beamformed or not. Such information may be obtained from the PLCP header, such as beamformed indication in a SU VHT frame, or Group ID that is not 0 or 63 in a MU-MIMO VHT frame or other fields designed to indicate beamformed transmissions. |
| Sector ID | The Sector ID may be obtained from the frame that is a sectorized beacon frame, sectorized short beacon, or from frames belonging to an Initiator Sector Sweep (ISS), Responder Sector Sweep (RSS), and Sector Sweep Feedback, or any other type of frames such as management, control, and data frames. |

TABLE 16-continued

| Information | Description |
| --- | --- |
| Reception Mode | Whether the current reception mode at the receiving WTRU, PCP or AP is omni-directional, quasi-omni, directional, etc. |
| Reception Mode Information | The reception mode information may include detailed descriptions of the reception mode, such as receiver beamforming patterns/weights, or whether the receiving WTRU was receiving directionally towards a sector of its PCP, AP or another WTRU, or whether the receiving PCP or AP was receiving directionally towards a WTRU, another PCP or AP. |

As stated above, the APs, PCPs, or WTRUs may then send the recorded information on their observed transmissions to the PCP or AP in their BSS periodically using a sectorized reception report in accordance with the procedure described in FIG. 21A. The sectorized reception report may be sent in a frame and implemented as an information element, a management frame, control frame, data frame, or any other type of frame, fields, or subfields of any type of frame.

FIG. 22 shows an example design of a beamformed or sectorized reception report IE 2200. A beamformed or sectorized reception report may contain the following fields and/or information: an element ID field 2201 that may indicate that the IE is a sectorized reception report IE, a length field 2202 that may contain the length of the sectorized reception report IE, an ID field 2203, a reception mode field 2204, a reception mode information field 2205, a number of reporting fields field 2206, and one or more reporting fields 2207 and 2208.

The ID field 2203 may indicate the IDs of the reporting WTRUs. The IDs may be implemented as a MAC address, a BSSID, an SSID, an AID, or any other type of IDs that the WTRUs may have agreed upon. Alternatively, the ID of the reporting WTRU may be indicated in the any address field of the MAC header, such as the TA. The target of the beamformed or sectorized reception report may be indicated in any address field of the MAC header such as the RA field. The ID field may include a sector ID that may include the ID of the sector of the PCP/AP/PBSS/BSS in which the reporting WTRU is located.

The reception mode field 2204 may indicate the mode that the reporting AP, PCP, or WTRU is in when observing the reported transmissions that are not destined for it. Reception mode may be omni-directional (standard), quasi-omni-directional or directional. One beamformed or sectorized reception report frame/IE may contain reception reports for one or more reception modes of the reporting WTRU. For example, a reporting WTRU may send a separate beamformed or sectorized reception report frame for each reception mode that it has been operating in the past reporting period. In another example, the reporting WTRU may include multiple beamformed or sectorized reception report IEs in a frame, with each IE for a different reception mode. In a third example, a beamformed or sectorized reception report may contain reporting fields for multiple reception modes. In the case there are reception reports for multiple reception modes, the beamformed or sectorized reception report IE may include multiple reception mode fields, reception mode information fields, and multiple series of reporting fields, one for each Reception Mode.

The reception mode information field 2205 may contain detailed information on the reception mode(s) specified in the reception mode field. For example, for a directional reception mode, one or more of the following details may be indicated: beamforming weights; direction towards the AP or PCP, (P)BSS; ID of the sector of the AP, PCP or WTRU in which the receiving WTRU received a beamformed transmission; and ID of the RX sector that the receiving WTRU was using in directional reception mode.

The number of reporting fields field 2206 may indicate the number of reporting fields included for the reception mode specified. There may be n reporting fields 2207 and 2208, for example, for each reception mode. Each reporting field may be referred to as reporting field 1-n.

FIG. 23 shows an example of a reporting field 2300. A reporting field may contain the following fields: BSSID field 2301, Tx ID field 2302, Rx ID field 2303, Tx mode field 2304, Tx mode information field 2305, Tx time field 2306, and measurements field 2307.

The BSSID field 2301 may indicate the BSSID of the BSS or PBSS in which the received packets are transmitted.

The Tx ID field 2302 may indicate the ID of the transmitting AP, PCP, or WTRU. The ID may be implemented as a MAC address, a BSSID, an AID, a partial AID, a Group ID, or any other type of IDs that the WTRUs may have agreed upon. The Tx ID may be taken from the TA field of the received packets.

The Rx ID field 2303 may indicate the ID of the receiving AP, PCP, or WTRU for which the received packets were destined. The ID may be implemented as a MAC address, a BSSID, an AID, a partial AID, a Group ID, or any other type of IDs that the WTRUs agreed upon. The Rx ID may be taken from the RA field of the received packets.

The Tx mode field 2304 may contain a transmission mode of the received packet. The transmission mode may be omni-directional or directional. Such information may be obtained from the PLCP header, such as beamformed indication in a SU VHT frame, or Group ID that is not 0 or 63 in a MU-MIMO VHT frame, or any other fields designed to indicate such information.

The Tx mode information field 2305 may contain detailed information on the reception mode(s) specified in the reception mode field. For example, for directional reception mode, one or more of the following details may be indicated: beamforming weights, which may be obtained from, for example, a sounding packet; an ID of the sector of the transmitting AP, PCP, or WTRU that was used for transmitting the received packets; and an ID of the sector of the AP/PCP/BSS/PBSS that the AP, PCP, or WTRU receiving the packets is located.

The Tx time field 2306 may include the starting times, durations, and/or ending times of the received packets on the wireless medium.

The measurements field 2307 may contain the measurements of the received packets, including but not limited to an average or peak RSSI or RCPI.

As described above, the PCP or AP may then combine the beamformed or sectorized reception report frames in accordance with the procedure described in FIG. 21A. The PCP or AP may combine the beamformed or sectorized reception report from a subset of WTRUs according to some criteria. For example, the beamformed or sectorized reception report frames from the WTRUs located in a particular sector of the PCP/AP/PBSS/BSS may be combined together. In another example, the beamformed or sectorized reception report frames from the subset of WTRUs that experience interference from the same PBSS/BSS may be combined. In addition, the PCP or the AP may combine the beamformed or sectorized reception report frames with its own interference observations to construct a transmission sector conflict list in accordance with the procedure described in FIG. 21A. Table 17 is an example design of a transmission sector conflict table based on a transmission conflict list.

TABLE 17

| Sector ID (Or a subset of WTRUs) | (P)BSS 1 | (P)BSS 2 | ... | (P)BSS N |
|---|---|---|---|---|
| 1 | Sector 4, 5 Or WTRU1, WTRU2, AP1 (omni-directional tx) | NA | ... | Sector 1 Or WTRU16 to WTRU20 (beamformed tx) |
| 2 | Sector 5, 6 Or WTRU93 to WTRU1 (beamformed tx) | NA | ... | Sector 15 Or WTRU21 to AP5 & AP5 to WTRU21 (beamformed tx) |
| ... | ... | ... | ... | ... |
| M | NA | Sector 23 Or WTRU75 (omni-directional tx) | ... | NA |

A transmission sector conflict table indicates that when one particular sector (or a subset of a WTRUs) of the current PBSS/BSS/AP/PCP is transmitting or receiving a packet, the reception of that packet may experience interference from (P)BSS1-(P)BSSN if the indicated conflict sectors are transmitting/receiving as well. Alternatively or additionally, the interfering WTRUs (either omni-directional or directional transmission and receptions) in these (P)BSSs may be identified. In another example, the beamformed or sectorized transmissions from a particular transmitting WTRU to a particular receiving WTRU may be marked as conflicting with the transmissions/receptions for a particular (P)BSS Sector or a subset of WTRUs.

The conflict sectors/WTRUs may be deduced from the beamformed or sectorized reception report from the reporting WTRUs. When a WTRU reports that it receives either omni-directional or directional transmissions from other WTRUs in a particular sector of a different (P)BSS, the WTRU may need to transmit at a different time in that sector in order to avoid interference. An example of the transmission sector conflict table for the example system shown in FIG. 21B is illustrated in Table 18.

TABLE 18

| Sector ID (Or ID of a subset of WTRUs) | BSS2 | ... |
|---|---|---|
| 3 | Sector 2 AP1 (omni-directional & directional tx) | ... |
| 4 | Sector 2 AP1 (omni-directional & directional tx) | ... |
| 5 | Sector 5 AP2 to WTRU4 (directional tx) | ... |

Figure 24:
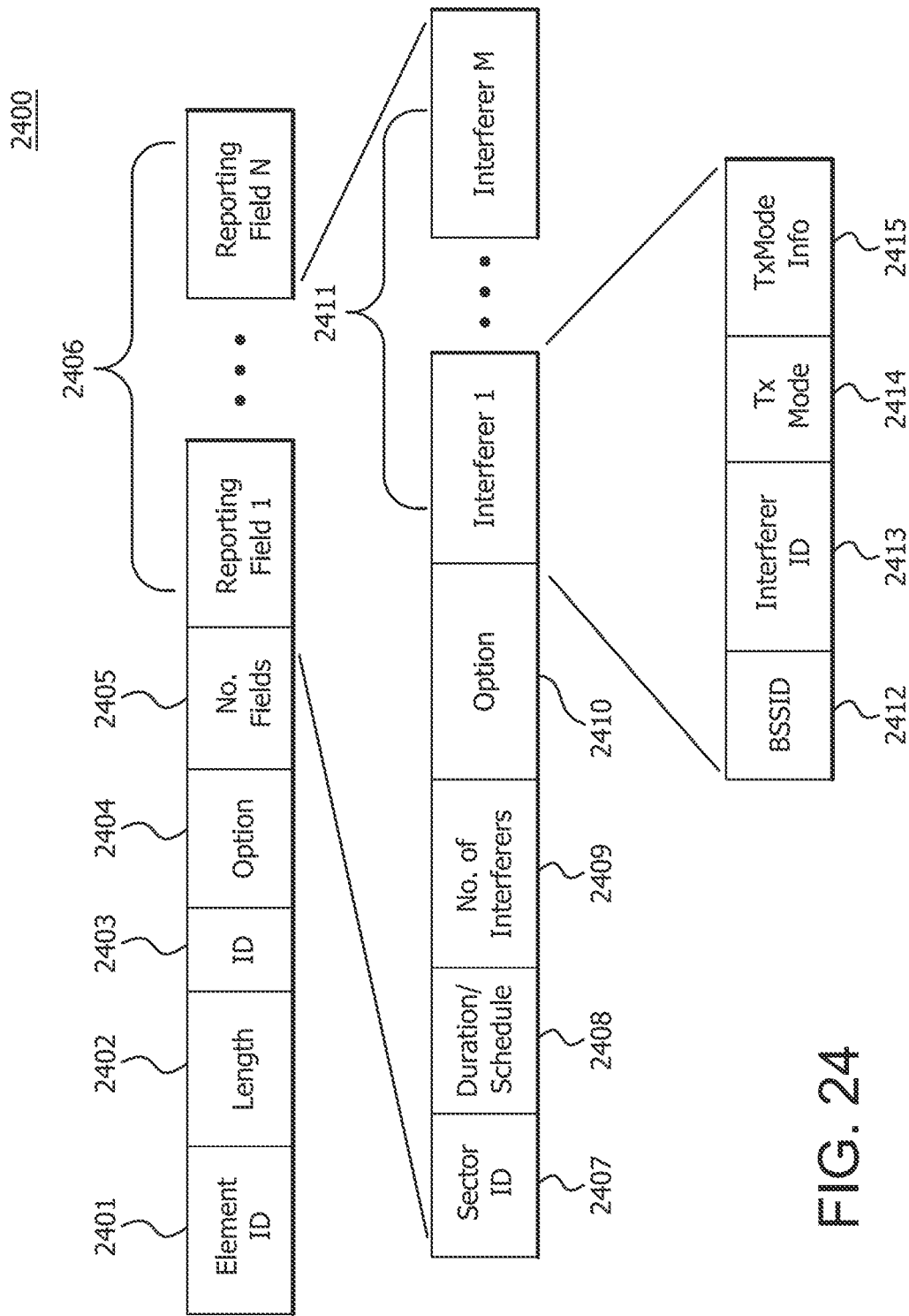
FIG. 24 shows an example design of a transmission sector conflict IE for sharing a transmission sector conflict lists or tables.

The transmission sector conflict list or table may be shared among APs/PCPs using transmission sector conflict frames that may be implemented as control, management or any other type of frames or fields, subfields or IEs in other frames. The APs/PCPs may share the transmission conflict information using the transmission sector conflict report frames with each other or with one or more coordinating PCPs/APs, such as a WiFi Controller or Admission Controller. FIG. 24 shows an example design of a transmission sector conflict IE for sharing a transmission sector conflict list or table 2400. The transmission sector conflict IE may contain the following fields: an element ID field 2401 that may indicate that the IE is a transmission sector conflict report IE, a length field 2402 that may contain the length of the transmission sector conflict report IE, an ID field 2403, an option field 2404, a number of fields field 2405, and a reporting field 1-N 2406.

The option field 2404 may include the options of reporting the conflicting transmissions. For example, a sector in an OBSS may be indicated as interfering for a particular sector of the reporting (P)BSS. In another example, the MAC addresses of a transmitting and receiving WTRUs may be indicated as the interfering directional transmission for a particular sector.

The number of fields 2405 field may include the number of included reporting fields contained in the transmission sector conflict IE. Each reporting field 2406 may be referred to as reporting field 1-N 2406, and may contain the reports of interferers for one or more sector or beam (or a subset of WTRUs). One or more reporting fields may be used to report interferers for one sector or beam or a subset of WTRUs.

Each reporting field 2406 may include a sector ID field 2407, a duration/schedule field 2408, a number of interferers 2409 field, an option field 2410, and one or more interferer fields that may be referred to as interferer field 1-M 2411.

The sector ID field 2407 may include the ID of the (P)BSS sector for which the interferers are being reported. Alternatively, it may include the ID(s) of a subset of WTRUs, such as Group ID.

The duration/schedule field 2408 may contain the targeted duration or the schedule of the targeted transmission time for the sector or the subset of the WTRUs identified by sector ID field 2407. This field may indicate a desired duration/schedule for the identified sector or subset of WTRUs by the PCP/AP.

The number of interferers field 2409 may include the number of interferers being reported within the reporting field.

Each reporting field may also contain an option field 2410 for reporting the conflicting transmissions. Each interferer field 2411 may contain the information for one or more interferers depending on the specifications of the option field 2410.

The interferer field 2411 may contain the following subfields: a BSSID subfield 2412 that may indicate the BSSID of the interfering (P)BSS, an interferer ID subfield 2413, a Tx mode subfield 2414, and a Tx mode information subfield 2415.

The interferer ID subfield 2413 may indicate the ID of one or more or a group of interferers according to specifications in the option field. For example, this field may contain the ID of the sector that is interfering. In another example, this field may contain a transmitting and receiving WTRU pair whose directional transmissions cause interference for a sector in the report BSS.

The Tx mode subfield 2414 may contain information identical to that contained in similar fields in the sectorized reception report frame.

The Tx mode information field 2415 may contain information identical to that contained in similar fields in the Sectorized Reception Report frame.

The coordinated sectorized or beamformed transmissions may be scheduled in distributed or centralized fashion in accordance with the procedure described in FIG. 21A. In the distributed method, the APs/PCPs may decide a schedule based on a pre-determined order after receiving the transmission sector conflict report frames from other APs/PCPs of overlapping (P)BSS. For example, such an order may be the order of their MAC addresses/BSSID/SSID. The AP/PCP of the lowest (or highest) MAC address may determine its schedule for transmitting its sectors. Then the PCP/AP of the second lowest (or second highest) MAC address may determine its schedule for transmitting its sectors based the schedule of the first PCP/AP and the transmission sector conflict report. The remaining APs/PCPs may follow the same process until the schedules for all sectors of all APs/PCPs are determined.

In another example, the AP/PCP of the lowest (or highest) MAC address may determine its schedule for transmitting for one of its sectors. Then the AP/PCP of the second lowest (or second highest) MAC address may schedule its first sector based on the transmissions scheduled so far and the transmission sector conflict report frames. The AP/PCP of the lowest (or highest) MAC address may then determine its schedule for transmitting for a second sector when all APs/PCPs have determined the schedule for their first sector. The process may continue until all APs/PCPs have scheduled all transmissions for all of their sectors.

In the centralized method, one or more coordinating APs/PCPs, which may be one of the APs/PCPs actively participating in the coordinated sectorized or beamformed transmissions, may determine the transmission schedules for all conflict sectors in all overlapping (P)BSSs. The schedules for transmitting in different sectors may then be distributed to all other APs/PCPs. For example, in a PBSS headed by a PCP, the transmission sector conflict report frame may be shared with their AP, which may become the coordinating AP. The coordinating AP may then subsequently determine the schedule for all sectors in the PBSSs and distribute the scheduling to the PCPs. The PCPs then may subsequently distribute the scheduling of sector transmissions to the WTRUs, either explicitly or implicitly, by transmitting a trigger frame such as a directional sectorized beacon frame or short beacon frame.

In both the distributed and centralized method, scheduling concurrent transmissions may take into account of the interference for both the transmitting and receiving WTRUs since the receiving WTRUs often may respond with a response frame, such as an ACK, a BA, or a short ACK.

Figure 25B:
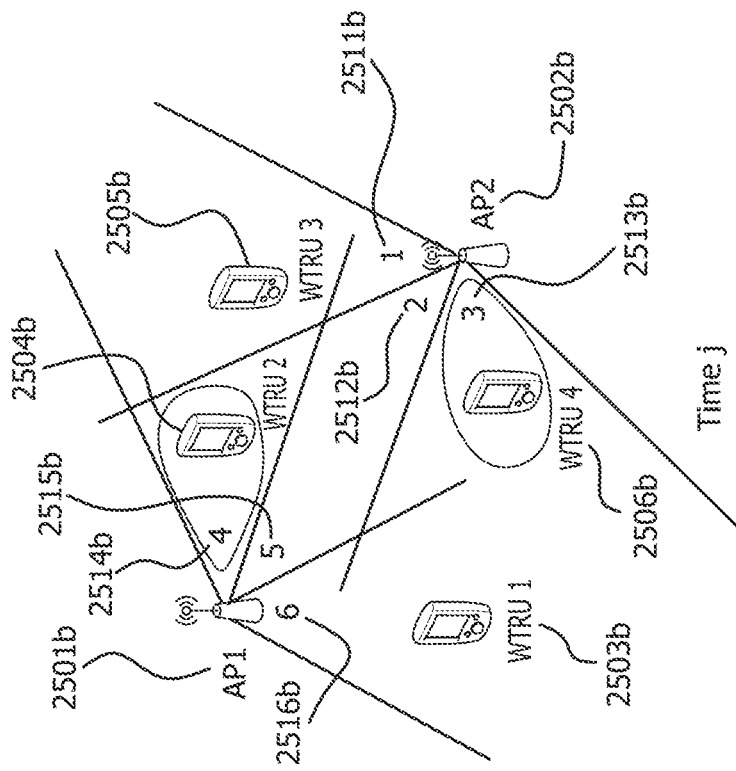
FIG. 25B shows another example of coordinated sectorized or beamformed transmissions.
Figure 25A:
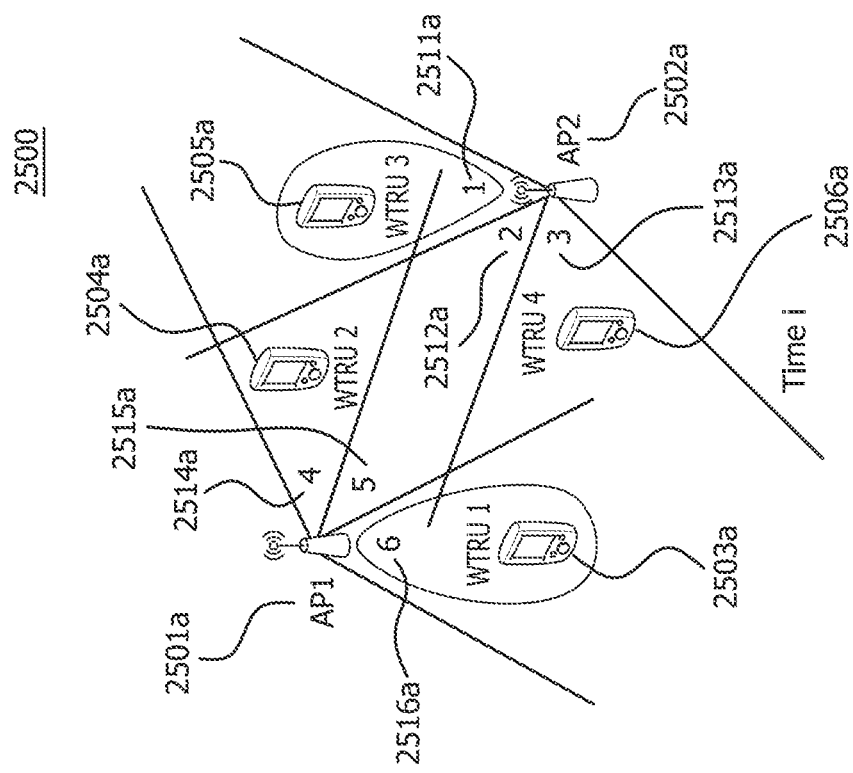
FIG. 25A shows an example of coordinated sectorized or beamformed transmissions.

FIG. 25A-25B show examples of coordinated sectorized or beamformed transmissions 2500. The system of FIG. 25A may consist of a first BSS that includes AP1 2501a, WTRU1 2503a, WTRU2 2504a, sector 4 2514a, sector 5 2515a, and sector 6 2516a. A second BSS may include AP2 2502a, WTRU3 2505a, and WTRU4 2506a, sector 1 2511a, sector 2 2512a, and sector 3 2513a. As shown in FIG. 25A, the sectors may overlap. In the first BSS AP1 2501a may perform sectorized transmission of data packets in sector 6 2516a to WTRU1 2503a at time=i. In the second BSS, AP2 2502a may perform sectorized transmission of data packets in sector 1 2511a to WTRU3 2505a also at time=i. In this way, two coordinated sectorized transmissions may take place concurrently without interfering with each other.

The system of FIG. 25B may consist of a first BSS that includes AP1 2501b, WTRU1 2503b, WTRU2 2504b, sector 4 2514b, sector 5 2515b, and sector 6 2516b. A second BSS may include AP2 2502b, WTRU3 2505b, and WTRU4 2506b, sector 1 2511b, sector 2 2512b, and sector 3 2513b. As shown in FIG. 25B, the sectors may overlap. In the first BSS AP1 2501b may perform sectorized transmission of data packets in sector 4 2514b to WTRU2 2504b at time=j. In the second BSS, AP2 2502b may perform sectorized transmission of data packets in sector 3 2513b to WTRU4 2506b also at time=j. In this way, two coordinated sectorized transmissions may take place concurrently without interfering with each other.

In both the distributed or centralized methods, interference may still occur because not all interfering frames may be decoded by the WTRUs experiencing the interference, such as when the interfering WTRU is too far of a distance from the receiving WTRU. In order to address this issue, APs/PCPs may conduct measurements before scheduling concurrent sectorized or beamformed transmissions of multiple sectors in overlapping (P)BSSs, or when interference is detected at scheduled coordinated sectorized or beamformed transmissions.

When an AP/PCP wants to add a coordinated sectorized or beamformed transmission in a sector at a time frame (t1, t2), the AP/PCP may instruct the WTRUs in that sector to measure any interference from all neighboring (P)BSSs for a predefined or configurable duration. Alternatively or additionally, an interval in the scheduling may be set aside specifically for measurement. The AP/PCP may also send a request to all other APs/PCP (or a coordinating AP/PCP) requesting that all APs/PCPs do not transmit and measure for interference during a given interval. During the same interval, the requesting AP/PCP may conduct regular transmissions and receptions with its WTRUs within the desired sectors. All APs/PCPs/WTRUs may measure interference and update the transmission sector conflict frames. The AP/PCP may then use the updated transmission sector conflict frames to determine the schedule for the new sector.

Figure 26:
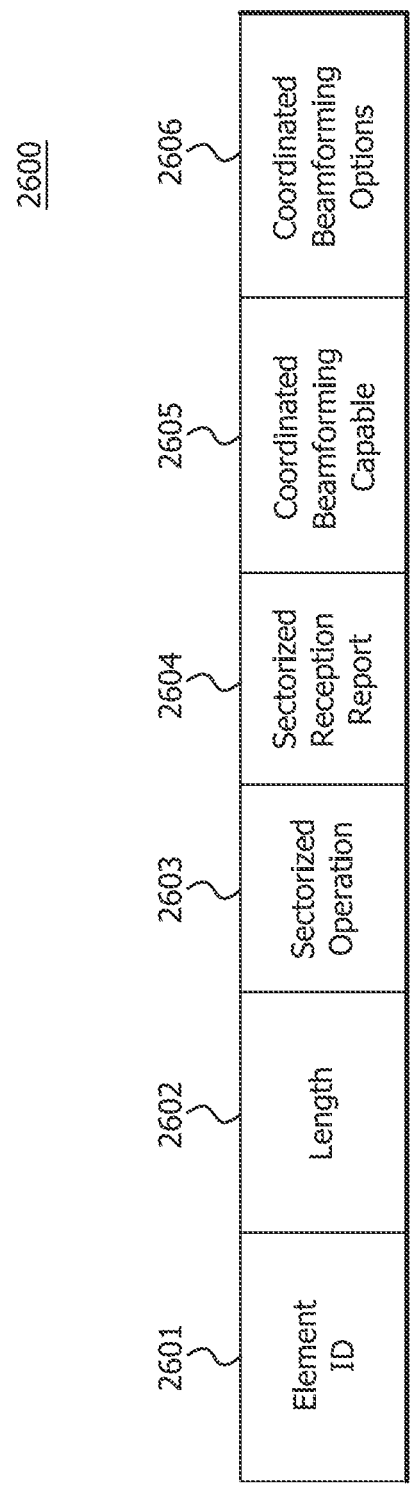
FIG. 26 shows an example of a coordinated sectorized and beamforming capability IE.

FIG. 26 shows an example of a coordinated sectorized and beamforming capability IE that may be used to indicate support for sectorized operation and/or beamformed transmission and reception 2600. Each WTRU, AP, an PCP that may be capable of coordinated sectorized operation and/or beamformed transmission may indicate its capability by including a coordinated sectorized and beamforming capability IE or field in any type of management, control or other type of frame such as probe request/response, association request/response frame, beacon, short beacon, etc. The WTRU may also use one or more bits in existing or new fields such as bit 30-31 in the VHT capabilities info field, to indicate that it is capable of WiFi coordinated sectorized or beamforming. The coordinated sectorized and beamforming capability IE may include but is not limited to the following fields:

(1) An element ID field 2601 that may indicate that the IE is a coordinated sectorized and beamforming capability IE;

(2) A length field 2602 that may contain the length of the IE;

(3) A sectorized operation field 2603 that may contain one or more bits to indicate whether the WTRU is capable of sectorized operation such as support for sectorization transmission;

(4) A sectorized reception report field 2604 that may contain one or more bits to indicate whether the WTRU is capable of providing and receiving beamformed or sectorized reception reports;

(5) A coordinated beamforming capable field 2605 that may contain one or more bits to indicate whether the WTRU is capable of coordinated beamforming;

(6) A coordinated beamforming options field 2606 that may contain the options for coordinated beamforming such as a beamforming method option for pre-coding matrix assignment or through training, a coordinated beamforming scheduling option for centralized or distributed coordination, or a coordination capability option that may be capable of acting as coordination node for centralized coordinated beamforming.

Similarly, PCPs and AP may include a coordinated sectorized and beamforming capability IE in its beacon, short beacon, association response and probe response to indicate its current mode of coordinated beamforming operations. The design of the coordinated sectorized and beamforming capability IE may be identical to that presented in FIG. 26 except the Element ID field.

An AP/PCP may require that the WTRUs be capable of sectorized operation and/or coordinated beamforming to associate with the (P)BSS. If a WTRU which does not support sectorized operation or coordinated beamforming attempts to associate with the PCP/AP, the PCP/AP's MAC layer may reject the association by issuing a MLME-ASSOCIATE.response primitive with the ResultCode "REFUSED_SECTORIZED_OPERATION_NOT_SUPPORTED" or "REFUSED_COORDINATED_BEAMFORMING_NOT_SUPPORTED". Similarly, the associated association response frame as well as the MLME-ASSOCIATE.confirm primitive may contain the same two reason codes as ResultCode Codes when rejecting the Association request from a WTRU.

Figure 27:
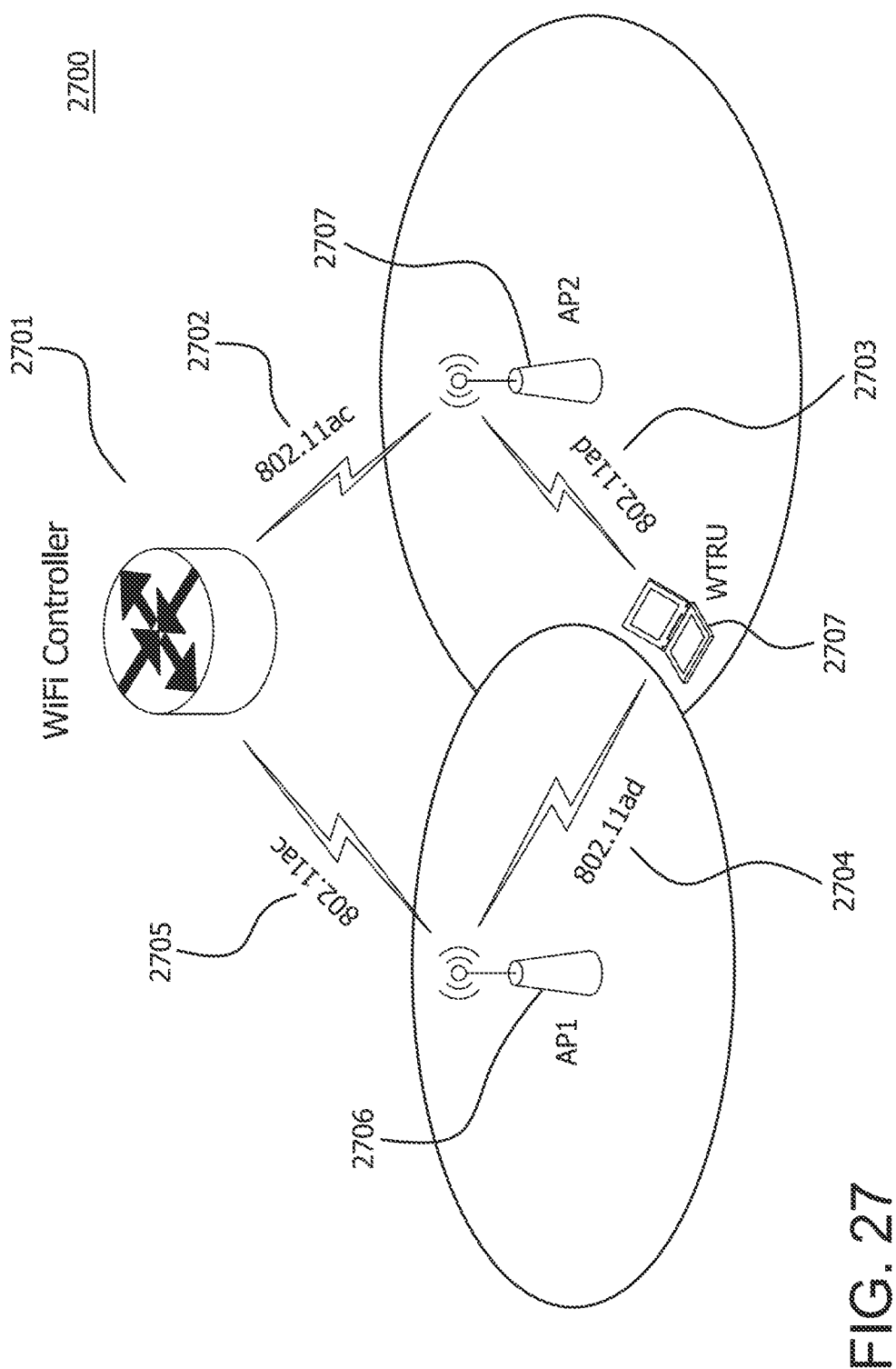
FIG. 27 shows an example system in which WTRUs are equipped with more than one WLAN interface.

FIG. 27 shows an example system in which WTRUs are equipped with more than one WLAN interface in accordance with a third embodiment 2700, which may be used in combination with any of the embodiments described herein. This embodiment may enable a joint transmission and/or beamformed/sectorized transmission to be performed over more than one wireless interface. A device may have multiple WiFi interfaces with different WiFi interfaces adhering to different WiFi standards. For example, a device may have an 802.11ac interface for larger area coverage as well as an 802.11ad interface for multi-giga bits connections to WTRUs that are in close range. In another example, a device may have an 802.11 ah interface for coverage area of radii of up to 1 km as well as an 802.11n interface. In the example of FIG. 27, the AP1 2706 has an 802.11ac interface 2705 with WiFi controller 2701 and a 802.11ad 2704 with WTRU 2707. Similarly, AP2 2707 has an 802.11ac interface 2702 with WiFi controller 2701 and a 802.11ad 2703 with WTRU 2707. This embodiment may leverage the different characteristics of each WLAN interface such as coverage range, capabilities, and data rates to provide more uniform coverage for all WTRUs in a WLAN (P)BSS and OBSSs. These WLAN interfaces may also adhere to the same (for example, multiple 802.11ac devices tuning to different channels) or different WLAN standards (for example, one WLAN interface may be 802.11ac WTRU while a second WLAN interface may be 802.11 ah WTRU).

These different characteristics of different WiFi devices may be leveraged to achieve coordination and data forwarding to provide more uniform coverage in WiFi. For example, 802.11ac/ac+ connections on a device may be leveraged to provide coordinated beamforming or coordinated sectorized operation for 802.11ad WTRUs, PCPs and APs on the same device. As described above, the 802.11ad WTRUs, PCPs and APs may use the 802.11ac/ac+ connections to exchange the coordination frames such as beamformed or sectorized reception report frames, transmission sector conflict report frames, coordinated sectorized and beamforming capability frames, as well as scheduling frames and data for the sectors of the (P)BSS. Similarly, 802.11ac/ac+ WTRUs and APs (or in general terms, WTRUs and APs adhering to any 802.11xx standards) may use another 802.11xx connection to exchange coordination frames such as sectorized reception report frames, transmission sector conflict report frames, coordinated sectorized and beamforming capability frames, as well as scheduling and data frames for the sectors of the (P)BSS. Another 802.11xx connection may also be leveraged to exchange pre-coding matrices. The exchange of coordination, scheduling and data frames may be peer-to-peer or it may be towards a centralized WiFi controller as shown in FIG. 27.

In addition, it may also be possible that a device may have multiple WiFi interfaces which may adhere to the same WiFi standards. This may be in addition to WiFi interfaces that adhere to different WiFi Standards. These WiFi interfaces may be tuned to different channels such that one of the WiFi interface may be used for transmitting data frames, conducting joint transmissions, coordinated beamforming, sectorized transmissions, while the other WiFi interface is used to transmit coordination, scheduling and data frames for joint transmissions as described above, and for coordinated beamforming or sectorized operation as described above, in order to achieve more uniform coverage in WiFi networks.

Figure 28:
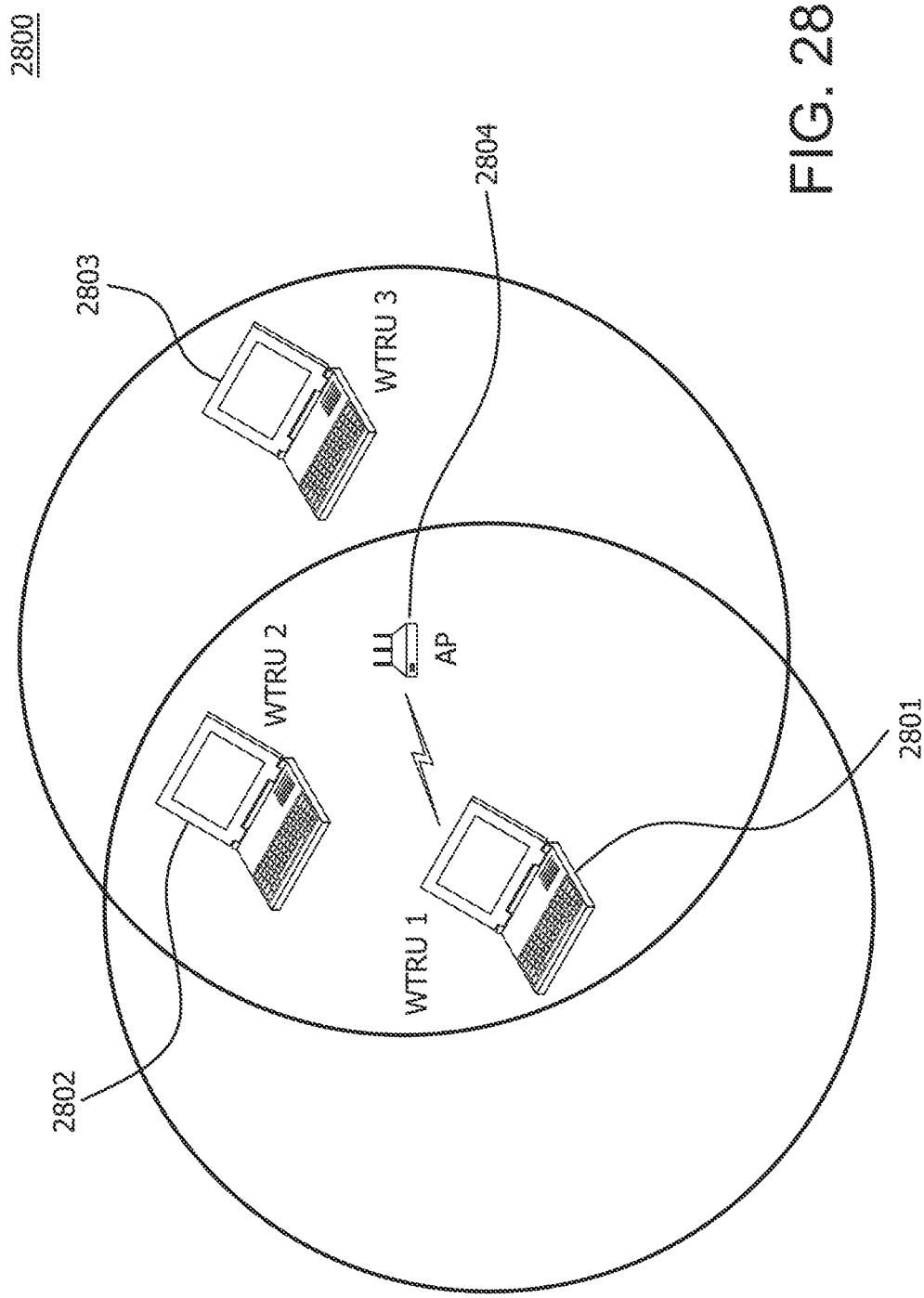
FIG. 28 provides an example of the hidden node problem.

The distributed nature of channel access in IEEE 802.11 networks may create a hidden node problem. FIG. 28 provides an example of the hidden node problem 2800 wherein WTRU2 2802 and AP 2804 may hear the transmissions from WTRU1 2801, while WTRU3 2803 may not hear the transmissions from WTRU1 2801. WTRU3 2803 may thus be a hidden node with respect to communication between WTRU1 2801 and AP 2804. In this case, when WTRU1 2801 transmits a packet to AP 2804, there may be a chance that the hidden node WTRU3 2803 would attempt another transmission to AP 2804 causing a collision. For a single AP in 802.11, request-to-send (RTS) and clear-to-send (CTS) signaling exchanges may be used to solve the hidden node problem. The hidden node scenario remains a problem for multiple APs coordinated communications as well, as the channel access continues to be implemented in a distributed fashion. Also for some frequency bands (e.g. 60 GHz band) direct transmission of the RTS/CTS packets, which may be omni-directional, may be time consuming. In that case, a different frequency band may be used to transmit the RTS/CTS packets to address the hidden node problem.

Figure 29:
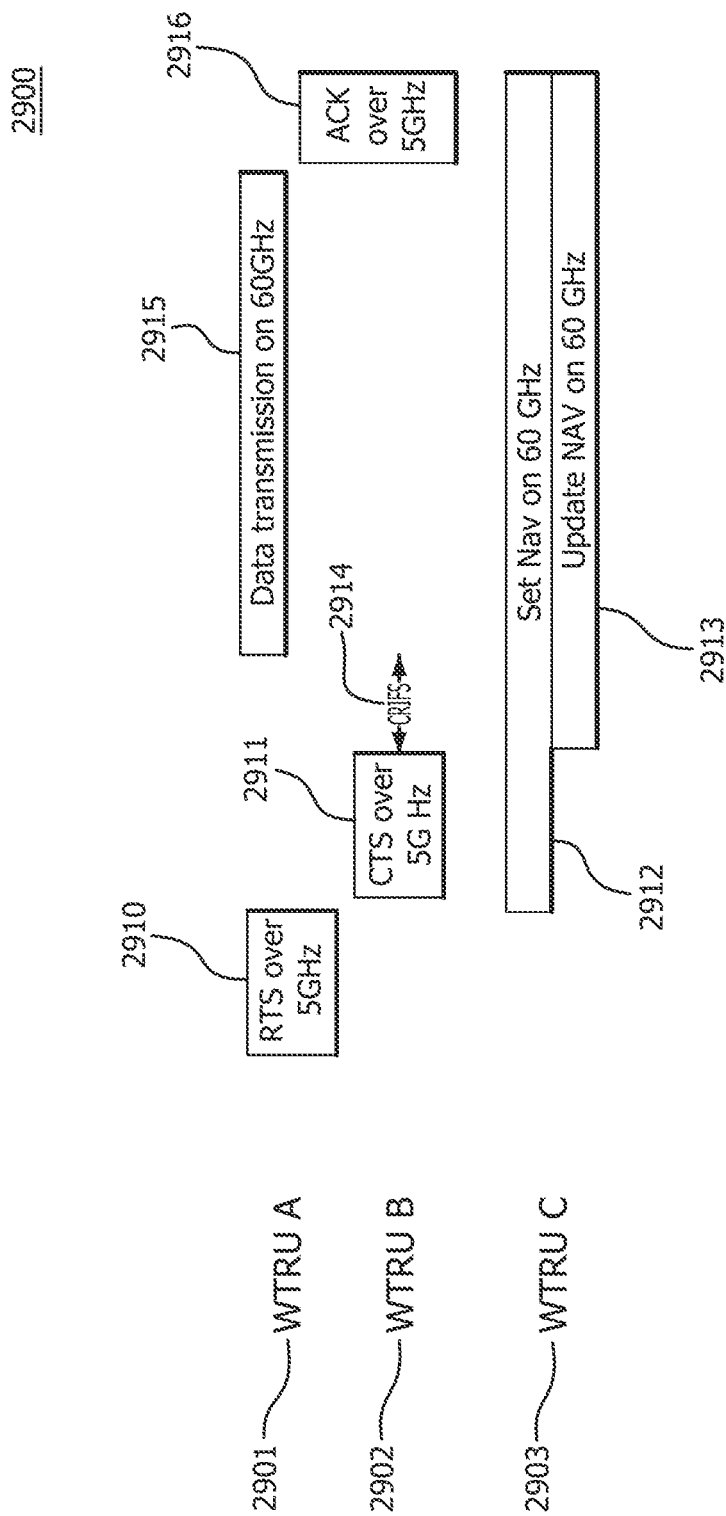
FIG. 29 shows an example procedure for transmission of RTS/CTS packets over different frequency bands.

FIG. 29 shows an example procedure for transmission of RTS/CTS packets over different frequency bands in accordance with a fourth embodiment 2900, which may be used in combination with any of the embodiments described herein. This embodiment may provide further mechanisms for coordinating joint and/or sectorized transmissions. This procedure may implement RTS/CTS across different frequency bands and may be used to solve the hidden node problem in the 60 GHz band. In the example of FIG. 29, there are three WTRUs: WTRU A 2901, WTRU B 2902, and WTRU C 2903. WTRUs are used in this example for illustration purposes, but each WTRU may also be replaced by an AP. Also in this example, each WTRU/AP may be able to transmit/receive in both 5 GHz band and 60 GHz band.

Transmitting WTRU A 2901 may send out a RTS frame in 5 GHz band 2910, in an attempt to reserve the 60 GHz band for a specified duration. Receiving WTRU B 2902 may then send out a CTS frame in 5 GHz band 2911 after a SIFS period, confirming the reservation of the 60 GHz band for WTRU A 2901 for the specified duration, and begin preparation for reception in 60 GHz. WTRU C 2903, which may not be involved as a transmitter or a receiver, may set its NAV on 60 GHz 2912 accordingly, and may withhold from transmitting within the specified duration.

After receiving the CTS frame in 5 GHz band 2911 from WTRU B 2902, WTRU C 2903 may update its NAV on 60 GHz 2913 accordingly, and may withhold from transmitting within the specified duration. WTRU A 2901 may proceed with data transmissions on 60 GHz 2915 to WTRU B 2902, after a cross band interframe spacing (CBIFS) time period 2914. Acknowledgement 2916 of the 60 GHz transmissions may be sent over 5 GHz band to confirm successful communication from WTRU A 2901 over the 60 GHz band and or to clear the 60 GHz NAV settings originally setup by WTRU A 2901. Alternatively or additionally, the acknowledgement may be transmitted on the 60 GHz channel if desired.

Figure 30:
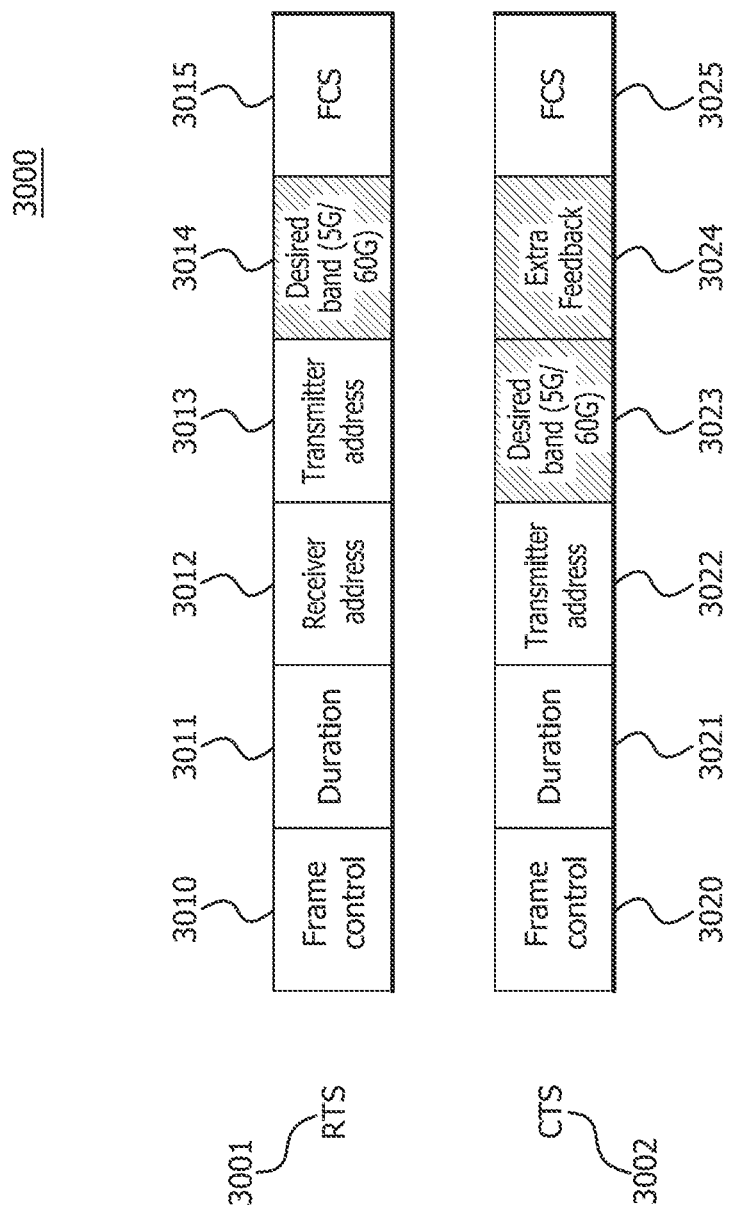
FIG. 30 shows an example RTS/CTS format.

FIG. 30 shows an example of how the RTS/CTS format may be modified to support the procedure above 3000. The RTS 3001 may include a frame control field 3010, a duration field 3011, a receiver address field 3012, a transmitter address field 3013, a desired band (5G/60G) field 3014, and an FCS field 3015. The desired band (5G/60G) field 3014 may be used to indicate that the RTS frame is to reserve channel over 60 GHz band (or 5 GHz band), or which channel within the 60 GHz band. Similarly, the CTS 3002 may include a frame control field 3020, a duration field 3021, a transmitter address field 3022, a desired band (5G/60G) field 3023, an extra feedback field 3024, and an FCS field 3025. The desired band (5G/60G) field 3023 may be used to confirm successful reservation of the channel over 60 GHz band, or the specified channel within the 60 GHz band. In addition, an extra feedback field 3024 may be sent in the CTS to help expedite the beamforming training process over 60 GHz band. Information may include but is not limited to the spatial beamforming vector from history and/or location information of the WTRU, which may be obtained from global positioning system (GPS) that is attached to WTRU.

In the above examples, the 5 GHz component and the 60 GHz component may reside in the same physical device, for example the same WTRU. It is noted that the two components may reside in two different physical devices, for example, a 5G WTRU and a 60G WTRU.

In traditional IEEE 802.11, RTS/CTS signaling exchange may be needed to solve hidden node problem. RTS may first be sent out from the potential transmitter. Every other station, except the potential receiver, hearing the RTS would need to set their NAVs accordingly and hold their transmissions. The potential receiver may respond with a CTS packet, confirming the RTS request. The combination of RTS and CTS may help the transceiver pair to reserve the radio resource and protect the following transmission from the hidden node problem.

Figure 31:
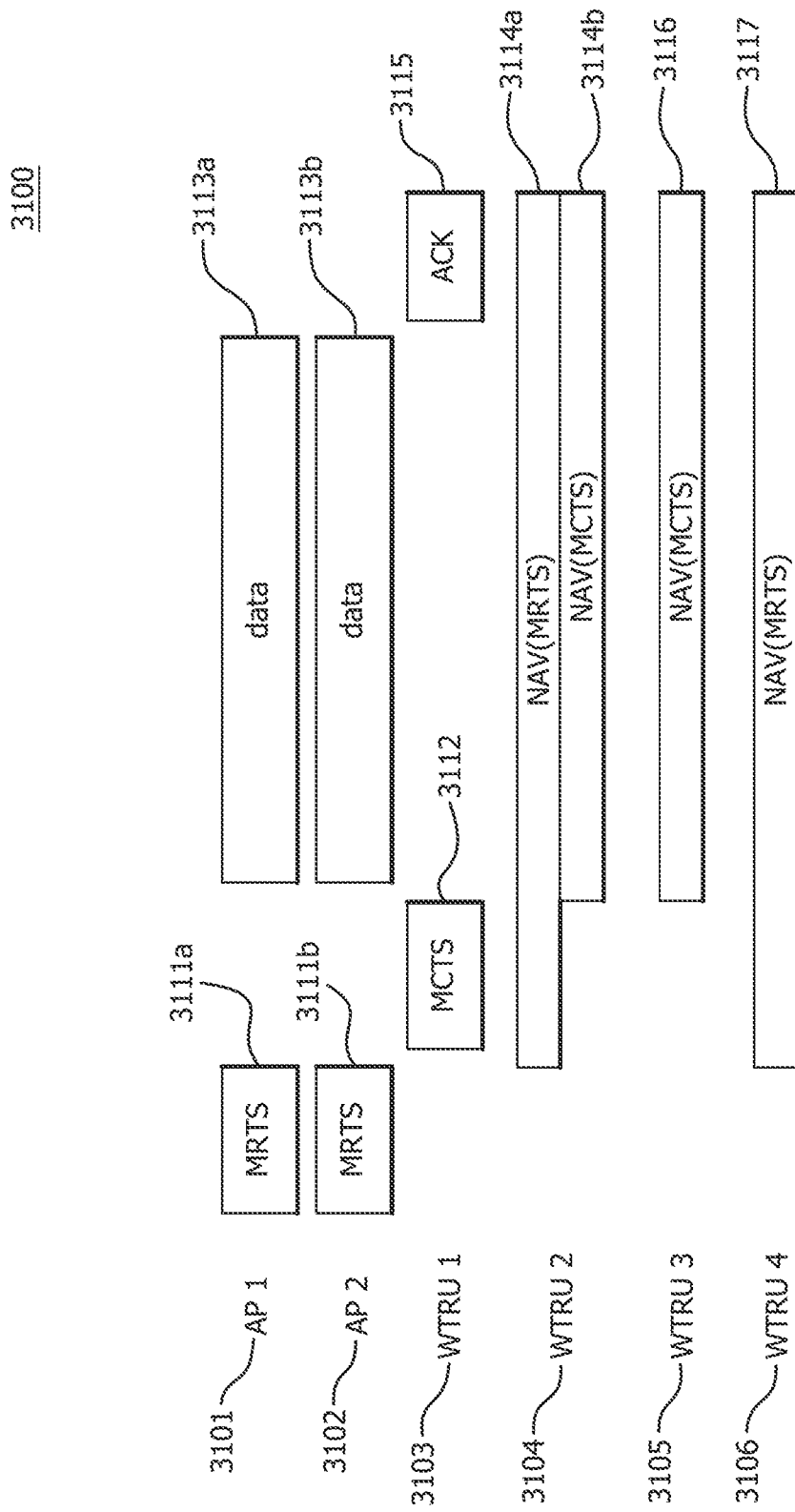
FIG. 31 provides an example of multi-AP WiFi in which the hidden node problem is handled.

FIG. 31 provides an example in multi-AP WiFi, in which a similar procedure may be used to handle the hidden node problem 3100. In the example of FIG. 31, AP1 3101 and AP2 3102 may transmit multi-AP RTS (MRTS) 3111a and 3111b to make a request for radio resources. In response, the receiver, in this case WTRU1 3103, may reply with a multi-AP CTS (MCTS) 3112 to confirm the request. Actual data transmissions 3113a and 3113b from AP1 3101 and AP2 3102 to WTRU1 3103 may ensue. Alternatively, the MRTS may be transmitted 3111a and 3111b may be transmitted simultaneously, or in a staggered manner one after the other.

In the same time, upon hearing MRTS 3111a and 3111b, WTRU2 3104 may set its NAV 3114a accordingly until an ACK 3115 as estimated by AP1 3101 and AP2 3102. Upon hearing MCTS 3112, WTRU2 3104 may update its NAV 3114b accordingly until the end of ACK 3115 as specified in the MCTS 3112. WTRU3 3105 may only hear MCTS 3112 and accordingly may set its NAV 3116 until the end of ACK 3115 as specified in MCTS 3112. WTRU4 3106 may hear only MRTS 3111a and 3111b and accordingly may set its NAV 3117 until the end of ACK 3115 as estimated by AP1 3101 and AP2 3102 upon hearing the MRTS 3111a and 3111b. This procedure ensures that each WTRU/AP is aware of the data transmissions 3113a and 3113b and avoids collision.

Figure 32:
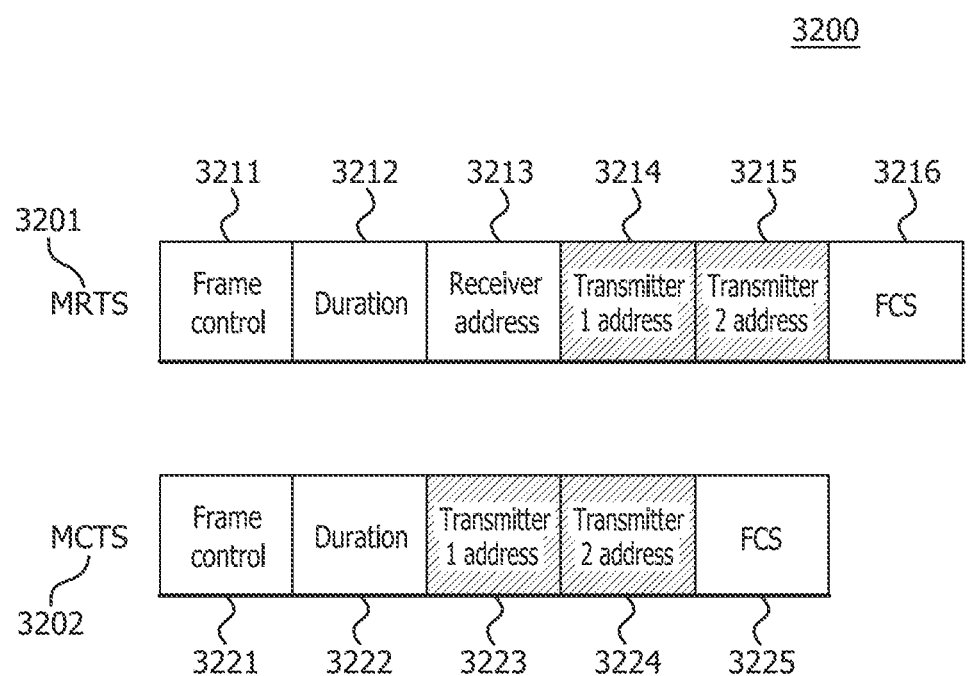
FIG. 32 provides an example frame format for an MRTS and an MCTS.

FIG. 32 provides an example frame format for MRTS and MCTS 3200. MRTS 3201 may include but is not limited to the following fields: frame control field 3211, duration field 3212, receiver address field 3213, transmitter address 1 field 3214, transmitter 2 address field 3215, and an FCS field 3216. MCTS 3202 may include but is not limited to the following fields: frame control field 3221, duration field 3222, transmitter address 1 field 3223, transmitter 2 address field 3224, and an FCS field 3225. The address of all transmitters may be specified in both the MRTS and the MCTS packet and may be MAC addresses, or logical address that represents the group of transmitter 1 and transmitter 2 (e.g. AP1 and AP2).

FIG. 33A-33D show several examples in which multiple APs may receive a transmitted signal from a single WTRU and jointly or separately decode the signal in uplink uniform WiFi (UniFi) 3300.

FIG. 33A shows an example of joint decoding by a super AP. the information received by AP1 3302 and AP 3303 from WTRU 3301 may be sent to super AP 3304 for decoding. Super AP 3304 may be a WiFi controller for example.

FIG. 33B shows an example of joint decoding by a primary AP. AP1 3312 and AP2 3313 in the UniFi set may forward the information received from WTRU 3311 to a single or "primary" AP and the decoding may be performed at the primary AP, which in this example is AP1 3312. The forwarding may be over a wired ESS backhaul or over-the-air in a separate transmission.

FIG. 33C shows an example of separate decoding by multiple APs. In this example AP1 3322 and AP2 3323 may decode the information received from WTRU 3321 separately. Any AP that successfully decodes the information may send the information to the transport layer or higher. Duplications may be handled at this layer.

FIG. 33D shows an example of separate decoding by a single AP. In this example, WTRU 3331 may select a single AP with the highest probability of decoding success at the time of transmission and transmit to this AP. This may be viewed as an AP selection algorithm. In this example, WTRU 3331 selects AP2 3333 over AP1 3332.

Figure 34A:
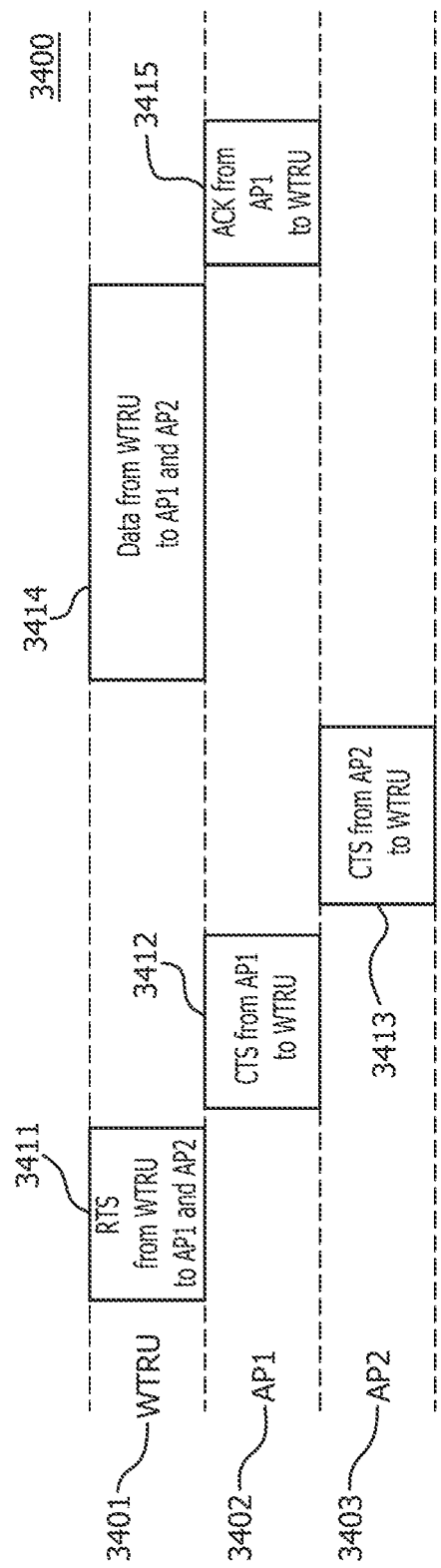
FIG. 34A shows an example CSMA/CA procedure in which a single WTRU may transmit to multiple APs.
Figure 34B:
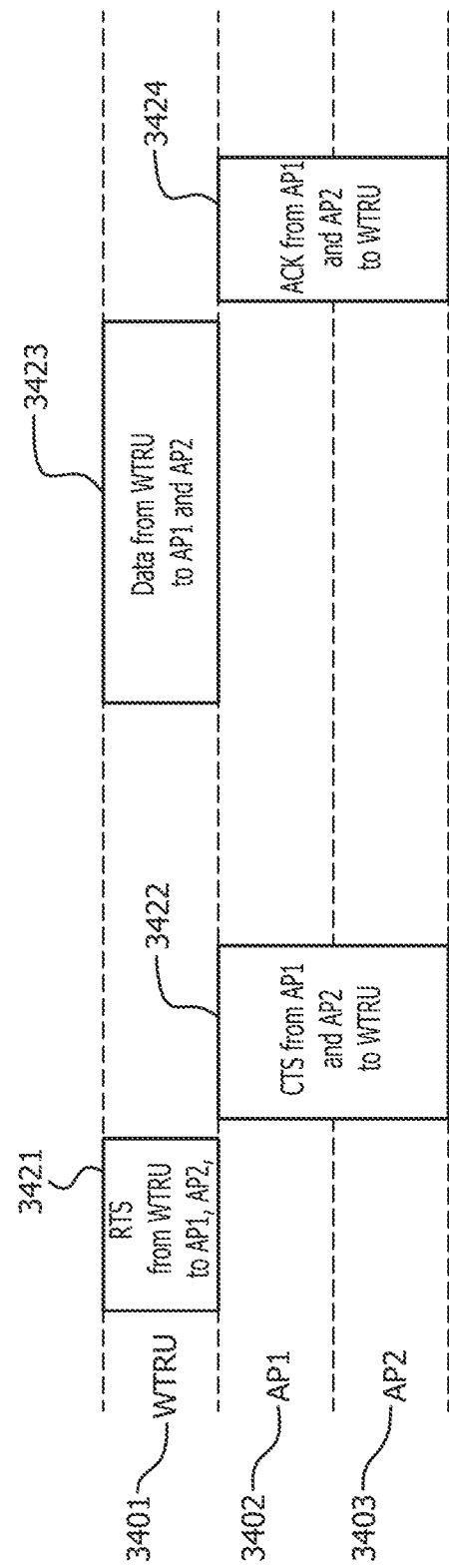
FIG. 34B shows another example CSMA/CA procedure in which a single WTRU may transmit to multiple APs.

FIG. 34A-34B show example CSMA/CA procedures in which a single WTRU may transmit to multiple APs 3400. In FIG. 34A, WTRU 3401 may transmit a UniFi_RTS frame 3411 to the AP1 3402 and AP2 3403 to reserve the channel for transmission. Upon reception of the RTS from WTRU 3401, AP1 3402 and AP2 3403 may transmit UniFi CTS 3412 and 3413 to WTRU 3401 to confirm WTRU's 3401 reservation of the resource. In the example of FIG. 34A, AP1 3402 and AP2 3403 may independently transmit UniFi_CTS 3412 and 3413 respectively after a specific duration. Upon receipt of UniFi_CTS 3412 and 3413 from all APs, WTRU 3401 may transmit data to the available APs.

UniFi_CTS 3412 and 3413 may be transmitted as UniFi_CTS frames orthogonalized in the code domain by an orthogonal cover code (OCC) or orthogonalized in time based on an agreed upon transmission delay, for example, in the order of the AP IDs in the RTS. In this case, AP1 3402 may send out a UniFi_CTS after a SIFS time lag while AP2 3403 may send out a UniFi_CTS after a (2*SIFS+duration_UniFi_CTS)) time lag. To account for propagation delay, the transmission from one of more of the APs may be time adjusted in a manner similar to that described in the first embodiment described above.

WTRU 3401 may then transmit data 3414 to AP1 3402 and AP2 3403. The APs may respond with an acknowledgement 3415 of the data sent if successful. This acknowledgment may be: a single ACK from the primary AP, a single ACK from each AP orthogonalized in time, or by an orthogonal cover code, or a joint ACK from both APs using CDD.

In FIG. 34B, WTRU 3401 may transmit a UniFi_RTS frame 3421 to the AP1 3402 and AP2 3403 to reserve the channel for transmission. Upon reception of the RTS from WTRU 3401, if AP1 3402 and AP2 3403 are able to coordinate with each other on their availability, they may send out a joint UniFi CTS 3422 with information on the available APs. The joint UniFi CTS may be sent from both APs using cyclic delay diversity (CDD). AP1 3402 and AP2 3403 may transmit joint UniFi CTS 3422 to WTRU 3401 to confirm WTRU's 3401 reservation of the resource. Upon receipt of joint UniFi CTS 3422, WTRU 3401 may transmit data to the available APs. In this example WTRU 3401 may transmit data 3423 to AP1 3402 and AP2 3403. The APs may respond with an acknowledgement 3414 of the data sent if successful. This acknowledgment may be: a single ACK from the primary AP, a single ACK from each AP orthogonalized in time, or by an orthogonal cover code, or a joint ACK from both APs using CDD. In the example of FIG. 34B, a joint ACK 3414 is shown.

In scenarios where there may be multiple APs and multiple WTRUs with different overlapping UniFi sets, a UniFi transmission may be permitted such as when all APs in the UniFi set are available. In this case, the WTRU may transmit if and only if all the APs in the requested UniFi set return a CTS. There may also be an additional signal from the WTRU to indicate all the APS are available and the WTRU is commencing transmission. This may be a CTS-to-self or modified CTS-to-self frame. In another example, UniFi transmission may be permitted when the designated AP in the UniFi set is available. In this case, the WTRU may designate a primary AP, which may for example be the AP with the lowest path loss. The WTRU may then transmit to this AP and any other AP available. As in the all AP available case, there may need to be an additional signal to indicate the commencement of data transmission. In yet another example, if any AP in the UniFi set is available, the WTRU may transmit to any AP indicating that it is available.

Figure 35:
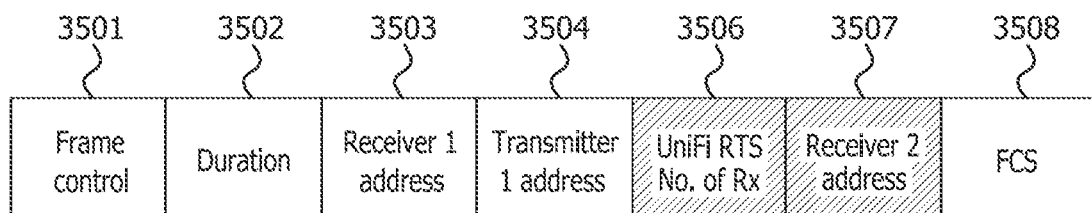
FIG. 35 shows an example UniFi_RTS frame format.

FIG. 35 shows an example UniFi_RTS frame format 3500 for use in the procedures of FIG. 34A-34B. The UniFi_RTS frame may include but is not limited to the following fields: frame control field 3501, duration field 3502, receiver 1 address field 3503, transmitter 1 address field 3504, UniFi RTS No. of Rx field 3506, receiver 2 address field 3507, and an FCS field 3508. The UniFi RTS No. of Rx field 3506 may contain information indicating that the transmission is a UniFi transmission, and a UniFi set identifier. This UniFi set identifier may be a set of fields indicating the number of APs in the UniFi set and the individual AP IDs for each of the APs in the UniFi set i.e. {2, AP1, AP2}. Alternatively, the UniFi set may be a single UniFi ID that serves as a group identifier for the UniFi AP set. The UniFi_D may be assigned during the UniFi transmission setup by a UniFi group identifier assignment frame.

The UniFi_CTS may be a legacy CTS which the WTRU implicitly interprets as a UniFi CTS based on the fact that it sent out a UniFi_RTS. Alternatively, a modified CTS with additional information indicating that the CTS is based on a UniFi RTS may be used.

Figure 36:
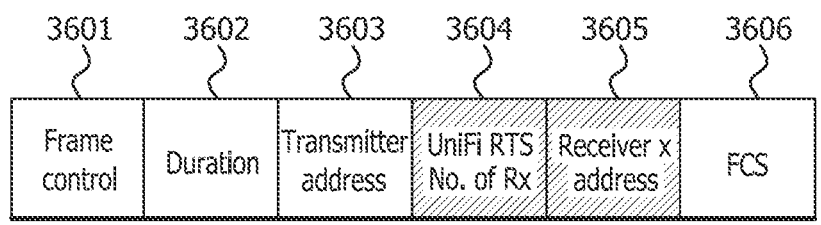
FIG. 36 shows an independent UniFi_CTS frame format.

FIG. 36 shows an independent UniFi_CTS frame 3600 that may be used in the procedure of FIG. 34A. The independent UniFi_CTS frame may include but is not limited to the following fields: frame control field 3601, duration field 3602, transmitter address field 3603, UniFi RTS No. of Rx field 3604, receiver x address field 3605, and an FCS field 3606. The UniFi RTS No. of Rx field 3604 may contain a field indicating the number of APs expected in the UniFi set and the address of the AP returning the CTS. Because this is an independent UniFi_CTS frame, when the requested resource is in use by an AP, no UniFi_CTS may be transmitted by that specific AP. The independent UniFi_CTS frames transmitted by the APs may be distinguishable at the WTRU.

Figure 37:
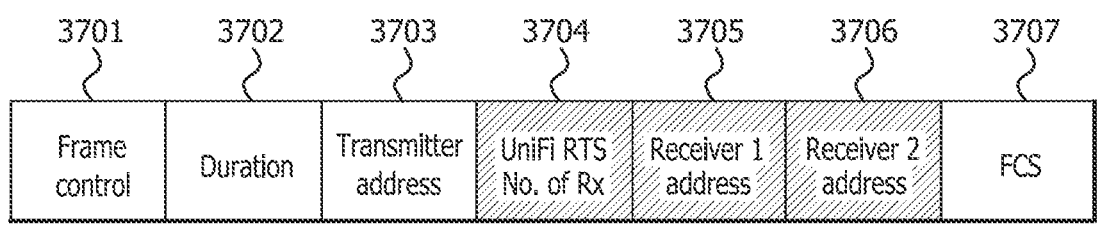
FIG. 37 shows joint UniFi_CTS frame format.

FIG. 37 show joint UniFi_CTS frame 3700 that may be used in the procedure of FIG. 34B. The joint UniFi_CTS frame may include but is not limited to the following fields: frame control field 3701, duration field 3702, transmitter address field 3703, UniFi RTS No. of Rx field 3704, receiver x address field 3705, receiver 2 address field 3706, and an FCS field 3707. The UniFi RTS No. of Rx field 3704 may contain a field indicating the number of APs expected in the UniFi set, and the addresses of the APs returning the CTS as shown in FIG. 37. Note that this may be a UniFi set identifier.

Figure 38:
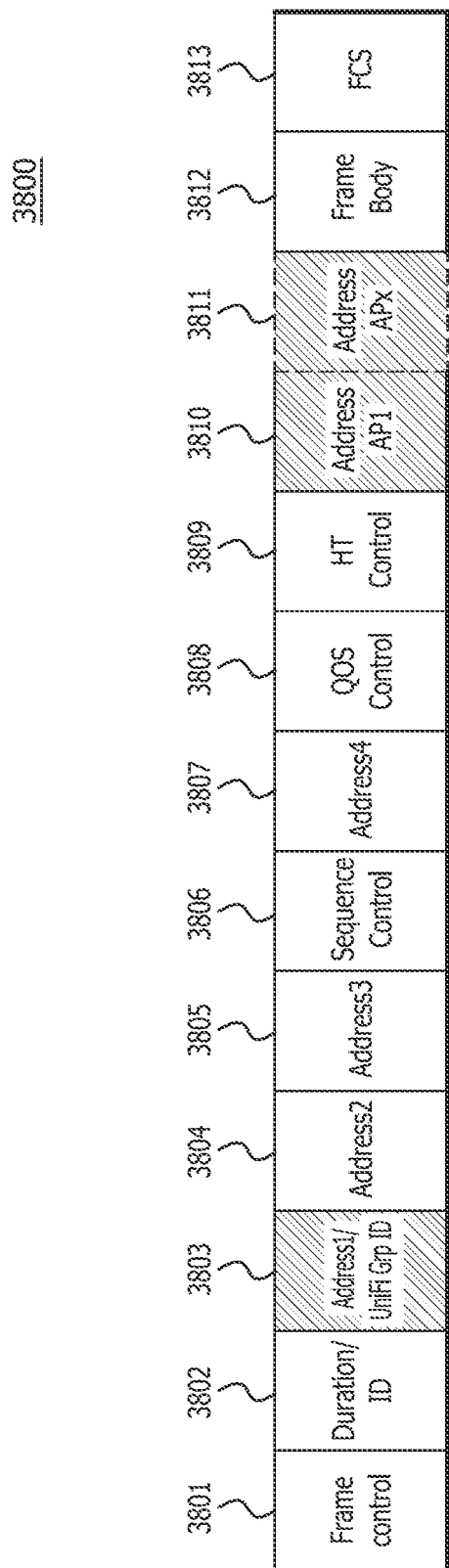
FIG. 38 shows an example of a data frame with a group ID and additional AP IDs.

FIG. 38 shows an example of a data frame with a group ID and additional AP IDs 3800. The PLCP header of the transmitted data may be modified to include a flag indicating an uplink UniFi transmission. In addition, the PLCP header of the transmitted data may be modified to include a UniFi set identifier that identifies the APs the transmission is meant for. This may be performed by either explicitly listing the AP IDs of the APs available for reception, using a AP group identifier UniFi ID representing the APs available for reception, or using a single selected AP ID (in the case of separate decoding with a single selected AP). In the example of FIG. 38, the following fields are used: frame control field 3801, duration id field 3802, address1 unifi grp ID field 3803, address2 field 3804, address3 field 3805, sequence control field 3806, address4 field 3807, QoS control field 3808, HT control field 3809, address AP1 field 3810, address APx field 3811, frame body field 3812, and FCS field 3813.

FIGS. 39A-39B shows examples of the modified ACKs that may be used 3900. FIG. 39A shows an example of a joint ACK that may include multiple receive addresses. The joint ACK of FIG. 39A may include but is not limited to the following fields: frame control field 3901, duration field 3902, receiver address field 3903, receiver 2 address field 3904, receiver n address field 3905, and FCS field 3906.

Alternatively, multiple separate ACKs may be aggregated into a single frame. FIG. 39B shows an example of an aggregated ACK, which may include but is not limited to the following fields: frame control field 3911, duration field 3912, receiver address 1 field 3913, FCS field 3914, frame control field 3915, duration field 3916, receiver address 1 field 3917, and FCS field 3918.

Figure 40:
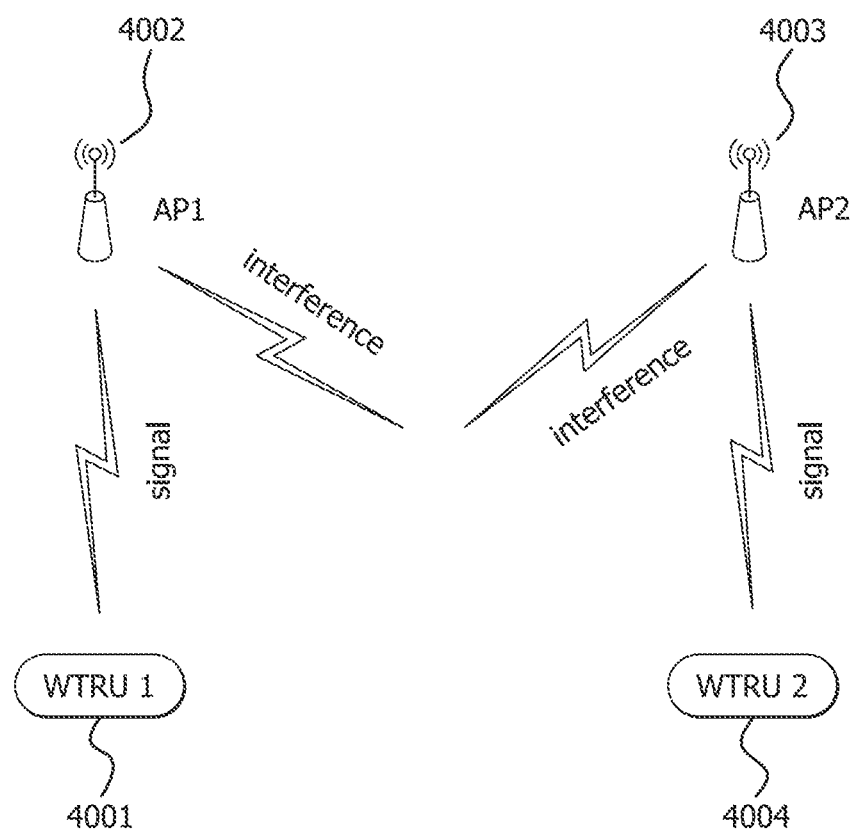
FIG. 40 shows an example of grouping for spatial coordinated multi-AP transmission (SCMAT)

FIG. 40 shows an example of grouping for spatial coordinated multi-AP transmission (SCMAT) in accordance with a fifth embodiment 4000, which may be used in combination with any of the embodiments described herein. SCMAT may be used to allow multiple APs communicating with one or multiple WTRUs to leverage spatial characteristics in joint and/or beamformed/sectorized transmissions. Grouping of APs and WTRUs involved may be established and provided before the actual UniFi transmissions. In the example of FIG. 40, WTRU1 4001 may hear both AP1 4002 and AP2 4003. Similarly, WTRU2 4004 may hear both AP1 4002 and AP2 4003. AP1 4002 and AP2 4003 may communicate with each other either through a wireless connection or wired connection. Accordingly, all devices involved in the SCMAT transmission may hear each other. The APs and WTRUs may be grouped together so that they may perform SCMAT transmissions. APs and WTRUs with SCMAT capabilities may announce SCMAT capability in frames such as probe response, beacon, and association response frames. This SCMAT capability information may be for example defined in VHT capabilities element.

Grouping criteria may not be unique and several example criteria are described below. For example, the APs may choose to group WTRUs according to receive power. For example, WTRU1 4001 may be able to receive a signal from AP1 4002 that is either stronger or equal to the signal from AP2 4003. Similarly, WTRU2 4004 may be able to receive a signal from AP2 4003 that is either stronger or equal to the signal from AP1 4002. Moreover, it may also require that both WTRUs involved in SCMAT transmission be able to hear both APs. Otherwise, if the WTRUs can only hear its own AP, there may be no need for SCMAT transmission.

In a second example, the APs may choose to group WTRUs according to degree of spatial separation. For example, the objective of SCMAT may be to permit multiple APs transmit simultaneously to multiple WTRUs. The AP may be able to select a set of spatial weights, which enhance signal strengths to the desired WTRU, and suppress the signal strengths to other non-desired WTRU(s) at the same time. In this case, the spatial separation between the desired WTRU and non-desired WTRU may be as high as possible.

In a third example, The APs may choose to group WTRUs with relatively large packet sizes, and the packet size of each spatial transmission link may be similar. It may not be efficient if the packet size is too small, due to the extra overhead. Moreover, one requirement of SCMAT transmission may be that WTRUs reply with an ACK after all the DL data transmission. Therefore, if the packet size of each spatial link differs a lot, it may not be efficient overall.

In a fourth example, the APs may choose to group WTRUs according to QoS requirements. For example, some packets may have strict requirements for delay and jitter; it may be good to arrange the transmission of these packets as soon as possible. Another choice may be to group packets with similar QoS category.

Grouping mechanism may be based on the selected grouping criteria. Power criterion may be utilized as an example to explain possible grouping mechanisms. WTRUs with SCMAT capability and associated with AP1 4002 may report RSSI or other signal measurements of AP2 4003 to AP1 4002, if the RSSI or other measurements exceed certain thresholds. In this way, AP1 4002 may collect the information from all the WTRUs in its BSS that may hear AP2 4003. AP1 4002 may choose to send this information to AP2 4003 through a wireless connection, or wired connection, which for example may be accomplished via a controller. AP2 4003 may perform a similar procedure and send relevant information to AP1 4002 through a wireless connection or wired connection or via a controller. AP1 4002 and AP2 4003 may then negotiate with each other to choose the candidates of a SCMAT group.

In order to form a SCMAT group, AP1 4002 and AP2 4003 may transmit SCMAT group management frames to the candidate WTRUs, WTRU1 4001 and WTRU2 4004 as shown in FIG. 40. The system of FIG. 40 is meant to serve as an example and forming a SCMAT group may extend to any number of WTRUs. The SCMAT group management frame may be an Action frame of category VHT. It may follow the group ID management frame format defined in with modifications which allow more than one AP defined in one group.

An example format of a SCMAT group management frame is shown in Table 19 below.

TABLE 19

| Order | Information |
|---|---|
| 1 | Category |
| 2 | VHT Action |
| 3 | Membership Status Array |
| 4 | User Position Array |

The category field may be set to the value for VHT. The VHT Action field may be set to the value for SCMAT group management. The membership status array field may use, for example, a bitmap format following a group ID management frame. The maximum number of allowed SCMAT group IDs may be defined by a standard specification or the WLAN system. For example, if up to 64 SCMAT groups are allowed, the membership status array field may contain 64 bits, where bit n defines the membership status in SCMAT group ID n−1. Setting bit n to 0 means the WTRU/AP may not be a member of the group n−1, while setting bit n to 1 means the WTRU/AP is a member of the group n−1.

The user position array field may be used to define the user position in the group. Since SCMAT transmission involves both APs and WTRUs, there may be a clear partition between the transmitters (APs) and receivers (WTRUs). For example, if the system allows each SCMAT group to have up to $2^{2n}$ devices, including both APs and WTRUs, then the user position array field may contain 2N×M bits. Here M may be the maximum number of allowed SCMAT group IDs.

Figure 41:
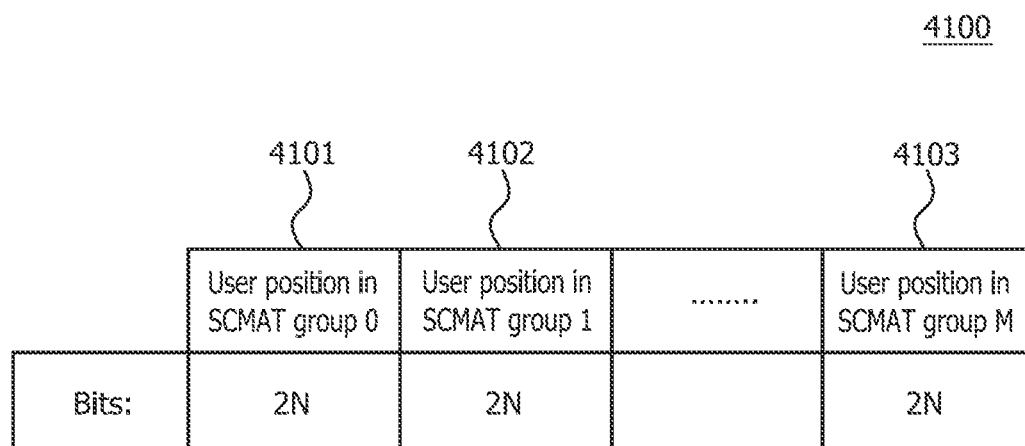
FIG. 41 provides an example of a user position array field.

FIG. 41 provides an example of a user position array field 4100. As shown in FIG. 41, each SCMAT group 4101, 4102, and 4103 has 2N bits, where bit 0 to bit N−1 defines the position of APs and bit N to bit 2N−1 defines the position of WTRUs. In this way, AP with user position value k may transmit a packet to WTRU with user position value equaling to N+k, k=0, . . . N−1.

An alternative choice may be to keep N bits to identify the user position of WTRUs for each group since user position of APs may be defined with other methods. Note that using SCMAT group ID may not be enough to define a unique group. For example, in a system with 3 APs and 4 WTRUs, AP1 and AP2 may use SCMAT group ID k to identify the group including AP1, AP2, WTRU1, and WTRU2. At the same time, AP1 and AP3 might use the same ID k to identify another group with members AP1, AP3, WTRU3, and WTRU4. When AP1 refers to group ID k, then WTRU1, WTRU2, WTRU3, WTRU4 may believe this is the group ID for them.

Figure 42A:
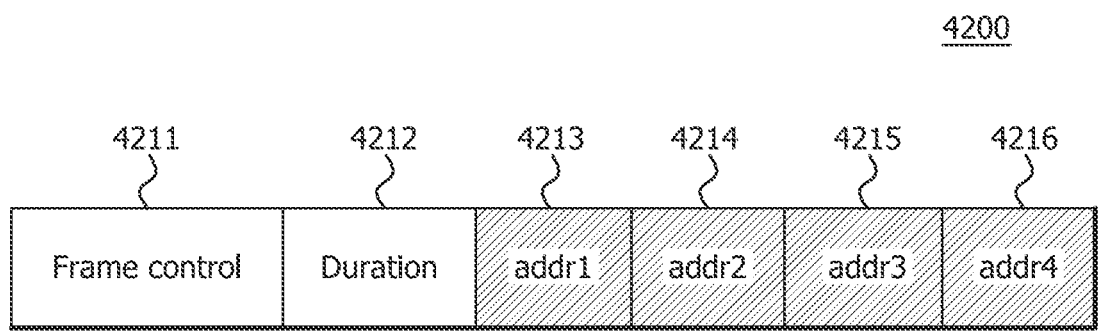
FIG. 42A provides an example of a partial MAC header for a SCMAT group management frame.

FIG. 42A provides an example of a partial MAC header for a SCMAT group management frame 4200. The SCMAT group management frame may include but is not limited to the following example fields: a frame control field 4211, duration field 4212, addr1 field 4213, addr2 field 4214, addr3 field 4215, and addr4 field. Each device may check SCMAT group ID and APs' MAC address to uniquely identify the group. There are two example methods to include AP MAC address in the SCMAT group. In a first example method, an AP MAC address may be added in the SCMAT group ID management frame. For example, 'order 5' may be added in Table 19 as AP MAC address. The MAC addresses for both APs may be included in this field. The order of AP MAC addresses may be utilized to imply the user position of the APs.

In a second example method, the four address fields defined in the MAC header may be reused. In this way, the four address fields may be re-defined. As shown in FIG. 42, addr1 4213 may be the MAC address of AP1; addr2 4214 may be the MAC address of AP2. Addr3 4215 may be modified as MAC address of WTRU1, addr4 4216 may be modified as MAC address of WTRU2. On receiving a packet, the device may notice that this is a SCMAT group management frame. The device may revisit the address field in MAC header and compare its own MAC address with the four address fields. Once it matches with one of them, it may keep the SCMAT group ID and addr1 4213 and addr2 4214 in a list to further identify the SCMAT group. In this way, the WTRUs that are associated with AP2 may listen to AP1 as well. The order of address mapping may be different from what is described here. However, it should be prefixed by the specification.

Figure 42B:
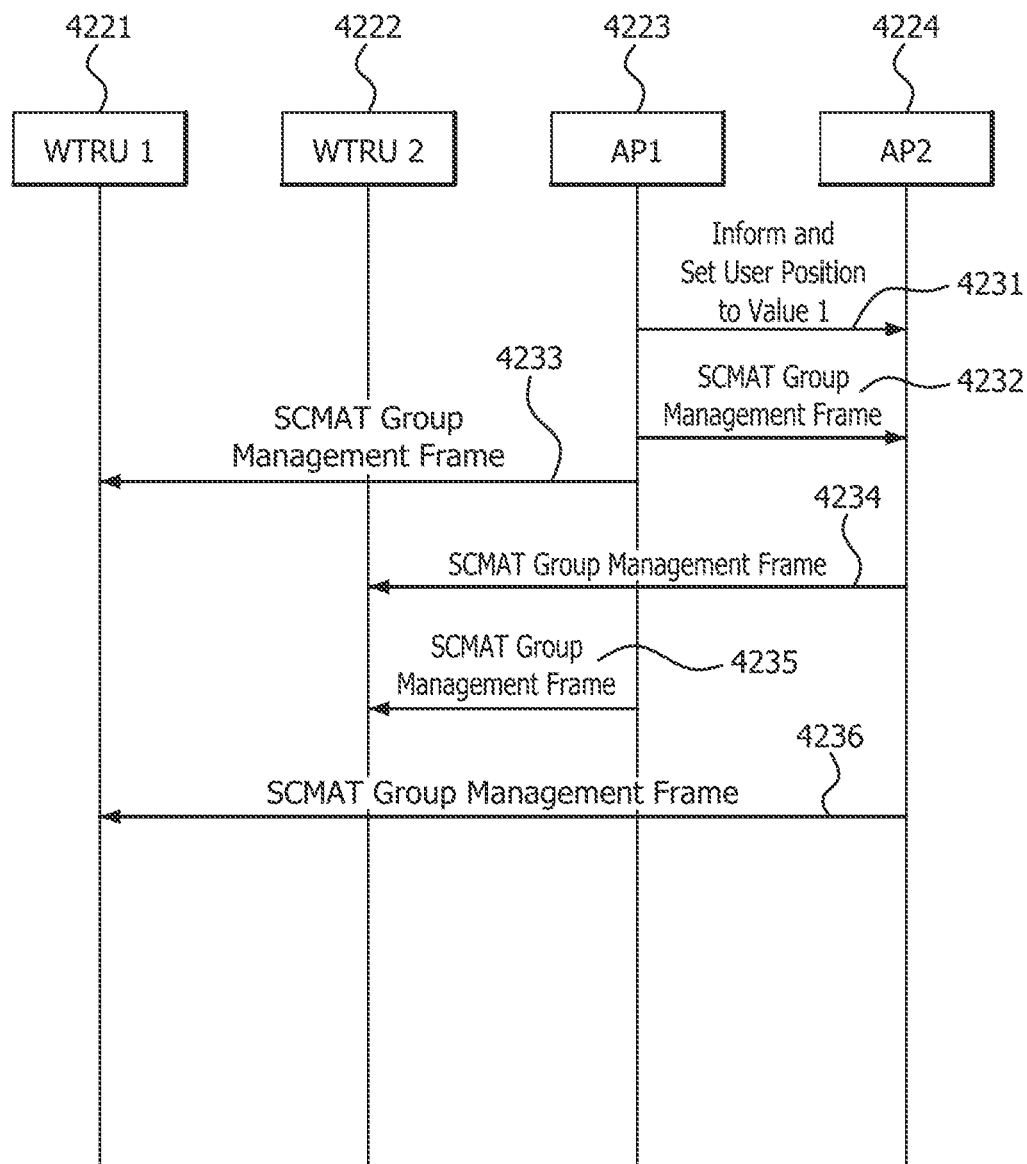
FIG. 42B provides an example procedure to utilize a SCMAT group management frame to form a SCMAT group.

FIG. 42B provides an example procedure to utilize a SCMAT group management frame to form a SCMAT group. In this example, the SCMAT group management frame may be configured as follows: addr1 may be a MAC address of AP1 4223, addr2 may be the MAC address of AP2 4224, addr3 may be modified as a MAC address of WTRU1 4221, and addr4 may be modified as a MAC address of WTRU2 4222. AP1 4223 may be the initiator AP and may set itself an AP user position value 0. AP1 4223 may inform AP2 4224 and set AP2 4224 user position value 1 4231. This may be done with a wired connection or wireless connection. With a wireless connection, a SCMAT group management frame may transmitted from AP1 to AP2 4232. If the user position array field contains 2N×M bits, then the user position of AP2 may be assigned explicitly. If the user position array field contains N×M bits, then the user position array field may only be used to identify the position for WTRUs. In this case, the AP2 may look at addr3 and addr4 of MAC header, and implicitly get the user position. AP1 4223 may then send a SCMAT group management frame 4233 to WTRU1 4221. AP2 4224 may send a SCMAT group management frame 4234 to WTRU2 4222. It may also be possible for AP1 4223 to send a SCMAT group management frame 4235 to WTRU2 4222, and AP2 4224 to send a SCMAT group management frame 4236 to WTRU1 4221, even though they are not associated.

Figure 43:
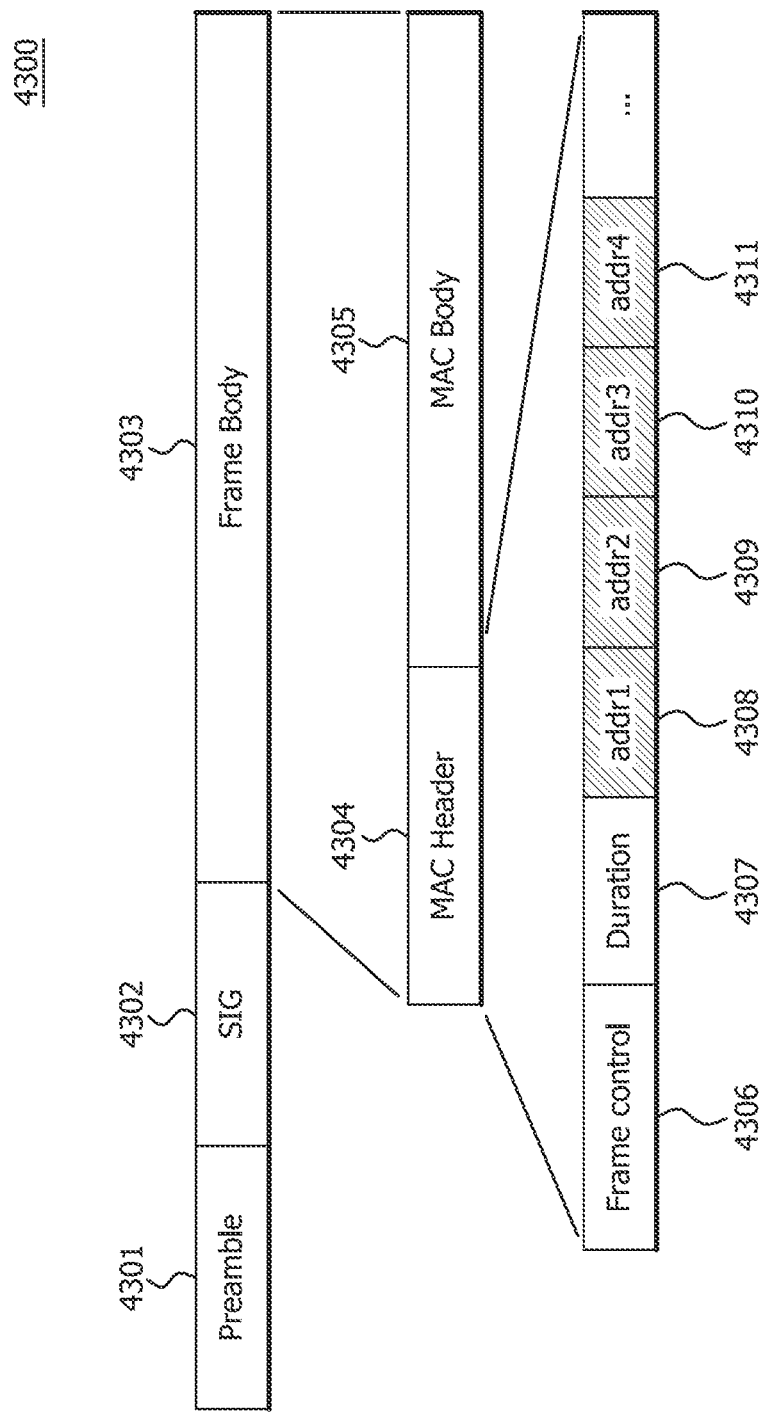
FIG. 43 provides an example of a frame format defined for SCMAT related transmissions.

FIG. 43 provides an example of frame format defined for SCMAT related transmission 4300. This frame may include but is not limited to a preamble 4301, SIG field 4302, frame body 4303, MAC header 4304, MAC body 4305, frame control field 4306, duration field 4307, addr1 field 4308, addr2 field 4309, addr3 field 4310, and addr4 field 4311. This frame format may be utilized by SCMAT related transmissions, for example, NDPA frames, NDP frames; ADD-SCMAT frames, A-SCMAT frames ACK frames. The SCMAT data frames may utilize this frame format too. In this example, one bit is added to the SIG field, which indicates that this is a SCMAT frame. SCMAT group ID may be included in the SIG field as well. Depending on the definition of SCMAT group ID, the four address fields in MAC header may be redefined to identify the two or more involved APs.

Although features and elements are described above in particular combinations, one of ordinary skill in the art will appreciate that each feature or element can be used alone or in any combination with the other features and elements. Although the solutions described herein consider 802.11 specific protocols, it is understood that the solutions described herein are not restricted to this scenario and are applicable to other wireless systems as well. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed is:

1. A method for use in an access point (AP), the method comprising:
   receiving, from a station (STA), a request frame that includes a first sectorized beamforming capability information element (IE) indicating that the STA supports sectorized operation in at least one sector associated with the STA;
   transmitting, to the STA, a response frame that includes a second sectorized beamforming capability IE indicating that the AP supports the sectorized operation in the at least one sector associated with the STA;
   transmitting a sectorized beacon frame that includes a scheduling of sector transmission in the at least one sector; and
   receiving, from the STA, a data packet based on the scheduling of sector transmission in the sectorized beacon frame.

2. The method of claim 1, wherein the scheduling of sector transmission comprises a sector identification (ID) and duration of the sectorized operation.

3. The method of claim 2, further comprising:
   receiving the data packet based on the sector ID and the duration of the sectorized operation.

4. The method of claim 1, wherein the request frame is an association request frame.

5. The method of claim 1, wherein the response frame is an association response frame.

6. An access point (AP) comprising:
   a receiver configured to receive, from a station (STA), a request frame that includes a first sectorized beamforming capability information element (IE) indicating that the STA supports sectorized operation in at least one sector associated with the STA;
   a transmitter configured to transmit, to the STA, a response frame that includes a second sectorized beamforming capability IE indicating that the AP supports the sectorized operation in the at least one sector associated with the STA;
   the transmitter further configured to transmit a sectorized beacon frame that includes a scheduling of sector transmission in the at least one sector; and
   the receiver further configured to receive, from the STA, a data packet based on the scheduling of sector transmission in the sectorized beacon frame.

7. The AP of claim 6, wherein the scheduling of sector transmission comprises a sector identification (ID) and duration of the sectorized operation.

8. The AP of claim 7, wherein the receiver is further configured to receive the data packet based on the sector ID and the duration of the sectorized operation.

9. The AP of claim 6, wherein the request frame is an association request frame.

10. The AP of claim 6, wherein the response frame is an association response frame.

11. An access point (AP) comprising:
    a transmitter configured to transmit, to a station (STA), a management frame that includes a sectorized beamforming capability information element (IE) indicating that the AP supports sectorized operation in at least one sector associated with the STA;
    the transmitter further configured to transmit a sectorized beacon frame that includes at least one sector identification (ID) associated with the at least one sector; and
    a receiver configured to receive, based on the at least one sector ID, a packet in a sectorized transmission from the STA.

12. The AP of claim 11, wherein the receiver is further configured to receive, from the STA, a second management frame that includes a second sectorized beamforming capability IE indicating that the STA supports the sectorized operation in the at least one sector associated with the STA.

* * * * *